SEMIAUTOMATIC TELETYPEWRITER TAPE RELAY SYSTEM

Filed Oct. 2, 1956 16 Sheets-Sheet 1

INVENTORS R. J. ANSPACH
R. C. CLARK
J. T. NEISWINTER
P. A. TAMASI
BY H. B. Whitfield
ATTORNEY April 11, 1961 R. J. ANSPACH ET AL 2,979,556

SEMIAUTOMATIC TELETYPEWRITER TAPE RELAY SYSTEM

Filed Oct. 2, 1956 16 Sheets-Sheet 2

INVENTORS R. J. ANSPACH
R. C. CLARK
J. T. NEISWINTER
P. A. TAMASI
BY H. B. Whitfield
ATTORNEY

SEMIAUTOMATIC TELETYPEWRITER TAPE RELAY SYSTEM

Filed Oct. 2, 1956 16 Sheets-Sheet 3

INVENTORS R. J. ANSPACH
R. C. CLARK
J. T. NEISWINTER
P. A. TAMASI
BY H. B. Whitfield
ATTORNEY

INVENTORS R.J. ANSPACH
R.C. CLARK
J.T. NEISWINTER
P.A. TAMASI
BY
ATTORNEY

INVENTORS R. J. ANSPACH
R. C. CLARK
J. T. NEISWINTER
P. A. TAMASI

BY
ATTORNEY

April 11, 1961 R. J. ANSPACH ET AL 2,979,556

SEMIAUTOMATIC TELETYPEWRITER TAPE RELAY SYSTEM

Filed Oct. 2, 1956 16 Sheets-Sheet 6

INVENTORS R. J. ANSPACH
R. C. CLARK
J. T. NEISWINTER
P. A. TAMASI

BY J. H. B. Whitfield
ATTORNEY

SEMIAUTOMATIC TELETYPEWRITER TAPE RELAY SYSTEM

Filed Oct. 2, 1956 16 Sheets-Sheet 7

INVENTORS R. J. ANSPACH
R. C. CLARK
J. T. NEISWINTER
P. A. TAMASI

BY H. B. Whitfield
ATTORNEY.

SEMIAUTOMATIC TELETYPEWRITER TAPE RELAY SYSTEM

INVENTORS R. J. ANSPACH
R. C. CLARK
J. T. NEISWINTER
P. A. TAMASI
BY H. B. Whitfield
ATTORNEY INVENTORS R. J. ANSPACH
R. C. CLARK
J. T. NEISWINTER
P. A. TAMASI
BY H. B. Whitfield
ATTORNEY

SEMIAUTOMATIC TELETYPEWRITER TAPE RELAY SYSTEM

Filed Oct. 2, 1956 16 Sheets-Sheet 10

INVENTORS R.J. ANSPACH
R.C. CLARK
J.T. NEISWINTER
P.A. TAMASI
BY H. B. Whitfield
ATTORNEY

SEMIAUTOMATIC TELETYPEWRITER TAPE RELAY SYSTEM

INVENTORS R. J. ANSPACH
R. C. CLARK
J. T. NEISWINTER
P. A. TAMASI

BY H. B. Whitfield
ATTORNEY

SEMIAUTOMATIC TELETYPEWRITER TAPE RELAY SYSTEM

Filed Oct. 2, 1956 16 Sheets-Sheet 12

INVENTORS R.J.ANSPACH
R.C.CLARK
J.T.NEISWINTER
P.A.TAMASI
BY
H. B. Whitfield
ATTORNEY April 11, 1961 R. J. ANSPACH ET AL 2,979,556

SEMIAUTOMATIC TELETYPEWRITER TAPE RELAY SYSTEM

Filed Oct. 2, 1956 16 Sheets-Sheet 13

INVENTORS R. J. ANSPACH
R. C. CLARK
J. T. NEISWINTER
P. A. TAMASI

BY [signature]

ATTORNEY

SEMIAUTOMATIC TELETYPEWRITER TAPE RELAY SYSTEM

Filed Oct. 2, 1956 16 Sheets-Sheet 14

INVENTORS R. J. ANSPACH
R. C. CLARK
J. T. NEISWINTER
P. A. TAMASI
BY [signature]
ATTORNEY April 11, 1961 R. J. ANSPACH ET AL 2,979,556

SEMIAUTOMATIC TELETYPEWRITER TAPE RELAY SYSTEM

Filed Oct. 2, 1956 16 Sheets-Sheet 15

INVENTORS R. J. ANSPACH
R. C. CLARK
J. T. NEISWINTER
P. A. TAMASI

BY H. B. Whitfield
ATTORNEY

INVENTORS: R. J. ANSPACH
R. C. CLARK
J. T. NEISWINTER
P. A. TAMASI
BY H. B. Whitfield
ATTORNEY

United States Patent Office 2,979,556

Patented Apr. 11, 1961

2,979,556

SEMIAUTOMATIC TELETYPEWRITER TAPE RELAY SYSTEM

Russell J. Anspach and Robert C. Clark, Kansas City, Mo., James T. Neiswinter, Garden City, N.Y., and Prospero A. Tamasi, Overland Park, Kans., assignors to American Telephone and Telegraph Company, a corporation of New York Filed Oct. 2, 1956, Ser. No. 613,555

19 Claims. (Cl. 178—3)

This invention relates to telegraph switching systems and particularly to a semiautomatic teletypewriter message relay system.

An object of this invention is to provide a teletypewriter message relay system that is rapid and dependable in operation, flexible in application, and adaptable particularly to users needing small or medium size teletypewriter networks.

Another object is to provide a relaying system for operation on half or full duplex multistation lines which incorporates pushbutton station selection, automatic or manual transmitter start for all stations, a multiple address transmitter arrangement, and automatic common code acknowledgment of all control signals.

Another object of this invention is to provide an automatic answer-back and line selection arrangement to permit the sending of signals from a perforated tape to several stations on different lines at one time.

Still another object of this invention is to provide a relaying system whereby transmission inwardly to the relaying center from the outlying stations may be controlled automatically or manually from the relay station, and transmission outwardly from the relay center to the outlying station is accomplished by pushbutton line and station selection at the relaying center.

Another object of the invention is the provision of an arrangement adaptable particularly to operation under light load conditions whereby a single code is transmitted periodically over the line to search for traffic at outlying stations, thereby minimizing the time required for ascertaining whether traffic is awaiting transmission on the line, by eliminating the periodic roll call which involves the sending of all outlying station transmitter start codes.

A further object of this invention is to provide a relay center capable of controlling a plurality of multistation lines utilizing a single or common sender circuit for station control functions.

Another object of the invention is to provide a simple arrangement for the switching of receiving or transmitting instrumentalities to any of the plurality of lines thereby to afford flexibility in providing service to the lines as required when machine troubles or lack of spare machines prevent the association of a receiver and a transmitter with each line.

A feature of this invention is a control circuit at outlying stations associated with a receiving selector and with transmitting and receiving instrumentalities which enable receiving and tape sending to take place simultaneously at the outlying station, and will act to interrupt temporarily transmission from the outlying station in response to control signals from the relay center, and will blind the receiving instrumentality against response to the control signals.

Another feature of this invention is the provision of a plurality of pushbutton selective calling units individual to each of the multistation lines terminating at the relay center and having access to a common sender for coding thereon the calling codes of stations associated with its line including an arrangement for repeating a call to a particular station in the event an acknowledgment signal is not received therefrom.

A further feature of this invention is a transmitter start code generator individual to each line terminating at the relay center and having access to the common sender for coding thereon transmitter start signals of the stations associated with the line, including an arrangement for repetitious calling in the absence of acknowledgment signals.

Still another feature is the provision of a plurality of line control circuits each individual to a line and adaptable to bid for and seize the common sender to enable a periodic search to be made of the plurality of lines on a rotating basis for available messages to be transmitted.

An additional feature of this invention is the utilization of the common sender for transmission of all receiving and transmitting control signals.

Another feature of the invention is the employment of a single acknowledgment code signal as a response to all control functions.

This invention comprises an improved tape relaying system incorporating pushbutton station selection and automatic transmitter start for all stations under the control of the relay center. The system contemplates the preparation of messages at outlying stations in the form of perforated tape and the placement of the tape in a transmitter which is automatically started under the control of selective signals originating at the relay center. At the relay center, the message is received on a reperforator, the perforated tape is severed and placed in a transmitter associated with the line serving the addressed station, a pushbutton is operated to cause the transmission of a selective teletypewriter cut-on signal, and the teletypewriter at the selected outlying station will be connected and the relay center transmitter will start. The outlying station transmitters are automatically started and the outlying station teletypewriters are connected to receive traffic, under the control of a receiving selector circuit.

An embodiment of this semiautomatic teletypewriter tape relay system, comprising a relay center associated with a plurality of full duplex multistation lines, is shown and described. The principal components of the relay center are a control panel, a transmitter start circuit, a station calling circuit, a sending selector, a sequence circuit, a plurality of tape transmitters, and a plurality of typing reperforators. The outlying stations comprise principally a receiving selector, a control circuit, a keyboard perforator, a tape transmitter, and a receiving teletypewriter. Messages sent from the relay center to outlying stations are directed to their destination by pushbutton keys on the control panel. A particular pushbutton key is assigned to each station on a particular line and the relay center attendant, after determining the stations of address, will push a clearing button, to restore to normal all station buttons used for the previous message transmitted to that line, and will then depress the buttons corresponding to the station or stations to which the message to be transmitted is addressed. The tape is placed in the transmitter associated with the outgoing transmission channel over which the message is directed, and will then depress a send button of the control panel. All buttons except the clearing button remain depressed to indicate which stations are connected. After depression of the send button, automatic calling of the designated stations is initiated. When the calling circuit begins its servicing operation the acknowledgment lamps associated with the stations of address on the control panel light. The calling circuit then automatically sends the receiving connect code for the first station of address. The called station acknowledges the receipt of its connect code by returning an acknowledgment signal. If no acknowledgment signal is received, the calling circuit repeats the code and if no acknowledgment signal is received on the second calling an alarm is given. Assuming that the acknowledgment signal is received from each station of address, the acknowledgment lamps adjacent to the calling keys are extinguished as the acknowledgment signals from the respective stations are received. When the acknowledgment from the last station is received, the relay center transmitter is started automatically and the message is transmitted simultaneously to all selected stations on the line. When the end of the tape passes through the transmitter gate, the tape out contacts on the transmitter cause the calling circuit to automatically send a master disconnect code. All connected stations respond to the master disconnect code by returning the acknowledgment signal. Because the acknowledgment signal is returned for each connect and disconnect transmitter start code the circuit is tested for continuity each time a message is sent.

Transmission from the outlying stations is also controlled by the relay center. At the relay center, an automatic transmitter start circuit and a sending selector sends outlying station transmitter start codes in sequence, after a response to the sending of a search code indicates that at least one outlying station has traffic awaiting transmission. Each station answers its start code with an acknowledgment signal. The transmitter start circuit then waits one second. If transmission does not begin during this interval, the start circuit sends the start code for the next station. After making a complete cycle of the outlying stations, the start circuit automatically sends a search code and repeats the sequence of operation described above. If a line receiving channel is idle for a predetermined time, the start circuit automatically sends a search code over the line transmission channel. If none of the stations associated with the line has a message tape awaiting transmission no answer is given to the search code and the start circuit waits for approximately one minute prior to sending another search code. This search and wait process is repeated until a station answers the search code indicating that it has a message to be transmitted. The answer to the search code automatically initiates a cycle of transmission of individual station start codes.

The control panel at the relay center has a lamp and a locking skip key for each station. The lamp flickers when the outlying station is sending, glows steadily as the start circuit sends the code for that station and is extinguished at all other times. A locking skip key, when operated, removes the station associated therewith from the start sequence. The control panel also has a locking manual key which when operated puts the start circuit under manual control. Successive operation of a non-locking step key will now step the start circuit to any desired start code position as indicated by the station start lamps, meanwhile withholding all start codes from the line. When the start circuit is stepped to the desired position, the non-locking code button is depressed and the start code for the desired station will be sent. Should it be necessary for the control center to stop transmission at any outlying station, operation of a non-locking emergency stop key will initiate transmission of a code on the line which will immediately stop the transmitter at any station on the circuit.

At the relay center, the incoming line terminates in a typing reperforator which receives all messages sent by an outlying station on the line, but does not record any sending from the relay center. The typing reperforator is equipped with an automatic noninterfering tape feedout circuit which, if no signals are received for five seconds, will automatically feedout sufficient tape from the typing reperforator so that the last message may be removed from the reperforator and serviced. If incoming transmission begins during this feedout operation, there will be no mutilation of any character in the incoming message.

To originate a message at an outlying station, the station attendant prepares the message in perforated tape and places it in a transmitter. When the transmitter start code for the particular station is received from the relay center, the outlying station control circuit returns the acknowledgment signal, and starts transmission of the message. At the end of the message the transmitter starting circuit is deactivated. Should there be no tape in the transmitter when the station transmitter start code is received, the station control unit will return the acknowledgment signal, and after waiting one second the relay center start circuit will send the start code for the next station in sequence.

Accordingly in a typical operating procedure a message originating at an outlying station on a particular line, is perforated in tape and the tape is placed in the outlying station transmitter. The message and those originating at other stations on the line are picked up automatically in sequence under the control of the relay center and recorded in a reperforator at the relay center. There the messages are examined to determine the identity of the stations of destination, the appropriate calling buttons are depressed and the tapes are placed in the proper transmitters, thereby to initiate automatic transmission of messages to their destination.

Operation on full duplex lines permits simultaneous transmission in both directions. However, because as indicated heretofore, the outlying stations return acknowledgments to their start, connect, and disconnect codes, it is necessary to use both directions of transmission for control signals. To enable operation on this basis, inward transmission from an outlying station on a line is momentarily suspended upon reception of a connect code for any station on that line, thereby to make the sending channel available for transmission of the acknowledgment signal from the called station to the relay center. After the transmission of the acknowledgment signal the outlying station resumes transmission of the interrupted message. Outward transmission from the relay center also may be interrupted temporarily, under the control of the relay center transmitter start circuit to allow transmitter start codes to be sent to outlying stations over the sending path and an acknowledgment signal to be returned from the outlying stations over the receiving path. When transmission from a called outlying station begins, the relay center causes resumption of interrupted transmission over the outgoing channel of the line.

The typing reperforator at the relay center which receives incoming traffic is blinded during selector operations to prevent the recording of spurious characters when the acknowledgment code signals are received. A multiple address arrangement is also provided at the relay center for the routing messages addressed to stations on more than one line. The transmitters at the relay center are normally connected to the lines through circuits controlled by keys on the control panel associated with the multiple address function. If a relay attendant has a multiple address message, he will depress the pushbutton calling keys on the line control panels for the stations of destination, as described previously, with the exception that a multiple address key for each line is depressed before depressing the send key. This connects together on a hub basis the sending sides of all lines involved when and as they become idle. After the calling keys for all of the lines required in the connection have been operated, the tape containing the multiple address message is placed in the transmitter associated with one of the lines in the connection and a multiple address transmit key, on the control panel for the line with which the selected transmitter is associated, is depressed. After this servicing the sending selector will automatically connect all required stations to their particular line receiving channel and the transmitter at the relay center will then send the message to all outlying stations simultaneously. The common disconnect code will then be sent automatically to all of the connected lines at the end of the message as previously described.

The drawings show a relay center to serve six full duplex lines each having a maximum of ten outlying stations. However, additional lines can be handled by the installation of equipment of the type and connected in the manner shown, for terminating and controlling such lines. The typing reperforators for terminating the lines may be connected to any line by operating appropriate keys on the control panel. There are two multiple transmitter units each having three transmitters. Should one or more of the transmitters of a unit be disabled, message tapes for the lines normally served by the disabled transmitters may be sent from a transmitter of the other unit simply by operating keys in the control panel associated with the serviceable unit. None of the lines need to be deprived of service altogether when machine failures occur and spare machines are not available. Limited service may be afforded to all lines by transferring typing reperforators and transmitters from one line to another by means of the switching keys.

For a complete understanding of the invention, reference may be had to the following detailed description to be interpreted in the light of the accompanying drawings, wherein:

Figs. 1, 2, 3 and 4, when arranged as indicated in Fig. 16, show schematically a semiautomatic teletypewriter message relay system comprising a relay center and six multistation lines, the schematic showing in Figs. 1 to 4 comprising some of the circuitry of the relay center, and block diagram representations of Figs. 5 to 15, inclusive, of the drawings, in their functional relations to each other and to the circuitry in Figs. 1 to 4;

Fig. 5 shows a transmitter control circuit, there being one for each line served by the relay center;

Figs. 6 and 7, when arranged as shown in Figs. 1 to 4, show a line control circuit, of which there is one for each line served by the relay center;

Figure 1:
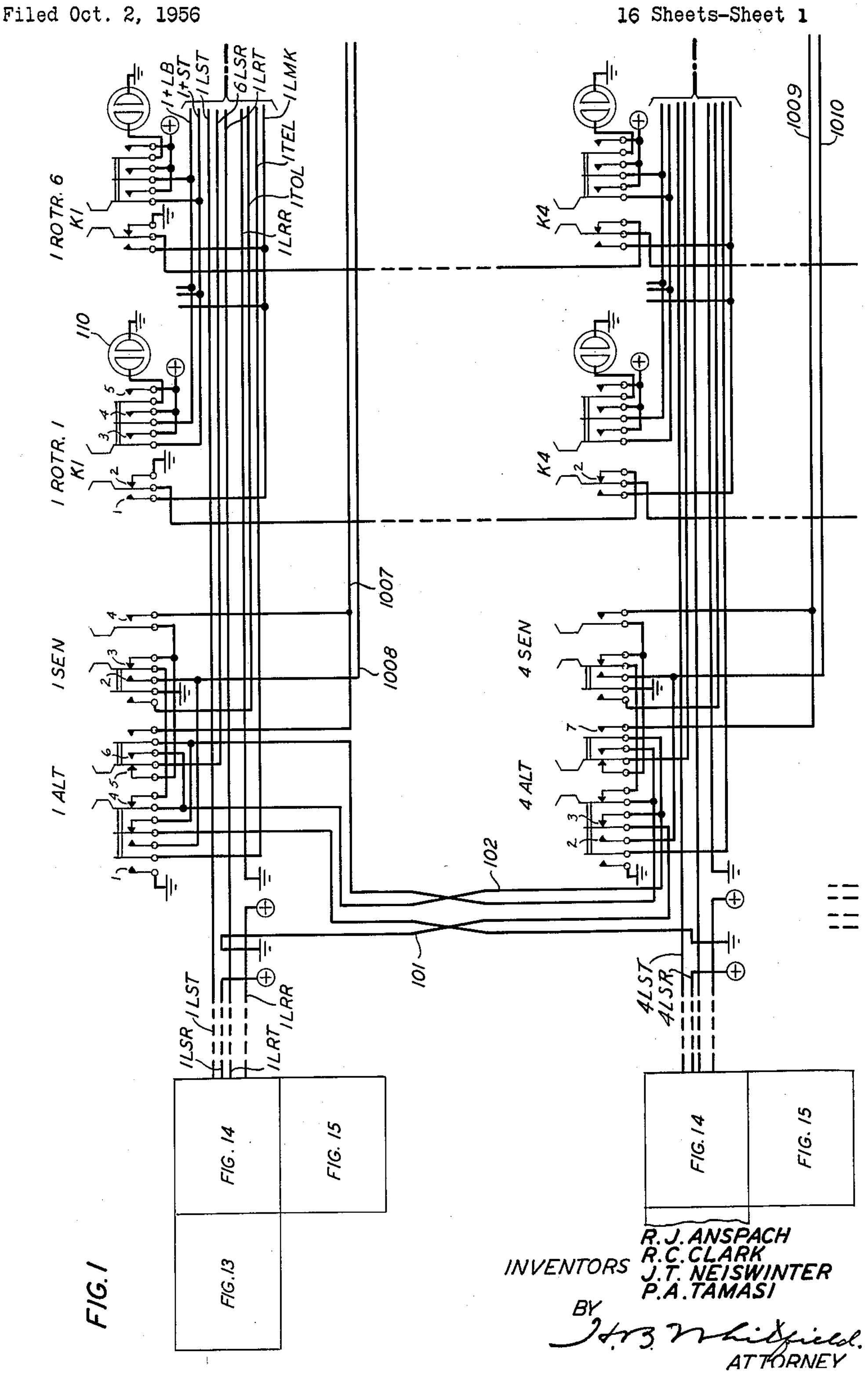
Figure 13:
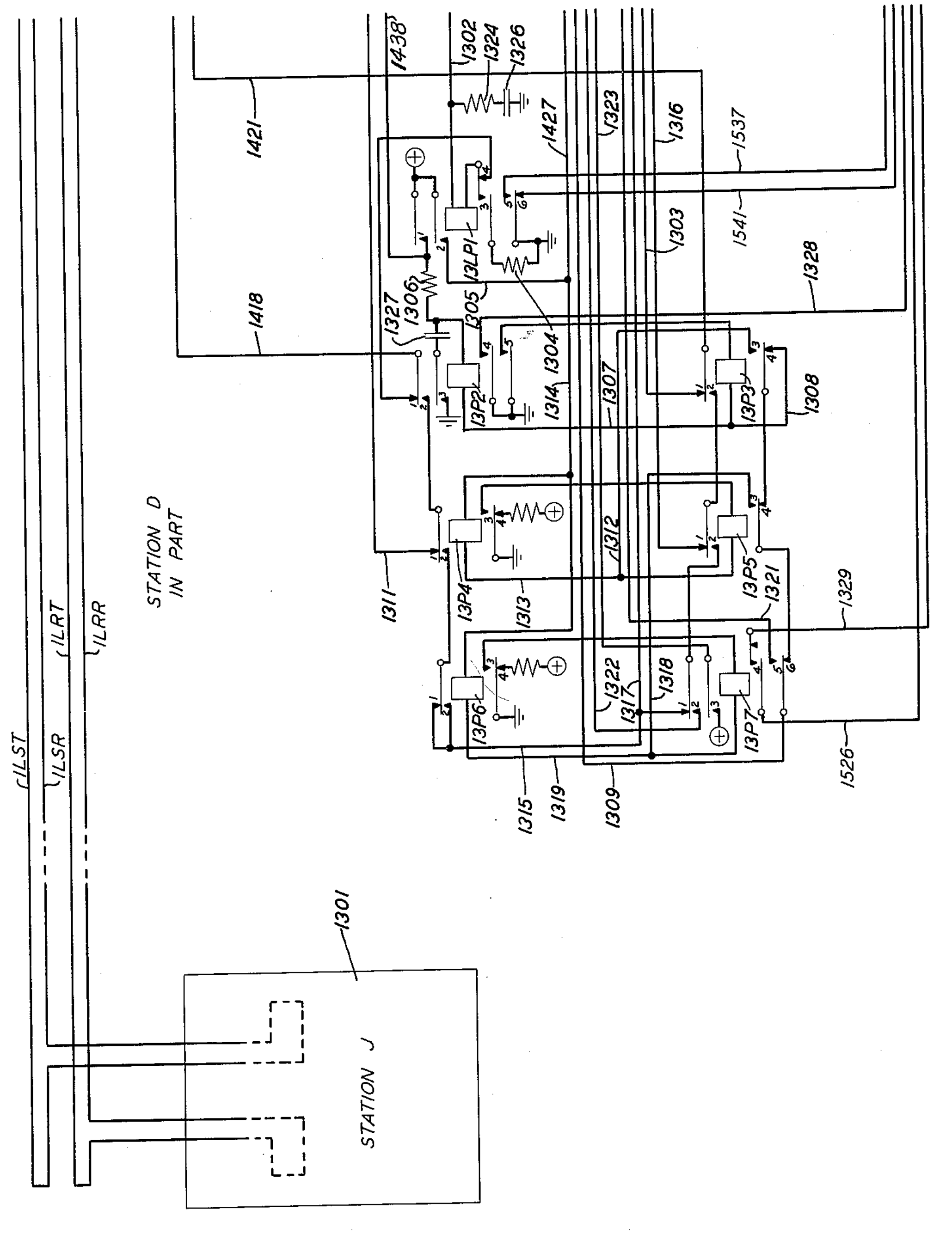
Figure 14:
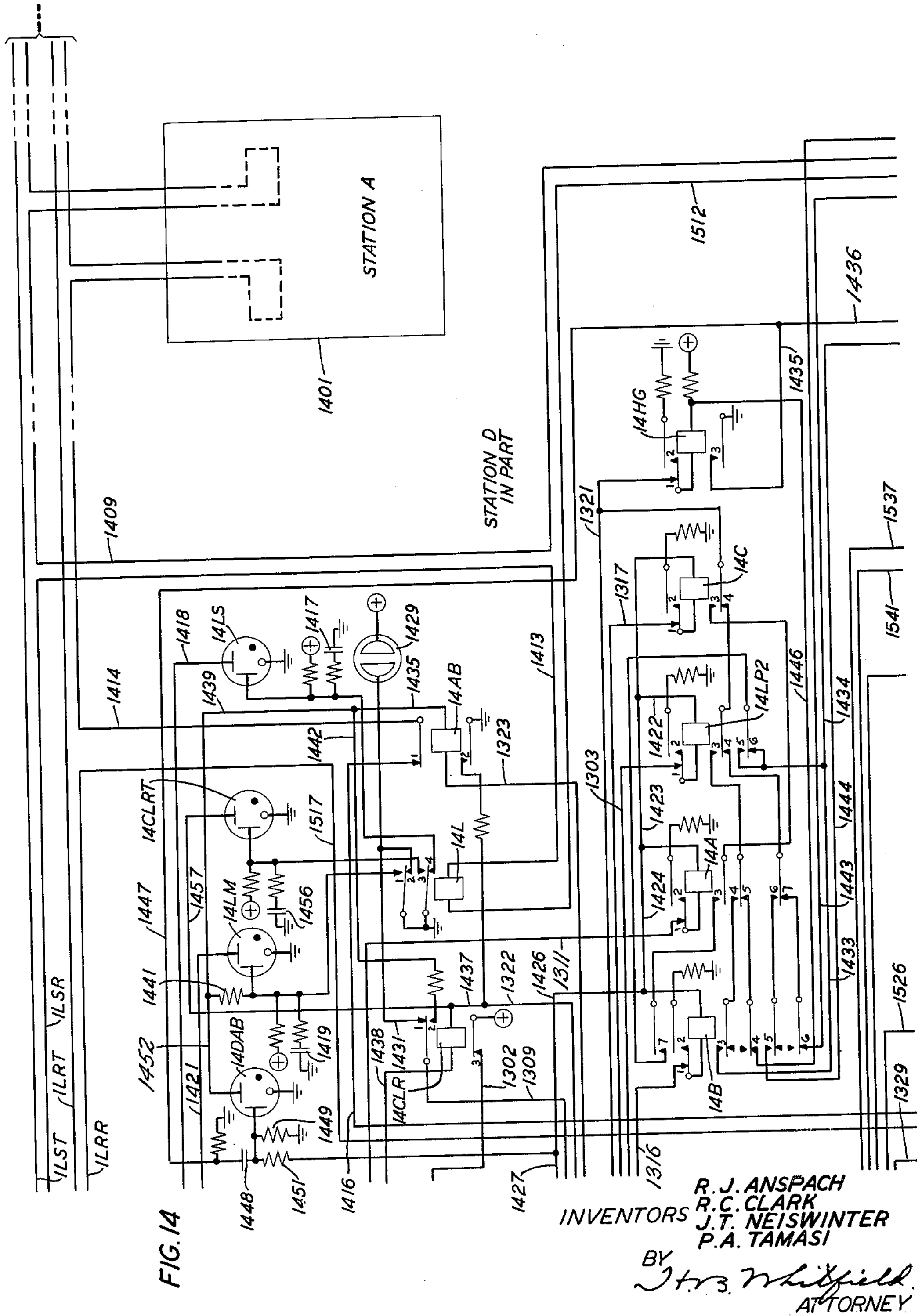
Figure 15:
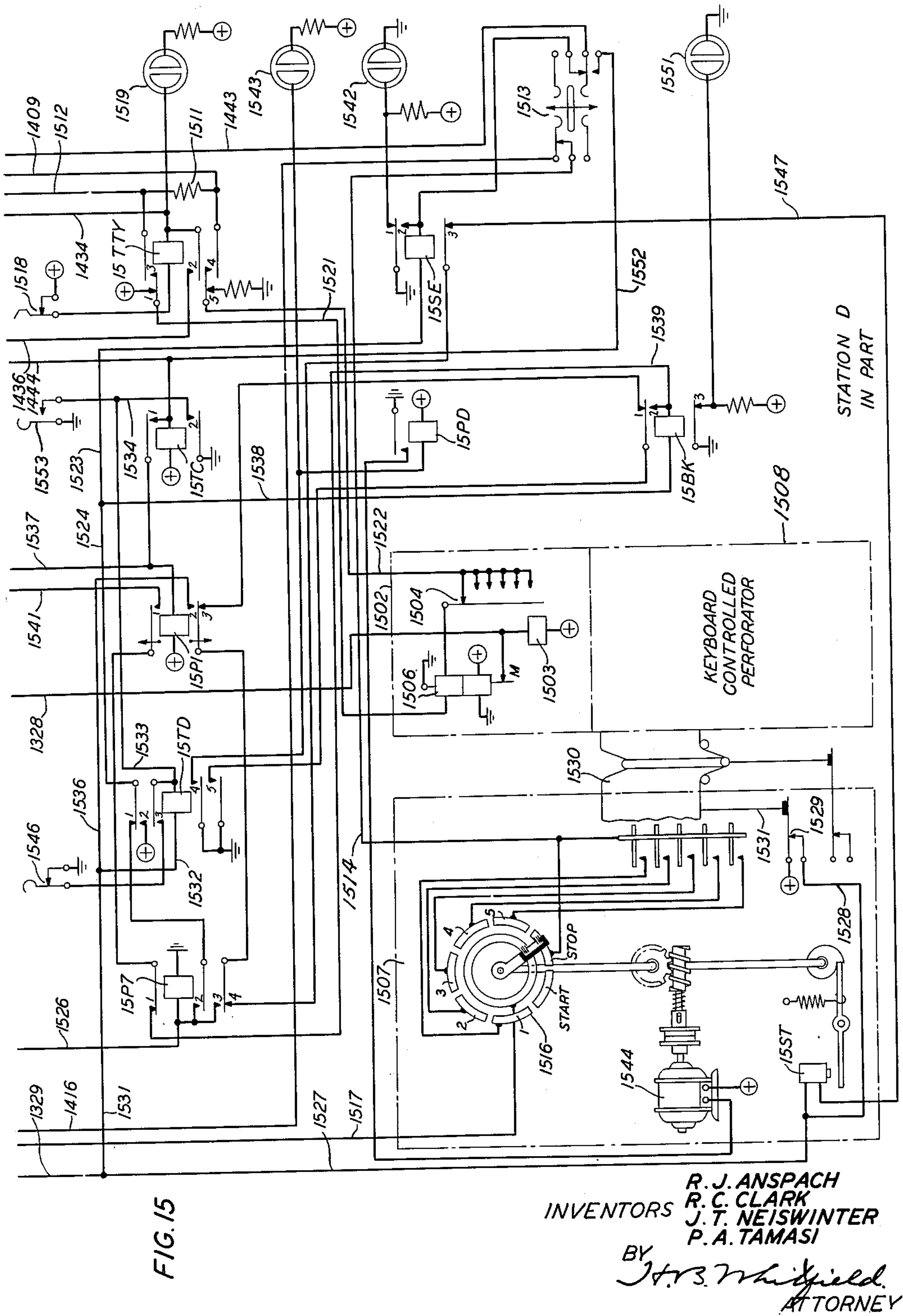
Figure 17:
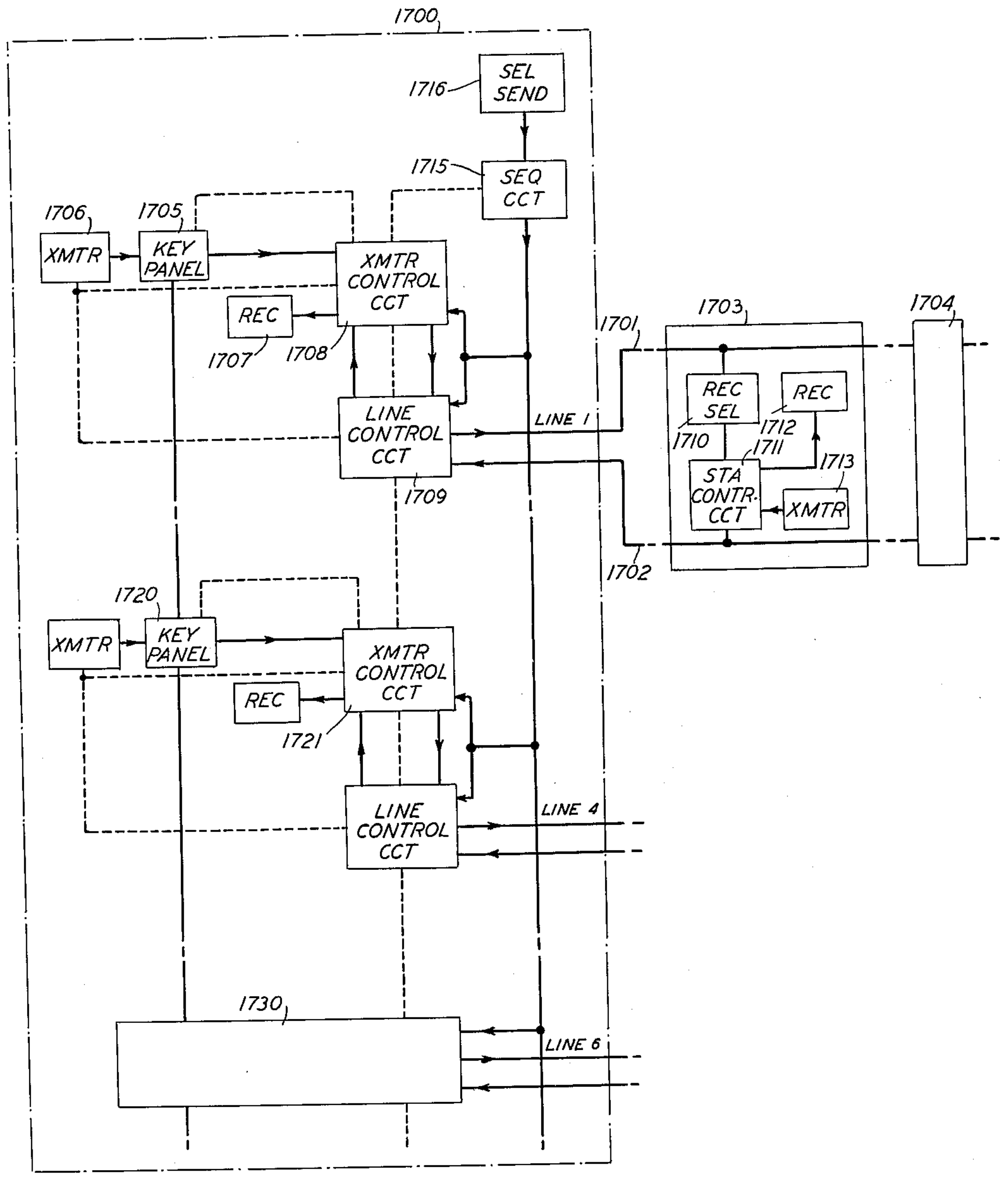

Figs. 13, 14 and 15, when arranged as shown in Fig. 1, show full duplex transmitting and receiving channels of any one of the multistation lines served by the relay center, together with the circuits of one of the stations on such multistation line; and Fig. 17 shows, in block form, the manner in which the equipment and control circuits of the relay center and the outlying stations cooperate.

Referring now to Fig. 17, a central station is indicated by block 1700. Extending from central station 1700 are a plurality of transmission lines of which line 1, line 4 and line 6 are shown. Line 1 which is typical of the plurality of lines includes sending channel 1701 and receiving channel 1702 which extend from central station 1700 to a plurality of outlying stations of which two, namely station 1703 and station 1704, are shown. Station 1703 is representative of the outlying stations and includes receiving selector 1710 which is selectively responsive to supervisory code signals received over sending channel 1701. Station control circuit 1711 functions to connect sending channel 1701 to receiver 1712, connect receiving channel 1702 to transmitter 1713 and impress answerback signals on channel 1702, in accordance with instructions from receiving selector 1710.

At central station 1700 and associated with line 1 is transmitter 1706 which is connectable to sending channel 1701 by way of key panel 1705, transmitter control circuit 1708 and line control circuit 1709. Receiver 1707 is connectable to receiving channel 1702 by way of line control circuit 1709 and transmitter control circuit 1708. The equipment and components associated with line 4, line 6, and each of the other lines are substantially identical with the equipment and components associated with line 1. In the case of line 6, these are represented by rectangle 1730.

Common to the plurality of lines are sequence circuit 1715 and selector sender 1716. Selector sender 1716 functions to generate and transmit code sequences comprising alternate mark and space signal elements having various durations.

If receiving channel 1702 is idle for a predetermined time, line control circuit 1709 bids for sender 1716. In the event that sender 1716 is available, sequence circuit 1715 activates sender 1716 to generate and transmit a search code, and line circuit 1709 connects the output of sender 1716 to sending channel 1701, blinds receiver 1707 to the reception of signals over receiving channel 1702 and stops transmitter 1706 if the transmitter is sending at this time. The search code generated by sender 1716 is thus transmitted over sending channel 1701.

At each of the outlying stations connected to line 1, receiving selector 1710 recognizes the search code. If transmitter 1713 has no message awaiting transmission, in which case it is not supplied with a message tape, the outlying station does not respond to the search code and, if no response is received at central station 1700, line circuit 1709 releases sender 1716 and retires until receiving channel 1702 is again idle for the above-mentioned predetermined time.

In the event that transmitter 1713 is supplied with a message tape, station control circuit 1711 impresses an answerback signal on receiving channel 1702. In response to the answerback signal, line control circuit 1709 instructs sequence circuit 1715 to reactivate sender 1716 and sender 1716 generates a transmitter start code, as determined by line control circuit 1709, to selectively start an outlying station transmitter on line 1. Assuming the transmitter start code selectively polls outlying station 1703, station control circuit 1711 impresses an answerback signal on receiving channel 1702 and starts transmitter 1713 if the transmitter is supplied with a message tape. Line control circuit 1709 in response to the answerback signal releases sender 1716. If a message is received following the answerback signal, line control circuit 1709 then retires and receiver 1707 records the message signals received from transmitter 1713.

In the event that transmitter 1713 is not started and receiving channel 1702 remains idle after the answerback signal, control circuit 1709 again bids for sender 1716 and, when sender 1716 is obtained, a second transmitter start code is transmitted to line 1 to poll the next outlying station. This process is continued until an outlying station transmitter which contains a message tape is found.

At the end of reception of the message from the outlying station transmitter 1713, receiving channel 1702 again becomes idle and line circuit 1709 again bids for sender 1716 to send the next transmitter start code sequence. When all the outlying stations have been polled and all the incoming messages have been transmitted from them to the central station, line control circuit 1709 bids for sender 1716 to again send the search code and the above-described sequence is repeated.

If it is desired to send messages from transmitter 1706 to outlying stations on line 1, the central station operator inserts tape in transmitter 1706 and operates the station keys of the addressee stations in key panel 1705. Transmitter control circuit 1708 now bids for sender 1716 and, if the sender is obtained, transmitter control circuit 1708 connects the output of sender 1716 to sending channel 1701 and blinds receiver 1707 to answerback signals. Sequence circuit 1715 activates sender 1716 which impresses receiver cut-on codes on sending channel 1701 in accordance with the operated keys in key panel 1705, pausing after each code sequence. Assuming the message is destined for station 1703, station control circuit 1711 impresses an answerback signal on receiving channel 1702 and connects receiver 1712 to sending channel 1701.

In response to the answerback signal, transmitter control circuit 1708 instructs sequential circuit 1715 to reactivate circuit sender 1716 to transmit the next cut-on code.

In the event an answerback is not receiving in response to a cut-on code, transmitter circuit 1708 instructs sender 1716 to send the cut-on code again. If the outlying station does not respond to the second transmission of the cut-on code, an alarm is raised and transmitter control circuit 1708 is disabled.

After all outlying station receivers have been called and responded, transmitter control circuit 1708 releases sender 1716, starts transmitter 1706 and retires. At the end of the message, when the tape runs out of transmitter 1706, transmitter circuit 1708 again bids for sender 1716 to send a disconnect code. Station control circuit 1711, in response to the disconnect code, disconnects receiver 1712 from sending channel 1701 and impresses an answerback signal on receiving channel 1702. In response to the answerback signal, transmitter circuit 1708 retires.

A multiple address message may be transmitted from transmitter 1706 over a plurality of lines. Assuming it is desired to send a message over line 1 and line 4, the central station operator inserts a tape in transmitter 1706 and operates appropriate keys in key panel 1705 associated with line 1 and key panel 1720 associated with line 4. Transmitter circuit 1708 and transmitter circuit 1721 both bid for sender 1716 and the cut-on codes for each of lines 1 and 4 are sent in sequence. At the end of the message the disconnect code is sent in sequence to each of the lines.

The format of this specification will be a description in detail of line 1 as illustrative of operation of any of the other lines, and an explanation of the interrelation of line circuits at the relay center and the functioning of equipment common to all lines. It will be assumed for the purpose of this description that the sending and receiving channels of line 1 are idle and no transmission or reception is taking place. Transmission inwardly to the relay center will first be described, beginning with the transmission of the search code to line 1 from the common sender. A station on line 1 will be assumed to have traffic, and automatic starting of transmission will then be described. After the message is received at the relay center, the transmission of this message outwardly, first to a station on the line 1, and second to stations on several lines including line 1, utilizing pushbutton selective station calling, will be described.

Simultaneous and intermittent sending and receiving over line 1 and the operation of the common sender and sequence circuit at the relay center will also be described.

The operation of circuitry at a particular outlying station will be described in detail as illustrative of all outlying stations of the system.

*Inward transmission to the relay center*

A line control circuit associated with each full duplex line terminating at the relay center determines the condition of the line receiving channel and is utilized to search for and bring in traffic from outlying stations. If a particular line receiving channel is idle and closed, a search code is sent over that line sending channel automatically. If an answer-back is received by the relay center, it indicates a transmitter has tape awaiting transmission at some outlying station. The answer-back initiates the automatic sequential transmission of transmitter start codes to all outlying stations on the particular line. A transmitter at an outlying station having traffic for transmission and responding to its transmitter start signal, will be started, and its message will come into the relay center. At the end of its message tape, the transmitter will stop. The relay center will then after a short period of time again send out another search code and attempt to find additional messages at outlying stations. To initiate the automatic search, transmitter start, and recepion sequence for a particular line, the operator at the relay center need only associate a reperforator with that line. In the following description the circuits of line one will be described as illustrative of all line circuits terminating at the relay center.

*Reperforator switching keys*

Figure 2:
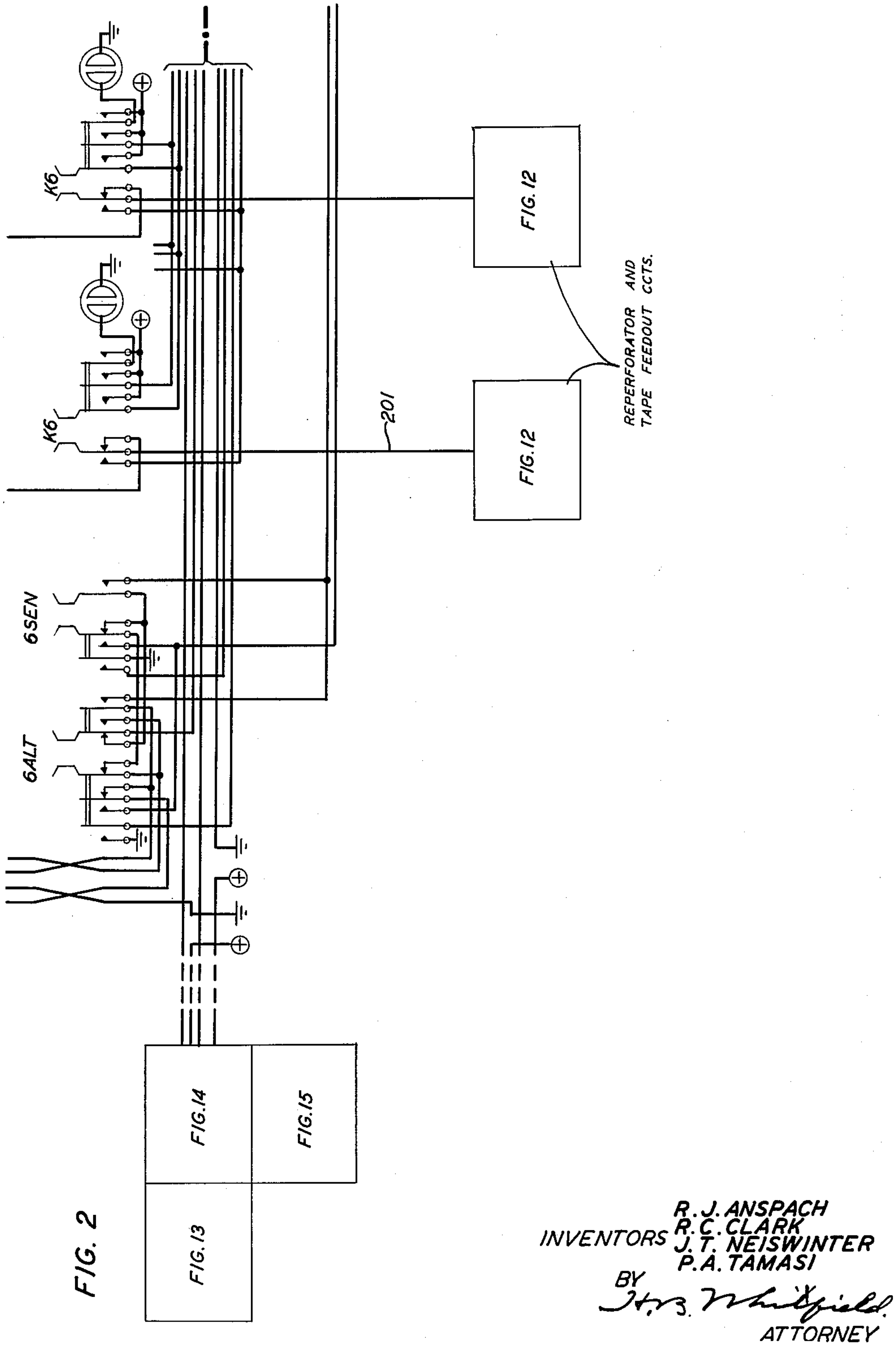
Figure 12:
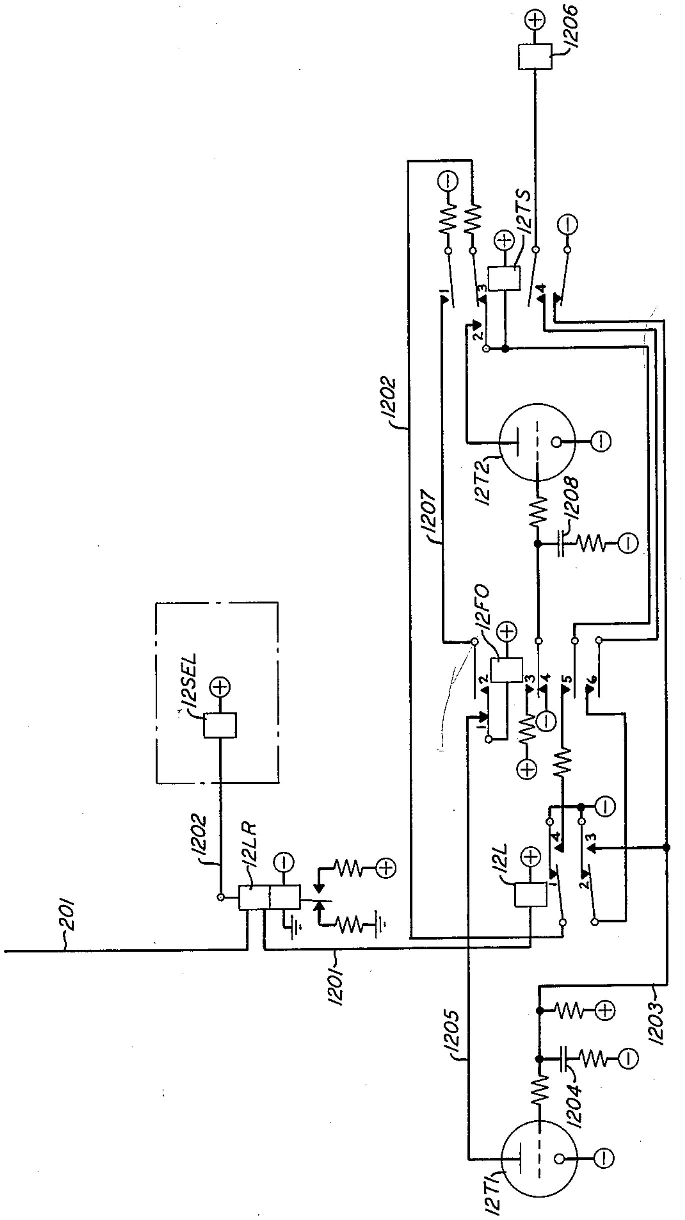
Fig. 12 shows schematically a receiving reperforator and control circuit, there being one such reperforator control circuit associable with each line served by the relay center, as indicated in Figs. 1 and 2.

In Figs. 1 and 2 two sets of reperforator switching key units are indicated as 1ROTR1, keys K1 to K6 and 1ROTR6, keys K1 to K6, with a lead from the sixth key of each row terminating in a reperforator and tape feedout circuit, Fig. 12. Two rows of keys are shown in detail, however, as indicated, additional key sets which operate and function identically are also provided, thereby affording six switching key units each of which is normally assigned to a particular one of the six reperforators associated with the relay center. The individual keys of each switching key unit are utilized to switch reperforators between line circuits, thereby to enable any one of the six reperforators, at the relay center, to be connected to any one of the six incoming lines. All switching keys of a particular unit, such as 1ROTR1, keys 1 to 6, are of the interlocking type in that operation of any key releases the previously operated key of the unit. A spare key, not shown, is provided for each unit and operates to release all keys in the event the reperforator need be disconnected from service. An indicator lamp, associated with each reperforator line key, as shown in Fig. 1, will be energized, when its associated key is depressed, over a path extending from positive battery, contact 5 of the key, and through the lamp to ground. The lamp provides an indication that one or more particular reperforators is in service on a particular one of the lines.

Since all reperforator switching keys perform similar functions, the connections resulting from the depression of 1ROTR1, key 1, will be described as illustrative. When key 1 is depressed, positive battery is connected (*a*) through contact 4 of key 1, over lead 1+LB, thence to the operating winding of the line bidding relay 6LBD of Fig. 6, the line control circuit; (*b*) through contact 3 to conductor 1+ST to the winding of stepping relay 7STP for selector bank 7B, Fig. 7; and (*c*) through contact 5 of key 1 to the lamp 101 which lights to advise the operator that reperforator 1 is in service in line 1. Accordingly, the depression of one of the line reperforator switching keys activates the line control circuit by applying operating potential to the windings of the stepping and bidding relays. This feature serves as a safeguard in that a transmitter start code cannot be transmitted over a line sending channel unless a reperforator is connected to that line receiving channel at the relay center.

A reperforator is normally blinded until unblinded and associated with the line receiving channel by the depression of a reperforator switching key. However once a reperforator is unblinded, it is still necessary that intermittent blinding occur during sending and reception of control signals, to prevent recording of spurious characters by the line reperforator.

A blinding ground is normally applied through contact 2 of any unoperated key, such as K1, 1ROTR1, thence through the unoperated contact 2 of all higher numbered unoperated keys K2 through K6 over lead 201, through the winding of the reperforator line relay 12LR, over lead 1201 and through the winding of relay 12L, Fig. 12, to positive battery, thereby to hold relays 12LR and 12L to marking. When a key, such as K1, is depressed, the blinding ground through contact 2 is removed from the path just traced and contact 1 of key 1 extends the path over conductor 1LMK, conductor 620, to contact 5 of line control relay 6LX. If relay 6LX is operated, the path continues over conductor 618, and conductor 8BL, to blinding contact (4) of the selector sender counting relay 11P7, Fig. 11, which will apply ground to relay 12LR when relay 11P7 is operated.

The selector sender of Fig. 11 will be discussed in detail hereinafter, however its operation is such that relay 11P7 will operate during the sending of control signals to the outlying stations and its operation will blind the reperforator to prevent the recording of answer-back signals from the outlying stations.

A receiving path for controlling the application of ground to the reperforator line relay 12LR extends over conductor 201, through the unoperated contact 2 of keys K2 to K6, through contact 1 of operated 1ROTR1, key K1, over conductor 1LMK, conductor 620, through contact 3 of receiving relay 6R to ground. Accordingly, a path is traced from the reperforator line relay to the marking contact (3) of line relay 6R, therefore, when line relay 6R is operated to its mark contact (3) by a marking signal from the receiving loop, it connects ground to the reperforator line relay 12LR winding and when the receiving line relay 6R is operated to space, ground is removed from the winding of the reperforator line relay 12LR. The select magnet 12SEL follows the line relay 12LR. The connected reperforator, therefore, follows the incoming line signals with the exception that the blinding path previously traced from the reperforator line relay to the selector sender will hold the reperforator line relay in the marking condition during the answer-back code reception period regardless of the position of line relay 6R during this interval. The reperforator is therefore blinded against extraneous printing during sending by the selector.

*Search code transmission*

Figure 6:
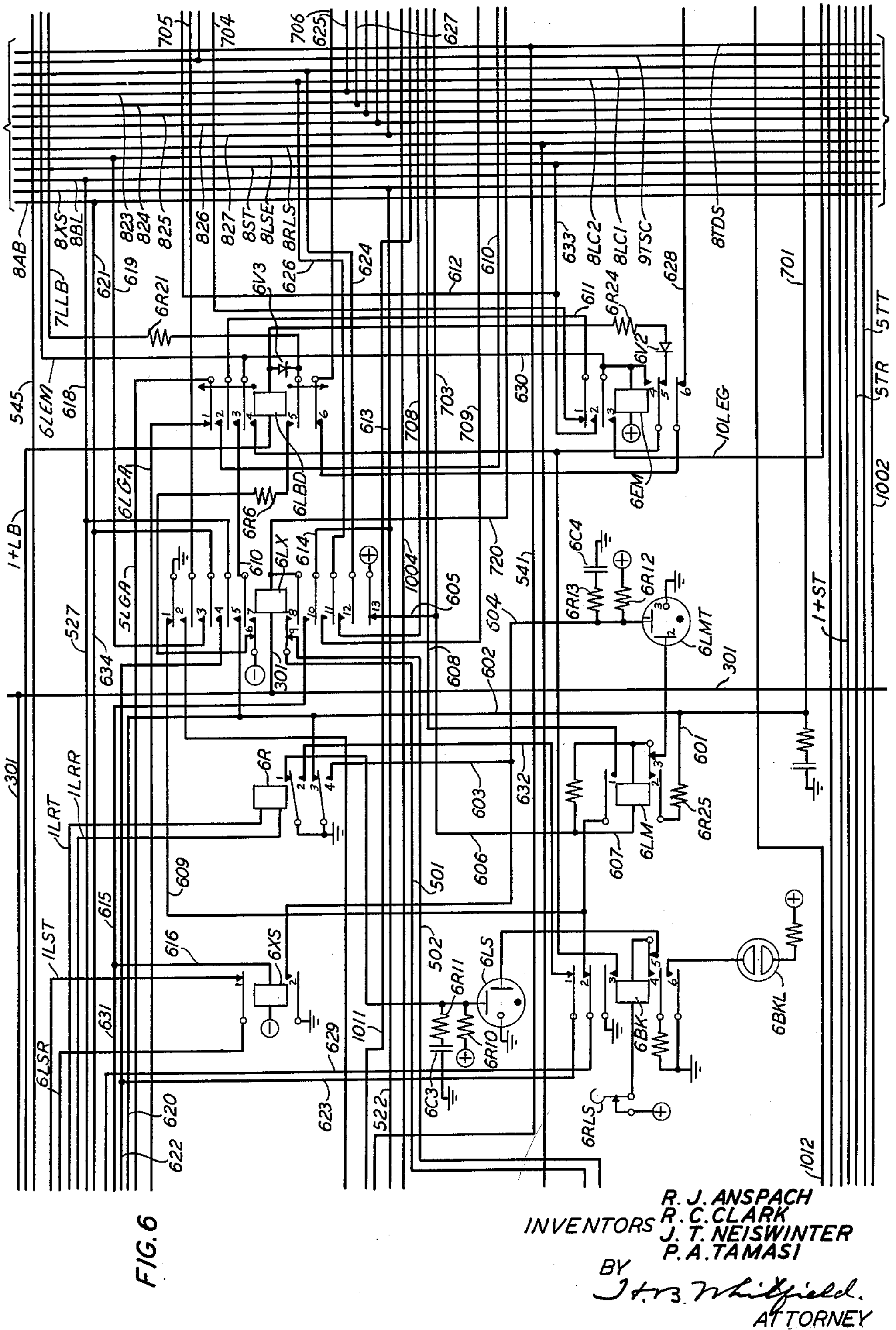

If the incoming line is idle and closed, the receiving channel at the relay center, conductors 1LRT and 1LRR, Fig. 1, will be completed through relay 1R, the line receiving relay of Fig. 6, shown operated to the marking condition. Bank 1 of stepping selector 7B, Fig. 7, which controls the sending of the search pattern, is at rest on step or terminal 11. With relay 6R energized and bank 1 of stepping selector 7B, on step 11, a circuit to the operating winding of relay 7SE, the search relay of Fig. 7, is completed from positive battery through the winding of relay 7SE, over conductor 700, through terminal 11 and wiper arm of selector 7B, bank 1, over conductors 701, 601 and 602, through contact 3 of relay 6R to ground.

Relay 6R, operated to marking by the idle line condition, removes ground at its No. 4 contact from a path extending over conductors 603 and 604 to the starting anode 1 of timing tube 6LMT, the long mark timing tube of Fig. 6. Positive battery, therefore, is applied to the starting anode 1 of tube 6LMT through resistor 6R12. The timing circuit composed of resistor 6R13 and capacitor 6C4 will cause tube 6LMT to fire at the end of 2½ seconds, providing ground is not reapplied by the No. 4 contact of relay 6R in response to a busy line condition. Conduction in tube 6LMT will operate relay 6LM, the long mark relay, by completing an operating path from positive battery, through contact 13 of released relay 6LX, the line control relay, Fig. 6, over conductors 605, 606 and 607, through the winding of relay 6LM, contacts 2 and 3 of relay 6LM, and the plate 2 and cathode 3 of operated tube 6LMT to ground. Relay 6LM operates and completes a self-locking path to ground through its contact 2, resistor 6R25, conductor 602, and contact 3 of relay 6R. In addition, the operation of relay 6LM opens the operating path for tube 6LMT by grounding plate 2 of tube LMT through lower contacts 2 and 3 of relay 6LM over its self-locking path.

Figure 7:
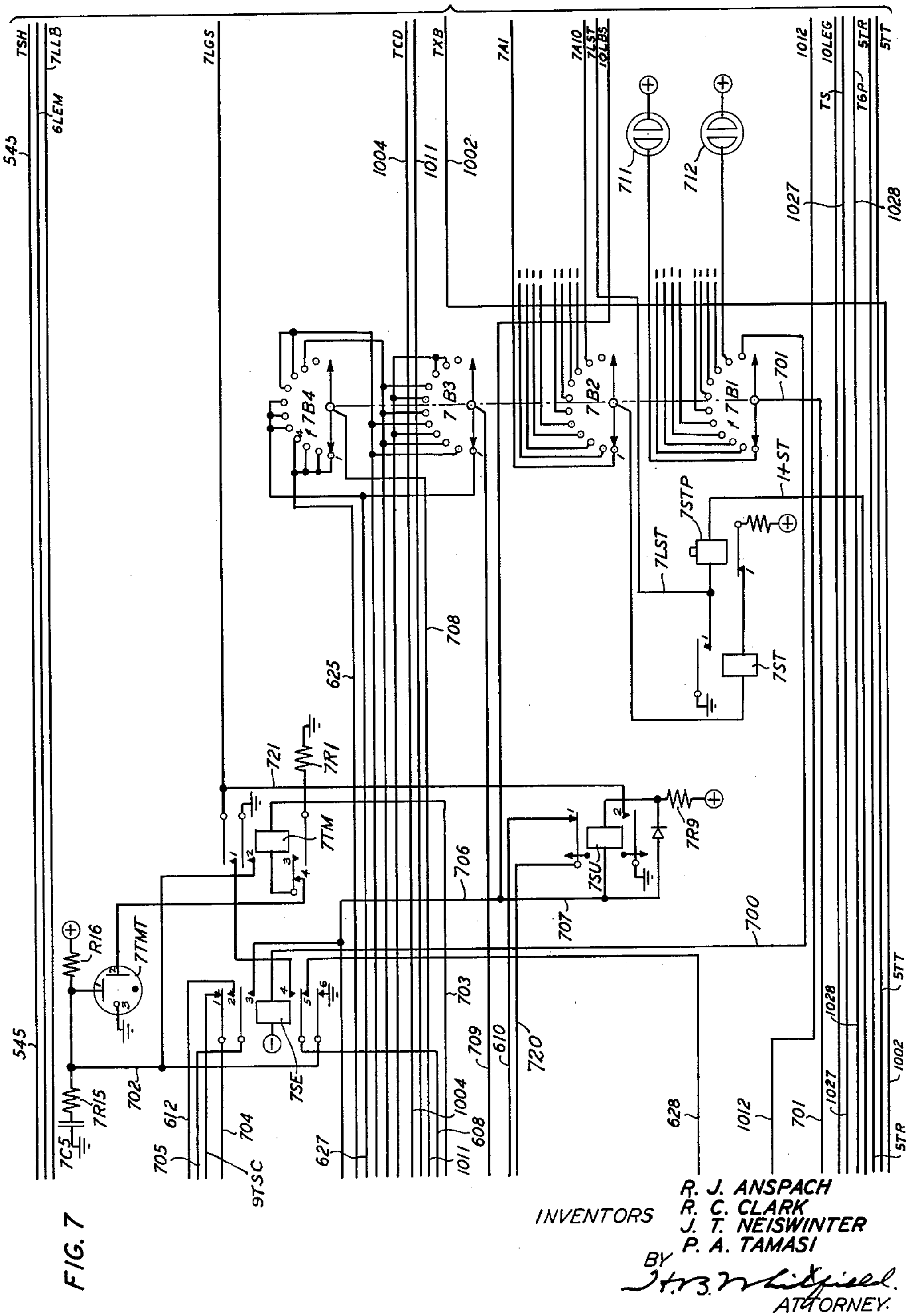

Operation of search relay 7SE removes the ground from the starting anode of timing tube 7TMT, Fig. 7, which is normally applied over conductor 702, from contact 6 of relay 7SE. If ground is not reapplied to starting anode 1 of tube 7TMT by a release of relay 7SE within a predetermined time established by the timing circuit composed of capacitor 7C5 and resistor 7R15, tube 7TMT will become conductive and operate relay 7TM. The operating path for relay 7TM is traced from ground, through cathode 3 and plate 2 of tube 7TMT, contacts 4 and 3 of relay 7TM, the winding of relay 7TM, over conductors 703 and 605, and through contact 13 of relay 6LX, Fig. 6, to positive battery. Relay 7TM, in operating, locks through its contact 3, and resistor 7R1 to ground and extinguishes tube 7TMT by applying ground through its No. 2 contact over conductor 702 to the starting anode 1 of tube 7TMT.

As will be later explained, the circuitry of tube 6LMT establishes the timing between transmitter start code transmission and the circuitry of tube 7MT establishes the timing between search code transmission.

After relays 7SE, 6LM and 7TM have operated, an operating path is completed for relay 6LBD, Fig. 6, to operate and bid for the selector sender. The operating path for this relay extends from Fig. 1, positive battery, through contact 4 of depresesd key K1, ROTR1 over conductor 1+LB, through the winding of relay 6LBD, varistor 6V3, resistor 6R21, over conductors 7LLB and 1001, through contact 9 of key 10MA, Fig. 10, contact 5 of key 10MAN, conductor 7LGS, No. 1 contact of operated relay 7TM, No. 4 contact of operated relay 7SE, conductor 608, contact 1 of operated relay 6LM, conductor 609, contact 1 of unoperated relay 6LX to ground. Relay 6LBD, upon operating, locks in a path extending from positive battery ROTR1 key 1, Fig. 1, conductor 1+LB, winding of relay 6LBD, varistor 6V3, contact 5 of operated relay 6LBD, resistor 6R6, contact 6 of unoperated relay 6LX to negative battery.

Figure 3:
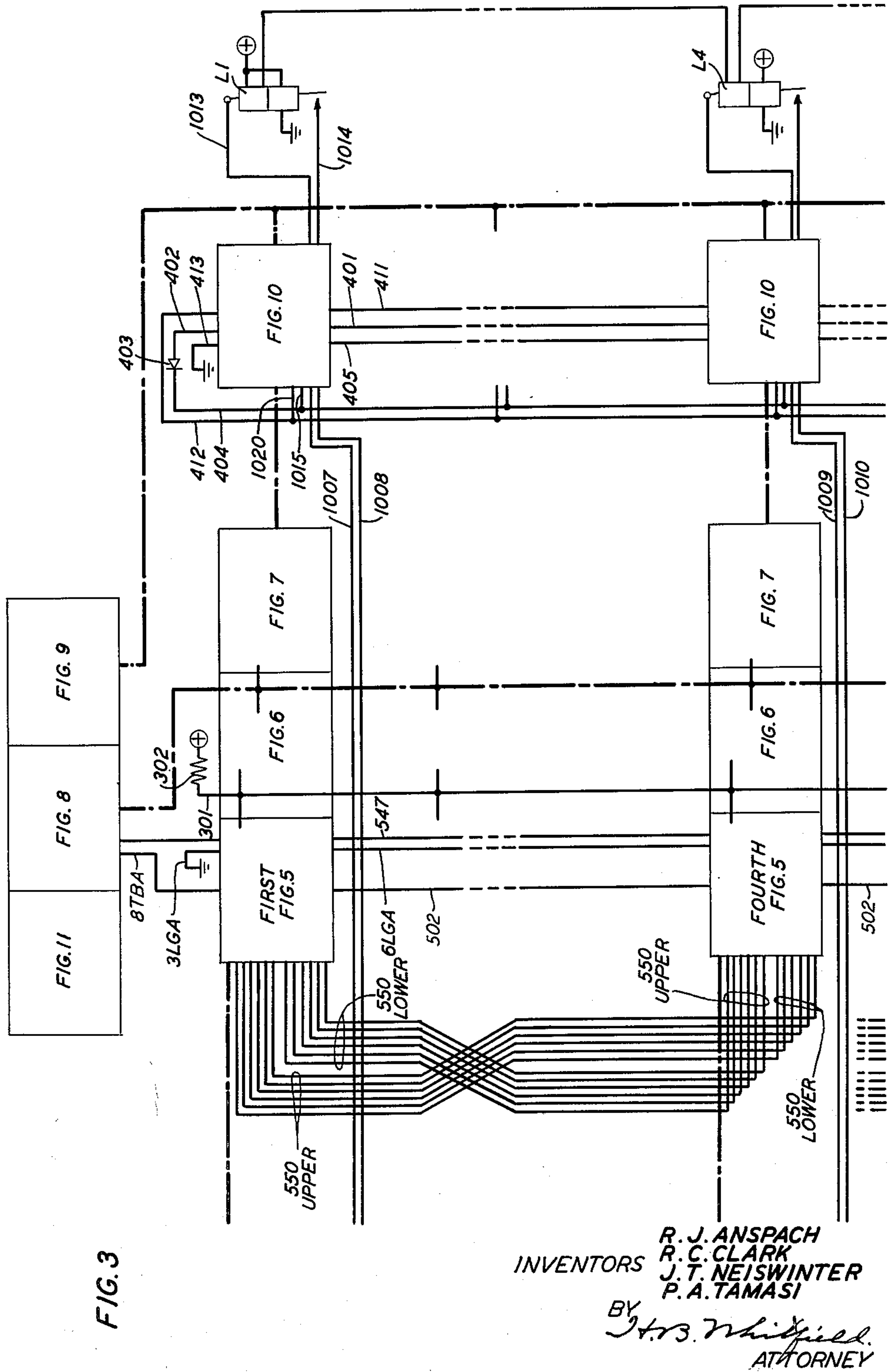
Figure 5:
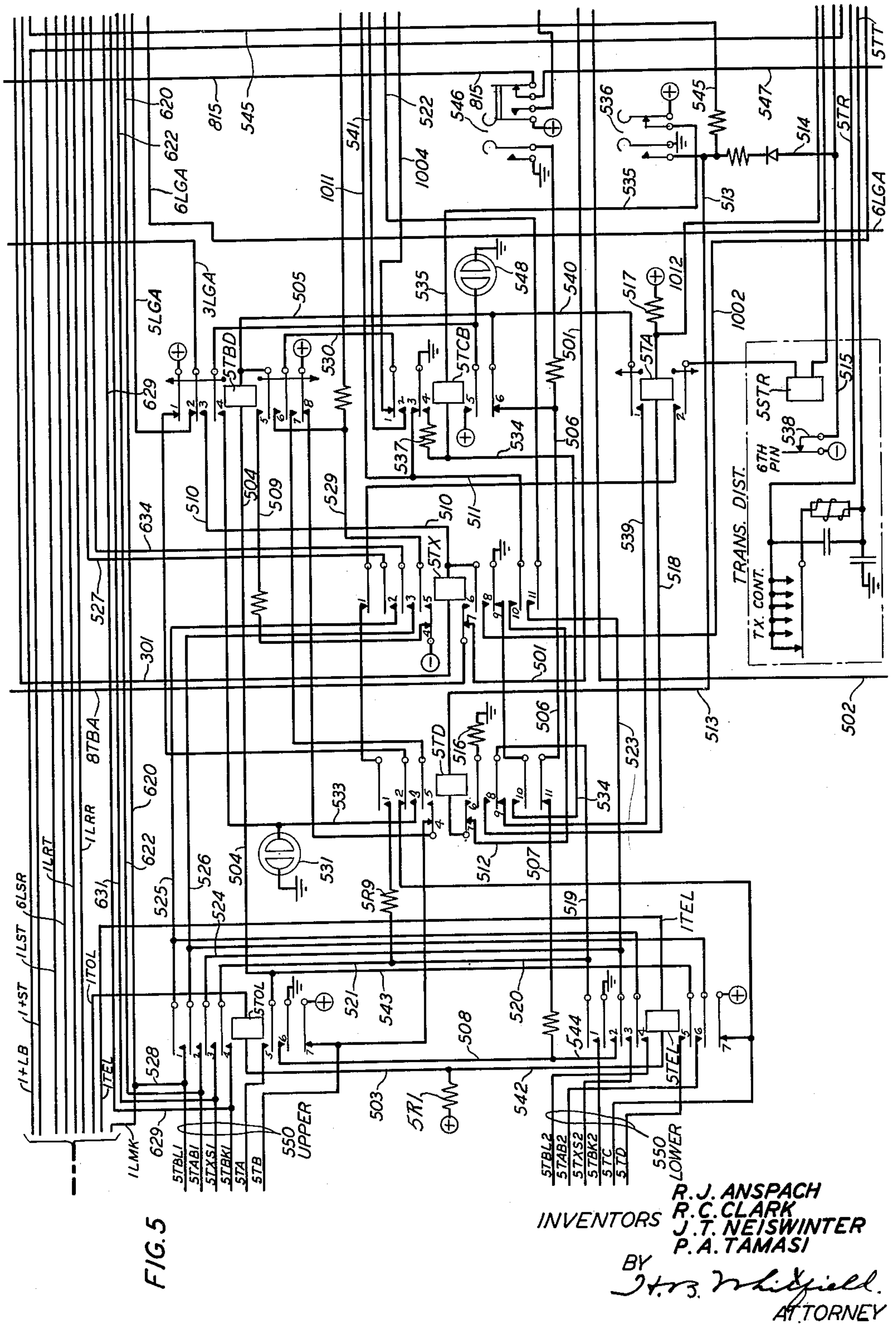

The operation of relay 6LBD opens at its No. 1 contact the common ground circuit LGA shown as originating in Fig. 3 and extending over conductor 3LGA through contact 2 of relay 5TBD thence over conductor 5LGA, through contact 1 of relay 6LBD and continuing over conductor 6LGA to loop through the Nos. 2 and 1 contacts of relays TBD and LBD, respectively, of the Figs. 5 and 6 circuits of the other five lines. This interruption of the common ground circuit will prevent other line circuit relays from operating and bidding for the use of the common selector sender.

Operation of relay 6LBD permits the energization of relay 6LX, Fig. 6, by completing an operating path from positive battery, Fig. 3, resistor 302, conductor 301, through the winding of relay 6LX, over conductor 720 through contact 1 of unoperated relay 7SU, over conductor 610 through contact 2 of operated relay 6LBD and over common ground conductor 5LGA through contact 24 of unoperated relay 5TBD and over conductor 3LGA to ground, shown in Fig. 3. It is apparent from the foregoing that the LX relays in the control circuits of the other lines are prevented from operating due to the fact that energization of relay 6LBD in line control circuit 1 had opened the common ground path required for operation of the LX relays in the other line control circuits.

The operation of relay 6LX removes positive battery from the operating path of relay 6LM by opening its contact 13 which had previously put battery in series with conductors 605, 606, 607, and the winding of relay 6LM. The opening of contact 13 of relay 6LX also removed positive battery from the serial path of conductors 605 and 703 to the operating winding of relay 7TM. Therefore, relays 6LM and 7TM release and await reenergization by their timing circuits.

Relay 7SE remains operated in a path traced from negative battery through the winding of relay 7SE to the wiper arm and No. 11 terminal of selector bank 7B1 over conductors 701, 601 and 602 and through contact 5 of operated relay 6LX, over conductors 618 and 8BL through contact 4 of operated relay 11P7 in the selector sender to ground.

*Search code transmission*

The operated 6LX relay of the line 1 control circuit activates the common sending selector before relay 6LBD of the No. 1 line control circuit releases to allow the line control circuits of other lines to attempt to seize the sending selector.

Relay 6LX, upon operating, locks, activates the sending selector, and releases relay 6LBD. The locking path is completed from positive battery, Fig. 3, through resistor 302, conductor 301 and the winding and contact 8 of relay 6LX, over conductor 501, through contacts 6 and 7 of unoperated relay 5TX, over conductor 8TBA through contact 1 of unoperated relay 8BA, Fig. 8, to negative battery. This negative locking battery applied to relay 6LX effectively shunts down the operating positive battery via lead 301 for the other LX relays and the TX relays of the transmitter control circuits to prevent their operating. The manner in which the other LX and TX relays are shunted down is explained in greater detail, hereinafter, relative to the description of the operation of relay 5TX.

The search code pattern consists of a first long pulse and a series of short pulses. Leads 1143 to 1147 of the sender will have condensers 8C15 and 9C14 applied thereto during the sending of transmitter start and receiver connect codes, thereby to vary the length of pulses after the first in a code pattern. However, during the search process, leads 1143 to 1147 are open and the sender transmits a short pulse code after activation.

The activation of the common selector sender is accomplishhed by the application of negative battery, through contact 7 of operated relay 6LX, Fig. 6, over conductor 610 through contact 3 of operated relay 6LBD, over conductor 611 through contact 1 of unoperated relay 6EM, over conductor 704 through contact 2 of operated relay 7SE, Fig. 7, over conductors 612, 633 and 8ST and 1101, through resistors 1130 and 1100 to the starting anode 1 of tube 11STC. Tube 11STC will fire and operate relay 11ST over a path extending from ground, through the tube over conductor 1128 through contacts 5 and 6, and the winding of realy 11ST to positive battery, through the normally closed contact of relay 11CLR.

A complete description of the selector sending unit will be given hereinafter, however, after activation as described immediately above, the sending unit transmits to the line a search code which will be responded to by an acknowledgment signal from an outlying station in the event that station has tape awaiting transmission in its transmitter gate.

Also during a master connect code, relay 8MC will be operated to complete at its contacts 1 and 2, a path for timing condensers 8C15 and 9C14 to be applied to the grids of triodes 11TMH and 11TSH, thereby to lengthen all pulses of a master connect code. During the search code, relay 8MC is released and timing condensers 8C15 and 9C14 are not applied to the grids of tubes 11TMH and 11TSH. Relay 11TS is the transmitting relay of the selector sender, and in accordance with the search code, it will close and open its associated contact 4 to apply and remove ground from a path extending over conductors 8XS, 613 and 614, and through contact 10 of operated relay 6LX over conductors 615 and 616, through the operating winding of relay 6XS, the line sending relay, to negative battery. Therefore, relay 6XS of Fig. 6 will follow relay 11TS. Contact 1 of relay 6XS will open and close the transmission loop extending from contact 1 of relay 6XS, over conductor 1LST to the outlying stations, and returning on conductor 1LSR, Fig. 1, thence over conductor 101 through contact 3 of alternate key 4, thence over conductor 102 through contact 4 of alternate key 1, through contact 3 of send key 1, thence through contact 5 of alternate key 1, and over conductor 6LSR and to contact 1 of relay 6XS.

Thus the line send relay 6XS repeats over the line sending channel the search code established by the selector sender sending relay 11TS. The receiving relay 6R will follow the code pulses sent over the line transmission channel when they return on the receiving channel consisting of conductors 1LRT and 1LRR. Relay 11ST of the selector sender, upon operating, (*a*) locks through its No. 5 contact to ground, (*b*) extinguishes tube 11STC by removing battery from the plate at the No. 6 contact of relay 11ST, and (*c*) removes at its No. 1 contact positive battery normally applied over conductor 801 to one side of relay 8ST. The other side of normally operated relay 8ST is chain-connected through contact 5 of relay 11MC, over conductor 901 through the No. 6 contact of normally released relays 9J, 9A and 9TSC, over conductor 802, through the No. 4 contact of released relay 8DS, over conductor 902, through contact 5 of relay 9DISC released, conductor 911, through contact 2 of released relay 8AB to ground. Therefore, normally operated relay 8ST was released by the removal of positive battery from the operating path just described at contact 1 of operated relay 11ST. The release of relay 8ST, Fig. 8, will apply negative battery through its No. 3 contact to lead 8TBA; and through its No. 4 contact to the winding of relay 8BA and ground, thereby operating relay 8BA. The operation of relay 8BA will remove a source of negative battery from lead 8TBA by the opening of its contact 1. The operation of relay 11ST also performs other functions which will be completely discussed in a later discusion of the sender operation in detail.

*Auxiliary battery relay 8BA*

Relay 8BA is used to furnish locking negative battery to the transmitter and line control relays 6LX and 5TX in such a manner as to coordinate their operation with the sequence circuits operation. Relay 8BA is directly under control of the relay 8ST, and with relay 8ST operated and the circuit idle, relay 8BA is released. When relay 8ST releases, negative battery is applied through its contact 4 through the winding of relay 8BA to ground, thereby operating relay 8BA.

When relay 8BA is released, negative battery on lead 8TBA comes through contact 1 of relay 8BA. When the relay 8BA is operated and the relay 8ST is released, negative battery for the 8TBA lead comes from the No. 3 contact of relay 8ST released.

There is no interruption of the application of negative battery to lead 8TBA when relay 8ST releases, and the relay 8BA operates. However, the battery is interrupted when the relay 8ST operates, and the relay 8BA releases due to the fact that the relay 8BA is a slow-release relay. The relay 8ST operates and removes the negative battery at its No. 3 contact, and the lead 8TBA is opened until relay 8BA completes its slow release at its No. 1 contact.

Therefore, the relays 8ST and 8BA combination removes negative battery momentarily from lead 8TBA when relay 8ST operates, but not when relay 8ST releases. Accordingly, the release at this time of relay 8ST does not effect the locking path for relay 6LX, previously traced, which terminates at negative battery over conductor 8TBA.

The answer-back code signal transmitted by the outlying stations consists entirely of spacing pulses. If no answer-back is received, relay 11CLR of Fig. 11, will be operated after a predetermined period, as will be explained later, thereby to interrupt at its No. 7 contact, the locking path previously traced for relay 11ST. The release of relay 11ST will reapply, at its No. 1 contact, positive battery to conductor 801 which will reenergize relay 8ST, Fig. 8, over a path to ground previously traced. The operation of relay 8ST, as a result of a no answer-back response, will momentarily remove negative battery from lead 8TBA, as previously discussed. The locking path for relay 6LX extends from positive battery through the winding and No. 8 contact of operated relay 6LX, over conductor 501, through contacts 6 and 7 of released relay 5TX to lead 8TBA, Fig. 8. Accordingly, the momentary removal of battery from lead 8TBA by the operation of relay 8ST will open the locking path of relay 6LX, thereby releasing relay 6LX. The release of this relay restores the circuit to its idle rest condition, and it will again time out before repeating the search operation described hereinafter.

*Automatic transmitter start code transmission*

An answer-back signal received in response to the search code by the sending selector indicates that a transmitter at an outlying station on line 1 has tape awaiting transmission. The answer-back signal will initiate the transmission of transmitter start codes in sequence until the station having tape in the transmitter gate is located, at which time the outlying station transmitter will start and the message will come into the relay center.

Figure 8:
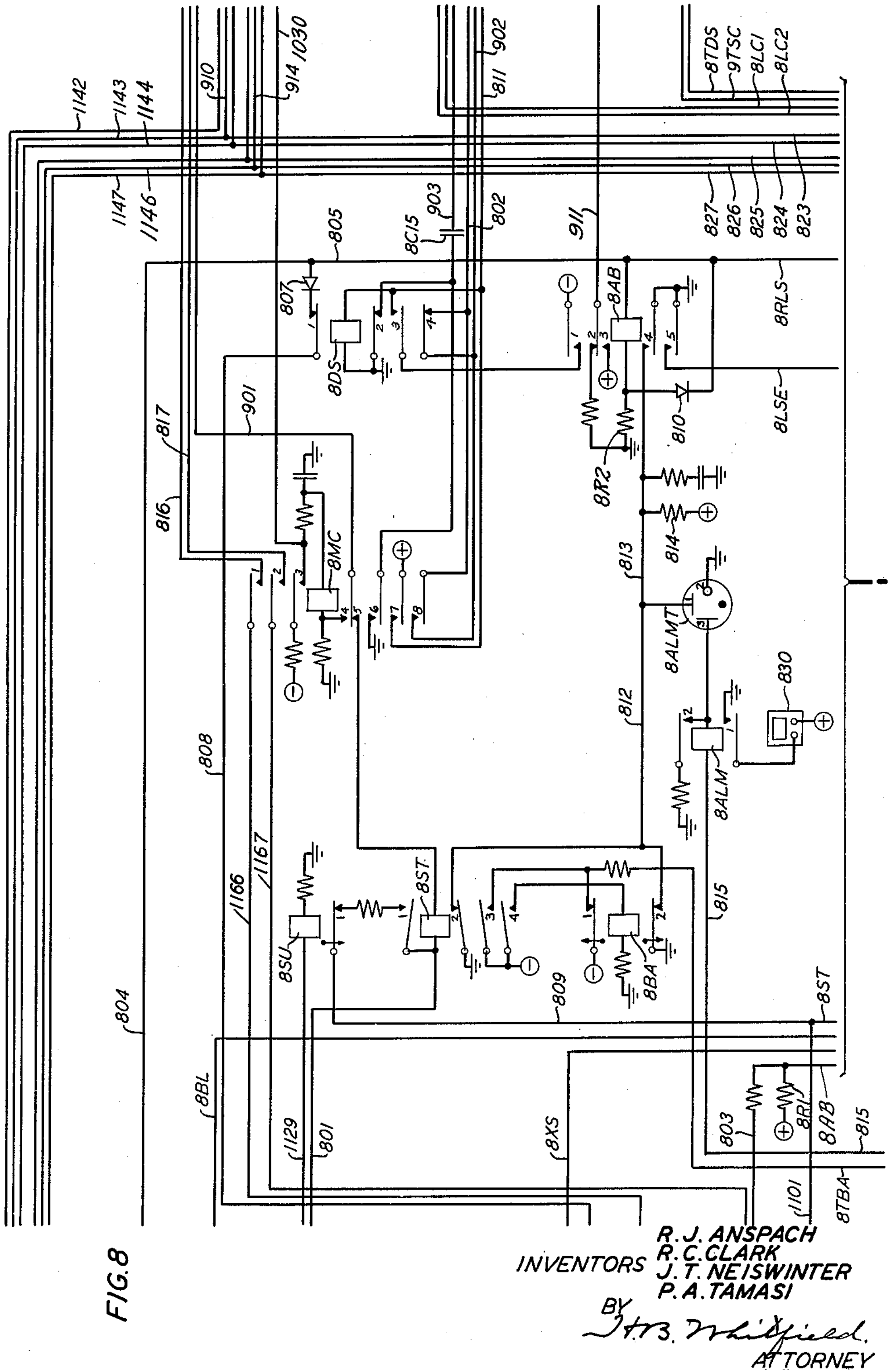
Figs. 8 and 9 show a common sequence circuit which may be brought into cooperation with each of the lines served by the relay center.
Figure 11:
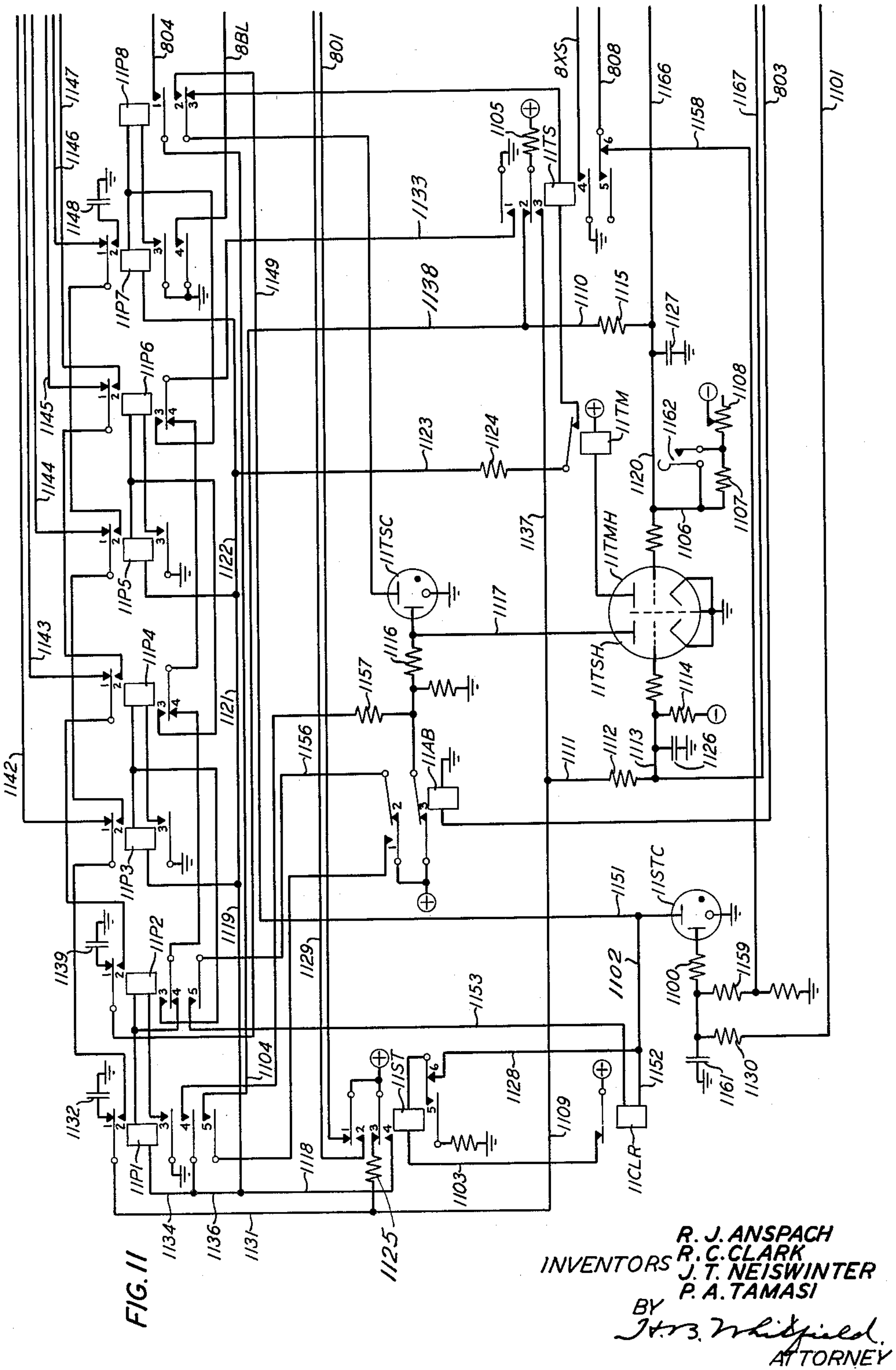
Fig. 11 shows the circuit of a sending selector which is adapted to cooperate with any of the lines served by the relay center, as determined by the common sequence circuit in Figs. 8 and 9.

If an answer-back signal is received, the selector sender clearing relay 11CLR, Fig. 11, will not be energized, therefore, relay 11ST, Fig. 11, will remain operated and relay 8ST, Fig. 8, will remain released, and there will be no momentary removal of negative battery from conductor 8TBA or the locking path of relay 6LX, therefore, relay 6LX will remain operated. In addition, relay 7SE is operated and the stepping selector 7B is still on step 11 of bank 1.

Referring to Fig. 11, the selector sender circuit, the answer-back relay 11AB, is normally operated over a path extending from ground through the winding of relay 11AB over conductor 803, through resistor 8R1 to positive battery. However, another path is in series with the winding of relay 11AB and in parallel with the positive battery and resistor 8R1 circuit, and extends from the junction of conductor 803 and resistor 8R1, over lead 8AB, conductor 621, through the No. 4 contact of operated relay 6LX, over conductors 622 and 623, through the No. 1 contact of unoperated relay 6BK, conductor 632 and through the No. 2 contact of relay 6R released, to ground. Inasmuch as the answer-back signal consists of an all spacing signal, the receiving relay 6R will remain released during the answer-back period, and accordingly ground will be placed at the junction of conductor 803 and resistor 8R1 of Fig. 8, over the path just traced, thereby to shunt the positive battery in series with resistor 8R1 to ground, and release the 11AB relay. The operation of the sender circuit, Fig. 11, is such that relays 11P1 and 11P8 will be operated during the period that the answer-back signal is received.

Accordingly, the release of relay 11AB, in response to the answer-back signal, will cause the operation of relay 8AB, Fig. 8, over an operating path extending from positive battery through the No. 1 contact of released relay 11AB, through the No. 5 contact of operated relay 11P1, over conductor 1104 through contact 1 of operated relay 11P8, over conductors 804 and 805, through the winding of relay 8AB, resistor 8R2 to ground. Relay 8AB, upon operating, will apply ground through its No. 5 contact over conductors 8LSE and 619, through contact 3 of operated relay 6LX, over conductor 705, through the No. 3 contact of operated relay 7SE, over conductor 706, to the junction of conductors 10LBS and 707. One side of this junction ground is continued over conductor 707, through the winding of relay 7SU, and resistor 7R9 to positive battery, thereby operating relay 7SU. The other path is continued from conductor 706 over conductor 10LBS, through the Nos. 2 and 3 contacts of unoperated key 10MAN, Fig. 10, thence over conductor 7LST to one side of relay 7STP, through the winding of relay 7STP, over conductor 1+ST to positive battery connected to conductor 1+ST in Fig. 1, through the operated ROTR1 key K1, thereby operating relay 7STP.

Accordingly, an answer-back to the search code operates (*a*) the 7SU relay which will initiate the sending of transmitter start codes to the line, and (*b*) the step relay 7STP of selector bank 7B which will step once when the relay 7STP is later released.

The receipt of the answer-back, as will be explained later, releases the counting chain in the sender circuit, Fig. 11, therefore, relay 11P7, in releasing, removes ground at its No. 4 contact from the locking path for relay 7SE extending over conductor 8BL, conductor 618, contact 5 of operated relay 6LX, conductors 617, 602, 601, and 701 through the wiper of selector bank 7B1, Fig. 7, over the No. 11 terminal of bank 1, selector 7B, through lead 700 and the winding of relay 7SE to positive battery. Accordingly, search relay 7SE will release.

As the operation of relay 8AB, Fig. 8, the answer-back relay of the sequence circuit, was momentary, it releases at the end of the answer-back signal. The operation of relay 7SU, Fig. 7, was also of a momentary nature, however, it effected the operation of relay 6LBD by applying ground at its No. 2 contact over conductor 7LGS, through the No. 5 contact of unoperated key 10MAN, Fig. 10, through contact 9 of key 10MA, over conductors 1001 and 7LLB, through resistor 6R21, varistor 6V3, through the winding of relay 6LBD and over conductor 1+LB to positive battery, Fig. 1. Accordingly, relay 6LBD operates and locks.

The release of relay 8ST, in response to the answer-back signal, momentarily removes battery from lead 8TBA, as previously described, therefore the locking path for relay 6LX is opened momentarily. However, an operating path is closed from positive battery through the winding of relay 6LX, over conductor 720, through the No. 1 contact of relay 7SU which momentarily operated and is now released over conductor 610 through contact 2 of operated relay 6LBD, over conductor 5LGA, through the No. 2 contact of relay 5TBD, and over the 3LGA conductor to battery, Fig. 3. Accordingly, relay 6LX is held operated until its normal locking path is restored.

Figure 9:
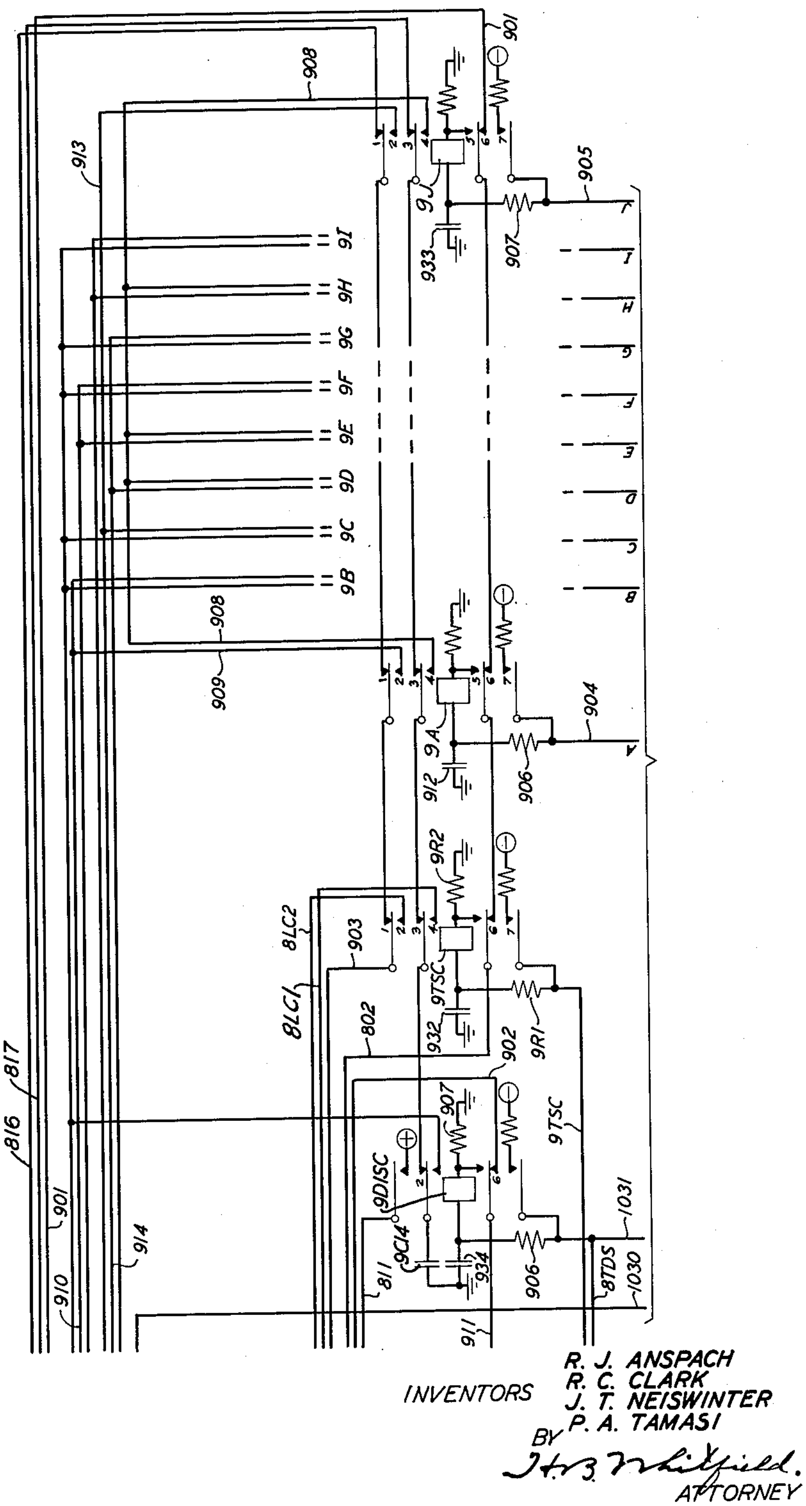

The reoperated line control relay 6LX performs many functions including the opening of the locking path of slow-release relay 6LBD, the operation of the transmitter start code relay 9TSC of the sequence circuit to activate the sender, Fig. 11, the closing of paths for timing capacitors 8C15 and 9C14 in the sequence circuit, Fig. 9, so that the proper pulses of the sender code will be lengthened to send out transmitter start codes, the blinding of the reperforator during the period of sending out start code patterns, and the preparing of the answer-back circuit so that answer-backs to the transmitter start code patterns can be recognized. These functions will be discussed in detail.

The locking path of slow-release relay 6LBD extending from positive battery over the 1+LB lead, through the winding of relay 6LBD, through varistor 6V3, through contact 5 of relay 6LBD, through resistor 6R6, and through contact 6 of the unoperated relay 6LX to negative battery, is interrupted by the operation of relay 6LX.

The transmitter start code relay 9TSC of Fig. 9 is operated from negative battery through contact 7 of relay 6LX, over conductor 610, through contact 3 of slow-release relay 6LBD, over conductor 611, through contact 1, unoperated relay 6EM, over conductor 704, through contact 1 of released relay 7SE, over conductor 9TSC, through resistor 9R1, the winding of relay 9TSC, and resistor 9R2 to ground.

Relay 9TSC locks to negative battery through its No. 7 contact. The chain ground circuit, which normally holds relay 8ST operated over a path extending from ground on contact 2 of relay 8AB, over conductor 911, contact 6 of relay 9 DISC, conductor 902, contact 4 of relay 8DS, conductor 802, through the No. 6 contact of unoperated relays 9TSC and 9A to 9J, over conductor 901, contact 5 of relay 8MC, winding of relay 8ST, conductor 801, contact 1 of relay 11ST to positive battery, is opened by the operation of transmitter start relay 9TSC. Relay 8ST releases and applies positive battery from lead 801 through its contact 1 over conductors 809 and 1101 via contact 1 of relay 8SU to the starting anode of tube 11STC which will fire and operate starting relay 11ST to start the selector sender action.

At this time, timing capacitors in the sequence circuit are connected in series with the pulse generating circuit of the sender and their functioning in the sequence circuit and in the sender will be discussed in detail hereinafter. Condenser 9C14, Fig. 9, and condenser 8C15, Fig. 8, are the timing condensers.

The operation of relay 9TSC does not connect condensers 8C15 and 9C14 directly to leads 1142 through 1147 of the selector sender, Fig. 11, as to do code relays 9A and 9J, but connects these condensers over leads 8LC1 and 8LC2 to the stepping selector bank 7B of Fig. 7 in the line control circuit where the pulse length and sequence of transmitter start codes is determined. The paths for applying condensers 9C14 and 8C15 to the input leads 1143 through 1147 of the selector sender will now be traced. In Fig. 9 ground, through condenser 9C14, through contact 2 of unoperated relay 9DISC, through contact 4 of operated relay 9TSC the transmitter start control relay, over conductor 8LC1 over conductor 624, through the No. 12 contact of the operated line control relay 6LX, over conductor 708, through the wiper of pulse timing bank B4 of selector 7B, is applied during the first four steps of bank 4 of selector 7B, over conductors 625, 823 and 1143 to the selector sender. Accordingly, the pulse associated with lead 1143 of the selector sender will be lengthened during the transmission of transmitter start codes for stations associated with terminals 1 through 4 of stepping selector 7B.

The path for condenser 8C15 extends over conductor 903, through the No. 2 contact of operated relay 9TSC, over conductor 8LC2, over conductor 626, through the No. 11 contact of operated line control relay 6LX, and thence over conductor 709, through the wiper arm and No. 1 terminal of pulse timing bank B3 of selector 7B, thence over conductor 627, conductor 824, to lead 1114 of the selector sender. Accordingly, a transmitter start code for the station associated with terminal 1 of selector 7B has its third and fourth pulses lengthened corresponding to connections of capacitors 9C14 and 8C15, leads 1143 and 1144 of the selector sender.

As the sequence of transmitter start codes are transmitted under the control of stepping of selector 7B, timing banks 3 and 4 thereof will apply condensers 8C15 and 9C14 to leads 1142 through 1147 in a variety of combinations, thereby to lengthen various ones of the pulses 2 through 7 of the sender code corresponding to the starting code of the particular outlying station associated with a particular step of selector 7B. Bank 1 of selector 7B, when resting on a particular step, will energize a lamp associated with that step to give indication as to the particular station code that is being transmitted. For example, with selector 7B on step 1, lamp 711 is lighted over a path extending from ground, contact 3 of relay 6R marking, over conductors 602, and 701, through wiper arm and terminal 1, bank 1, selector 7B, to positive battery through lamp 711. When receiving relay 6R is marking, line idle, lamp 711 glows steadily, and when an answer-back consisting of all spacing signals is received, lamp 711 is extinguished. During sending of signals, lamp 711 flashes following receiving relay 6R. Bank 2 of stepping selector 7B is associated with manual start code transmission and will be described hereinafter.

Reoperation of relay 6LX also completes a circuit to enable sending relay 6XS to repeat to the sending channel of conductors 1LST and 6LSR, the transmitter start codes programmed by the sender circuit and repeated by sending relay 11TS of Fig. 11. A path from negative battery through the windinng of relay 6XS over conductors 616 and 615 is extended at contact 10 of operated relay 6LX, over conductors 614, 613 and 8XS to ground through the No. 4 contact of relay 11TS.

A path is also completed from the relay 6R in the receiving channel to the answer-back magnet 11AB of Fig. 11 so that the sender can respond to answer-back signals after it has transmitted the transmitter start code patterns. This path extends from ground through contact 2 of relay 6R, conductor 632, contact 1 of unoperated relay 6BK, over conductors 623 and 622, through contact 4 of operated relay 6LX, over conductors 621, 8AB, and 803, and through the winding of relay 11AB to ground. The sender is now in a position to recognize an answer-back from an outlying station.

A path is also completed to blind the reperforator associated with the operating line from repeating the outgoing transmitter start patterns. This path, previously traced and explained, extends from ground through contact 4 of relay 11P7 of Fig. 11, over conductors 8BL and 618, through contact 5 of operated relay 6LX, over conductors 620, 1LMK and 201 and to line relay 12LR of the reperforator, Fig. 12. Accordingly, the reperforator associated with the line will be blinded during the sending of transmitter start codes.

The operation of relay 6LX opens at its No. 13 contact an operating battery path to relays 6LM and 7TM. This path may be traced from positive battery, contact 13 of relay 6LX and over (*a*) conductors 605, 606 and 607, to the winding of relay 6LM, and (*b*) conductors 605 and 703 to the winding of relay 7TM. Accordingly, these relays release.

The operation of relay 6LX also interrupts the common locking battery path extending through all transmitter control circuits of the various lines, thereby to preclude the locking operation of relays identical to relays 6LX and 5TX in the other line circuits during the period that the control circuits for line 1 are utilizing the selector sending circuit. The common battery originates in Fig. 8 and is applied through either contact 3 of relay 8ST or contact 1 of relay 8BA to the common battery lead 8TBA which loops through the transmitter control and line control circuits of all six lines, as will be illustrated for line 1. Negative battery through contact 1 of relay 8BA over conductor 8TBA through contacts 6 and 7 of relay 5TX, over conductor 501, through contacts 8 and 9 of relay 6LX, over conductor 502 and thence looped through all TX and LX relays of the control circuits for the remaining five lines in a manner similar to that discussed for relay 5TX and 6LX. It is obvious that relay 6LX, in operating, opens at its 8 and 9 contacts this common battery lead to preclude locking operation of the line control relays LX and transmiter control relays TX of the other five line circuits during the time that the circuits associated with line 1 are utilized in the common sender of Fig. 11.

The first transmitter start code is applied to the line shortly after the answer-back to the search code is received. The answer-back to a transmitter start code releases the sequence circuit, which returns to normal and then releases the relay 6LX, which is not held up after a transmitter start code transmission as it is after a research code transmission.

An answer-back to the first transmitter start code releases sender answer-back relay 11AB and momentarily operates sender answer-back relay 8AB in the manner previously described for an answer-back to a search code. The momentary energization of relay 8AB, during the answer-back signal, applies positive battery to the chain circuit previously traced through the code relays of Fig. 9, thereby to shunt down the first code relay in the chain that is operated. Positive battery is applied through contact 3 of relay 8AB, over conductor 911, contact 6 of relay 9DISC, conductor 902, contact 4 of relay 8DS, conductor 802 through contact 5 to one side of relay 9TSC. Negative battery on the other side of relay 9TSC has charged capacitor 932 negative and with the application of positive battery this charge goes positive until a no-current condition exists, at which time relay 9TSC releases.

The release of relay 9TSC establishes the chain ground circuit for relay 8ST which operates to remove negative battery from common battery lead 8TBA, thereby opening the locking path for relay 6LX which must release as relay 6LBD is released, and cannot establish an auxiliary locking path for relay 6LX at its contact 2 as was the case when an answer-back to the search code was received.

Each station poled will automatically respond to its transmitter start code by returning an answer-back signal even though it does not desire to transmit. If a station has tape in its transmitter, it will then start transmitting. If the first station poled has tape in the transmitter, an answer-back will be received, and the outlying station will start, and the message will come into the relay center. The operation at an outlying station will be discussed in detail hereinafter. However, if the outlying station has no tape in its transmitter, the line will remain idle and closed for a 2½ second waiting period. At the end of this waiting period between transmitter start code transmission, tubes 6LMT will fire and operate relay 6LM, as described previously. The subsequent operation of the line control circuit after 2½ seconds have elapsed since the transmission of the first start code with an absence of an answer-back signal will now be discussed on the basis of relay 6LM being operated.

The operation of relay 6LM will in turn energize relay 7SU and step magnet 7STP of stepping selector 7B. Ground through contact 1 of relay 6LX is extended over conductor 609, contact 1 of operated relay 6LM, conductor 608, through contact 5 of relay 7SE, conductor 628, contact 6 of relay 6EM, contact 6 of relay 6LBD, over conductor 706 to the junction point of conductors 707 and 10LBS. One path from this junction extends over conductor 707 through the winding of relay 7SU and resistor 7R9 to positive battery. The other path extends from this junction over lead 10LBS through contacts 2 and 3 of key 10MAN, over conductor 7LST, through the winding of relay 7STP and over conductor 1+ST to positive battery, Fig. 1.

The operation of relay 7SU energizes sender bidding relay 6LBD which operates and locks. The operating path for relay 6LBD extends from ground of contact 2 of operated relay 7SU over conductors 721 and 7LGS, contact 5 of key 10MAN, and contact 9 of key 10MA over conductor 1001, conductor 7LLB, through resistor 6R21, varistor 6V3, through the winding of relay 6LBD to battery, Fig. 1, over lead 1+LB. Relay 6LBD operates. Relay 6LBD locks through varistor 6V3, its contact 5, resistor 6R6, and contact 6 of relay 6LX to negative battery.

Relay 6LBD in operating, releases relays 7SU and 7STP and also operates relay 6LX. The operating path traced above for the operation of relays 7SU and 7STP is opened at contact 6 of operated relay 6LBD. The operation of relay LBD completes an operating path at its No. 2 contacts for the operation of relay 6LX as explained previously.

The release of relay 7STP steps the selector bank B1 of stepping selector 7B to the next step. The operated relay 6LX performs the variety of functions discussed previously such as operating the transmitter start code relay 9TSC of the sequence circuit, closing paths for the timing capacitors 8C15 and 9C14, providing for answer-back recognition, blinding the reperforator against transmitter start codes and connecting the sending relay 6XS in the transmission loop with the sending relay 11TS of the selector sender. Accordingly, with bank 1 of selector 70 on the second terminal, the timing capacitors in the sequence circuit are now connected to different conductors of the selector sender to cause the transmitter start code of the second outlying station to be sent over the line transmission channel. The answer-back over the receiving channel again releases the transmitter start code relay 8TSC and the line control relay 6LX to start the waiting period of 2½ seconds for the outlying station to begin transmission. In the event no transmission is begun during this period, relay 6LM will operate.

Consequently if the outlying station for which the transmitter start code has been programmed and transmitted does not have a tape in the transmitter awaiting transmission, tube 6LMT will fire at the end of 2½ seconds, relay 6LM will be energized, and the sequence of operation previously explained will repeat and bank B1 of stepping selector 7B will step to the next terminal to transmit a start code for the next or third outlying station on the line. This procedure repeats until all stations on the line have been poled and all traffic at the outlying station has been received by the relay center. If a station begins sending traffic during the waiting period relay 6R of Fig. 6 will repeat the teletypewriter signals incoming over the receiving channel to the reperforator of Fig. 12, as previously described, and will also at its No. 4 contact intermittently ground the start lead 1 of tube 6LMT, over conductors 603, 604, during incoming teletypewriter signals thereby to prevent tube 6LMT from firing.

At the end of a message the outlying station turns itself off and the receiving channel closes to restore the idle conditon. After 2½ seconds relay 6LM will operate and the circuit action above described is repeated for each terminal of the selector that has a station assigned to it. This action continues until the wiper on bank 1 of selector 7B returns to the No. 11 terminal. When this happens the action previously discussed, with respect to the search code, will repeat in that the relay 7SE will operate and send out the search or zero sender code consisting of all short pulses which will be explained in the discussion concerning the sender selector. If an answer-back is received to the search code the circuit will automatically start sending transmitter start codes again as explained in the foregoing, however, if an answer-back is not received to the search code the circuit will return to the timed rest period after which the search and transmitter start cycle will be repeated again.

The manner of relaying a message received from an outlying station on line 1 and reperforated in tape at the relay center, will be discussed subsequently.

*Manual transmitter start code transmission*

When a station has been off the line for a length of time it may be desired to bring all its messages into the relay center on an expedited basis rather than waiting for them to be picked up in sequence. The manner of accomplishing this will now be discussed in detail.

Figure 10:
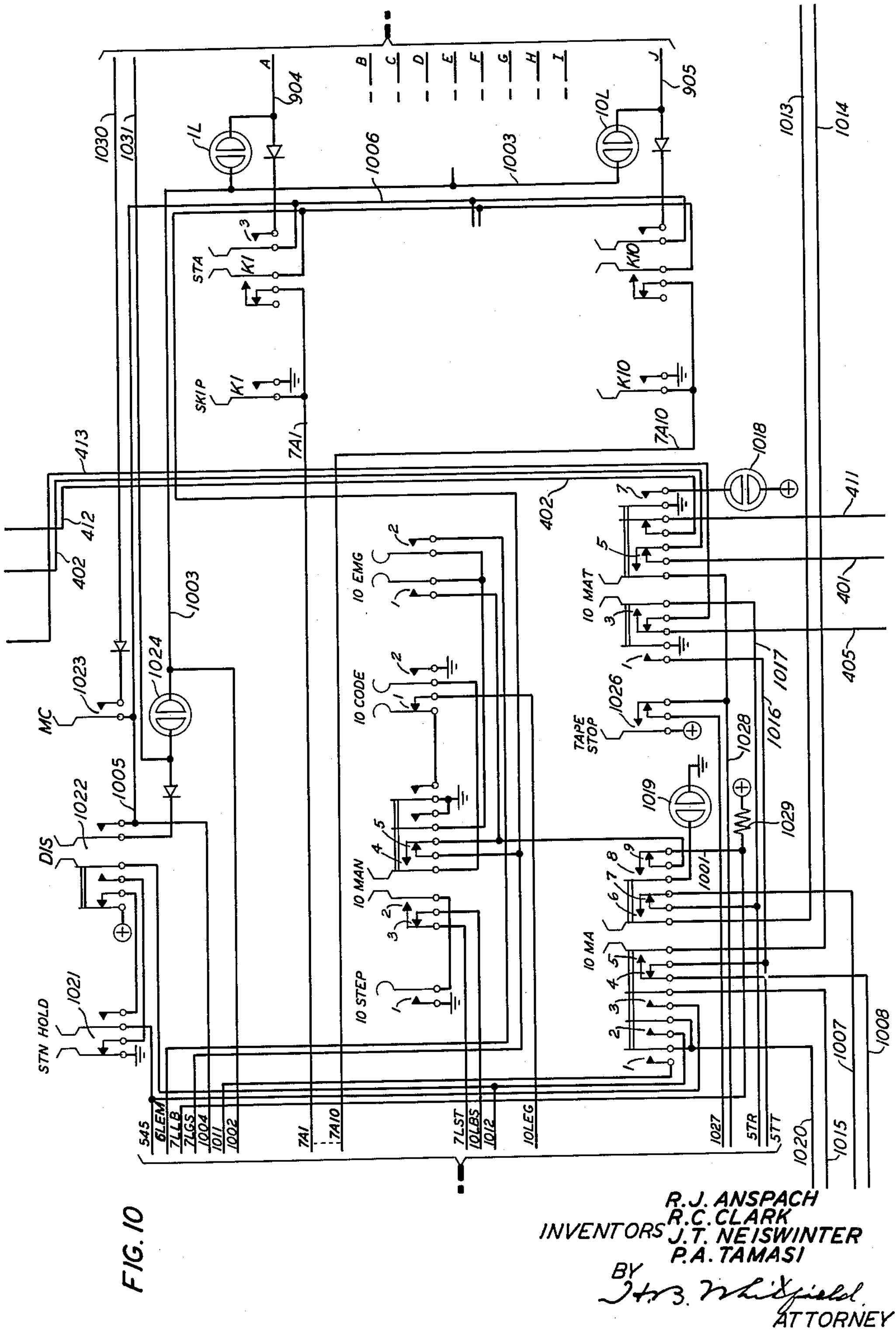
Fig. 10 shows the circuits of a key panel, which comprises key sets individual to each line served by the relay center.

The manual buttom 10MAN of Fig. 10 is operated and latched which disables the automatic stepping of selector 7B by opening at its Nos. 2 and 3 contacts the path previously traced, whereby ground supplied by the firing of tube 6LMT came into the 10MAN key on lead 10LBS and extended therethrough over lead 7LST to the winding of the stepping magnet 7STP. Accordingly, the depression of the 10MAN manual key precludes automatic stepping of the 7B selector bank.

The nonlocking step button 10STEP of Fig. 10, when depressed applies ground over its No. 1 contact, through the No. 2 contact of key 10MAN, to lead 7ST and thence to the winding of relay 7STP of Fig. 7. It is obvious that the depression and release button 10STEP by its application and removal of ground from relay 7STP, will cause the stepping of selector bank 7B. In Fig. 7, it is to be noted that each of the terminals of bank 1 of stepping selector 7B is connected through a series of lamps of which two, namely, lamps 711 and 712, are shown, to positive battery. Therefore, when the selector rests on a particular terminal the lamp associated therewith will be ignited and the operator watching his control panel can ascertain the particular step and particular start code with which the stepping selector is associated by observing the lamps. In this manner an operator can manually operate key 10STEP and step the selector to the particular start code associated with the outlying station that he desires to receive incoming transmission from.

When the selector 7B of Fig. 7, is associated with a particular station calling code by the repeated operation of key 10STEP of Fig. 10, the operator will depress the nonlocking code button 10CODE of Fig. 10 and the code associated with the particular selector 7B bank terminal is sent to the line by the operation of the line bidding and control relays 6LBD and 6LX in a manner similar to that discussed for the automatic transmitter start code operation. The operating path for relay 6LBD, under manual operation, is traced from ground through No. 2 contact of operated button 10CODE, No. 4 contact of operated button 10MAN, contact 9 of key 10MA, over conductors 1001 and 7LLB, through resistor 6R21, varistor 6V3, and the winding of relay 6LBD to positive operating battery on lead 1+LB, Fig. 1. The operation of relay 6LBD will in turn operate relay 6LX as described for the automatic transmitter start code operation and the transmitter start code for the particular staiton will be sent over the line transmission channel.

At the end of the incoming message from the particular station selected, the selector 7B will remain on this particular station's terminal and the reoperation of the code button again will send the transmitter start code out and so bring in another message until this particular station's traffic is exhausted.

*Break feature*

Any time that the receiving line channel goes open for one second or longer, tube 6LS Fig. 6, will become conductive and operate the break relay 6BK which will bring in an alarm, stop the sending transmitter, and open the answer-back lead so that the break will not simulate an answer-back to the sequence circuit, which is normally composed of all spacing signals, thereby to cause the operated code relays to be released.

With the receiving channel of conductor 1LRT and 1LRR in the open condition, receiving line relay 6R will be deenergized to the spacing condition and it will remove ground at its No. 1 contact from the starting anode of the long space tube 6LS. Accordingly, after a time determined by condenser 6C3 and resistor 6R11 positive battery through resistor 6R10, anode 1 and cathode 3 of tube 6LST to ground forces conduction in tube 6LS. Relay 6BK is operated over a path extending from ground, through cathode 3 and anode 2 of tube 6LS, contacts 5, 4 and winding of relay 6BK, contact 1 of release key 6RLS to positive battery. Relay 6BK, upon operating, provides a self-locking path through its lower contact 4 to ground and also opens the plate circuit of tube 6LS at its Nos. 4 and 5 contacts to extinguish this tube. Alarm lamp 6BKL is ignited in a path extending from ground through contact 7 of relay 6BK, through the lamp to positive battery.

The operation of relay 6BK opens at its No. 2 contact the energizing path for the transmitter distributor start magnet 5STR of Fig. 5, which extends from ground, through contact 1 of relay 6LX, over conductor 609, through contact 2 of relay 6BK, over conductor 629, through contact 4 of relay 5TOL, through conductor 521 and resistor 5R9, contact 1 of relay 5TD, contact 1 of relay 5TX, contact 2 of relay 5TA to the winding of starting magnet 5STR. Accordingly, the operation of relay 6BK removes ground from the transmitter distributor start magnet and therefore the transmitter stops when a break occurs.

The operation of relay 6BK also opens at its No. 1 contact, the path, for the answer-back signal to be communicated to the selector sender, extending from ground, over contact 2 of relay 6R, conductor 632, contact 1 of relay 6BK, conductors 623 and 622, contact 4 of relay 6LX, conductors 621, 8AB and 803, through the winding of answer-back relay 11AB to ground. Therefore, the operation of break relay 6BK prevents the application of ground to the normally energized terminal of the answer-back relay 11AB during the long space break signal.

*Emergency stop feature*

The manner of stopping an outlying station that is sending to the relay center in order to handle traffic of a more urgent nature will now be discussed. Depression of manual button 10MAN makes ground available to the emergency stop button 10EMG (by extending ground through its No. 6 contact to the Nos. 1 and 2 contacts of key 10EMG). The depression of key 10EMG will cause operation of relays 6EM, 6LBD, and 6LX. The path for operating relay 6EM is traced from ground on contact 2 of key 10EMG, over conductor 6LEM, conductor 630, through the winding of relay 6EM to positive battery. Operated relay 6EM provides a self-locking path through its contact 3, over conductor 10LEG, through contact 1 of key 10CODE, thence through contact 6 of operated key 10MAN to ground. Relay 6LBD is operated simultaneously with relay 6EM over a path extending from ground through contact 6 of key 10MAN, contact 1 of key 10EMG, contact 9 of key 10MA, over conductors 1001 and 7LLB, through resistor 6R21, varistor 6V3, and the operating winding of relay 6LBD to positive battery on conductor 1+LB Fig. 1.

Operation of relay 6LBD will operate relay 6LX as previously discussed and relay 6LX will perform all the functions as hereinbefore detailed with the exception that it will activate the sending selector of Fig. 11 without first operating any code relays similar to the search code operation. The path for activating the sender selector extends from negative battery, through contact 7 of relay 6LX, over conductor 610, through contact 3 of relay 6LBD, over conductor 611, through contact 2 of operated relay 6EM, over conductors 633, 8ST, and 1101, through resistors 1130 and 1100 to the starting anode 1 of tube 11STC. As previously explained, conduction in tube 11STC will energize the selector sender start relay 11ST to initiate the sending of control signals.

The selector sender then sends out an all short pulse or zero code as an emergency stop signal. This code is identical to the one used as a search code, however, inasmuch as an outlying station transmitter is sending, it becomes an emergency stop code to the station which has a transmitter sending and therefore stops the transmitter at that station. This will be explained in detail in the description of the outlying station. However, it should be noted that this emergency stop code effects none of the idle stations on the line as they will merely respond with an answer-back if they have tape in their transmitters. The release of the latched key 10MAN will restore the circuit to the fully automatic condition which existed prior to the depression of the manual key which interrupted the serial path through the unoperated keys to the line control circuits.

*Outlying station priority feature*

In the description of operation at an outlying station, appearing hereinafter, a means is described to permit an outlying station which is not transmitting to interrupt transmission on the line and to send priority traffic. The operator at the outlying station, having priority traffic will depress a key to impose a long break signal on the line. At the relay center this long break will be received on the line receiving channel and as described under the heading "Break Feature" relay 6BK will be operated. The operation of relay 6BK will apply a ground to one side of the bidding relay 6LBD which will operate and energize the line control relay 6LX if and when no other bidding relays at the relay center are operated. This operating path is traced from ground through contact 3 of relay 6BK, through contact 5 of unoperated relay 6EM, varistor 6V2, resistor 6R24 and the winding of relay 6LBD, over conductor 1+LB to positive battery Fig. 1. The operation of relay 6LBD will in turn operate the emergency code relay 6EM by closing at its No. 4 contact a path from conductor 630 on one side of relay 6EM to the ground just traced, over contact 3 of operated relay 6BK. Accordingly, relay 6EM will operate. Consequently, with a long break applied to the receiving channel, relays 6LBD and 6EM are energized in a manner similar to that described in relation to the emergency stop feature when the emergency stop button 10EMG was depressed. The subsequent relay action will be identical to that described under the emergency stop feature in that relay 6LX will be operated providing no other bidding relay has previously been energized and the sending selector Fig. 11 will be activated to send an all-short pulse or zero code over the line sending channel. This will be recognized as an emergency stop signal by the outlying station that is transmitting and its transmitter will stop. Accordingly the outlying station which initiated the break condition will now connect its transmitter to the line and its priority traffic will come into the relay center.

*Skip feature*

When a particular line does not have stations equal in number to the terminals of the selector bank 7B the idle terminals on bank 2 may be permanently grounded by strapping, or the ground can be applied temporarily by the operation skipping key 10SKIP, which in operating applies ground over leads 7A1 to 7A10 to the terminals 1 through 10 of bank 2, selector 7B. As is illustrated there may be as many skip keys as there are terminals on the selector and stations on the line and their functions will be similar as to that just described and shown with relation to skip key 1 and terminal 1 of the selector stepping bank. When the rotor of the selector lands on an idle terminal which has been grounded by strapping or on a station terminal with the skip key operated such as skip key 10SKIPK1 and terminal 1 bank 2 of selector 7B, the ground is applied through the rotor, through the winding of relay 7ST Fig. 7, through contact 1 of the stepping magnet 7ST, to positive battery. Relay 7ST, upon operating (*a*) energizes the stepping magnet 7ST over a path extending from ground, No. 1 contact of relay 7ST, through the winding of relay 7STP to positive battery, over conducor 1+ST Fig. 1; and (*b*) operates relay 7SU in a path extending from ground through the No. 1 contact of relay 7ST, over conductor 7LST, through contacts 2 and 3 of unoperated key 10MAN Fig. 10, thence over conductor 10LBS, over conductor 707, through the winding of relay 7SU, through resistor 7R9 to positive battery. Relay 7SU prevents further operation of relay 6LX by opening at its No. 1 contact the operating path for relay 6LX which normally extends from positive battery, relay 6LX winding, over conductor 720, through contact 1 of relay 7SU, over conductor 610, through contact 2 of relay 6LBD to common ground Fig. 1, over lead 3LGA.

When the stepping magnet 7STP operates, it opens at its No. 1 contact the operating path traced for relay 7ST and when relay 7ST releases it opens the operating path of the stepping magnet 7STP which advances the rotor of all banks of the stepping selector 7B one step. If the terminal to which the selector is advanced is similarly grounded by strapping or skip key the foregoing action is repeated. However, if this terminal is ungrounded, the normal transmitter start code transmission, as previously discussed, will take place.

*Outward transmission from the relay center*

In the description of inward transmission of the relay center an idle receiving channel condition on line 1 initiated automatic transmission of a search code which was responded to by an answer-back from an outlying station which had tape awaiting transmission in its transmitter. The answer-back initiated the automatic sequential transmission of transmitter start codes which located the station having traffic and a message came into the relay center and was recorded in a reperforator. The following description is concerned with the relay of this message to stations of destination by means of pushbutton selection of outlying stations.

*Transmitter control circuit*

A transmitter control circuit, as shown in Fig. 5, is provided at the relay center for each line terminating thereat and this discussion will refer to the transmitter control circuit associated with line 1 as illustrative of the operation of the control circuits associated with the remaining five lines. This circuit converts manual key operation to an automatic outlying station connect function and will connect a particular transmitter to a particular line sending channel, bid for the use of the selector sender, activate the selector sender, recognize answer-backs to the station cut-on codes, and initiate transmission from the relay center when the outlying stations are in receptive condition.

The operator at the relay center inserts the outgoing tape in the selected transmitter gate, operates the associated station keys shown in Fig. 10 as 10STA keys corresponding to stations on the line that are to receive the message and then depresses the send key to start the automatic control and transmission operation. With the sending channel idle, the use of the sender selector of Fig. 11, is bid for. After a successful bid, outlying station connect codes are sent over the line sending channel. Upon receiving answer-back assurance that all stations are connected, the selected transmitter starts and the message is transmitted over the line sending channel. When the end of the tape passes through the transmitter gate, the transmitter stops. The use of the selector sender is bid for once more and upon obtaining it a disconnect signal is automatically sent to disconnect all stations. Upon receiving answer-back assurance that the stations have disconnected, the circuit will be restored to its normal idle condition by the operation of the clear button.

A detailed description will now be given of the transmission to stations of destination over the line 1 sending channel of the message received over the line 1 receiving channel.

In Fig. 10 station selecting keys 10STA keys 1 and 10, are shown as illustrative of the 10 station keys which are provided for each of the six lines terminating at the relay center. The operation of any of these keys such as 10STA key 1, prepares an operating path for the code relays 9A through 9J, inclusive, of the common sequence circuit of Fig. 9. It will be assumed that the message to be transmitted is addressed to stations 1 and 10 and accordingly the operation of station keys 10STA keys 1 and 10, will prepare operating paths for code relays 9A and 9J of the sequence circuit Fig. 9. A detailed description of the functioning of the code relays 9A through 9J will be given hereinafter when the sequence circuit comprising Figs. 8 and 9 is described in detail.

After the operator depresses the station keys corresponding to the station to which the message is to be transmitted he then operates send key 1SEN, K1, shown on Fig. 1, as associated with line 1, which will operate and lock. When key 1SEN, K1 is depressed, ground is extended through contact 1 of key 1, over conductor 1TOL, through the winding of relay 5TOL, over conductor 503, through resistor 5R1 to positive battery, thereby operating relay 5TOL the transmitting line circuit connect relay. This operating path also constitutes a locking circuit for relay 5TOL.

In Fig. 3 it is to be noted that there are cross-over paths between the Figs. 5 of lines 1 and 4. These crossover paths are provided in order that the transmitter line control circuit Fig. 5 of line 1 may associate itself with the transmitter of line 4 in the event its own transmitter is disabled. Accordingly, cross-over paths, as shown between Figs. 5 of lines 1 and 4, are also provided between lines 2 and 5 and 3 and 6. There is one three-gate multiple transmitter associated with lines 1, 2 and 3 and a second three-gate multiple transmitter normally associated with lines 4, 5 and 6. Accordingly by this cross-over means the two three-gate multiple transmitters are available to any one of the lines.

Relay 5TOL, upon operating, completes an operating path for relay 5TBD, the bidding relay which places an electrical request for use of the selector sender of Fig. 11. The operating path for relay 5TBD is traced from the transmitter control circuit fourth Fig. 5 associated with line 4, as indicated in Fig. 3, from positive battery through the No. 7 contact of relay 5TEL, over conductor 5TC, over the cross-over cable 500 lower Fig. 3, thence into the first Fig. 5 of line 1 in cable 550 upper, over conductor 5TA, through contact 5 of operated relay 5TOL, over conductor 504, through the winding of relay 5TBD, over conductor 505, through contact 6 of unoperated relay 5TCB, over conductor 506, through contact 11 of unoperated relay 5TD, over conductors 507 and 508, and through contact 6 of operated relay 5TOL to ground.

(If half duplex operation were being utilized, the ground necessary to energize the bidding relay 5TBD is obtained from the line control circuit if the line is idle. In this manner transmitter start codes could not be initiated out on a half duplex line if incoming traffic was being received. Therefore on a half duplex network alternate sending and receiving will occur.)

The locking path for relay 5TBD is traced through contact 5, over conductor 509, through contacts 4 and 5 of unoperated relay 5TX to negative battery.

The operation of the bidding relay 5TBD provides a path to the common ground lead 3LGA of Fig. 3 which serially loops through the transmitter control and line control circuits of all lines for the operation of triggering relay 5TX which will (*a*) activate the selector sender to transmit the cut-on codes and (*b*) operate relay 5TD, the transmitter distributor function relay to the line. The operating path for relay 5TX is traced from ground in Fig. 3, over conductor 3LGA, through the No. 3 contact of operated relay 5TBD, over conductor 510, through the winding of relay 5TX to positive battery via lead 301 and resistor 302.

It should be noted that the operation of relay 5TBD opened at its No. 3 contact the common series ground path from Fig. 3, over conductor 3LGA, through contact 2 of relay 5TBD, over conductor 5LGA, through contact 1 of relay 6LBD, and over conductor 6LGA to loop through the Figs. 5 and 6, the transmitter control and line control circuits of the other five lines. It is obvious that the opening of this common ground circuit by relay 5TBD in Fig. 5 of line 1, will preclude the operation of any other TBD or LBD transmitter or line bidding relay of the circuits of other lines. Therefore, no other line or circuit may bid for the sending selector of Fig. 11 while the transmitter control circuit of Fig. 1 is making a bid.

Relay 5TX also has a path over conductor 301 to common battery in Fig. 3, through resistor 302. This common battery is applied through resistor 302, over conductor 301 to one side of relays 5TX and 6LX and all other TX and LX relays associated with the transmitter and line control circuits of the remaining five lines. Accordingly, an operating path for relay 5TX is traced from positive battery of Fig. 3 through resistor 302, over conductor 301, to the winding of relay 5TX, over conductor 510, through contact 3 of operated relay 5TBD and over lead 3LGA to ground in Fig. 3.

Relay 5TX, upon operating, locks to negative battery on its previously grounded side through its contact 6, over conductor 8TBA to negative battery applied to this conductor either through contact 1 of relay 8BA or contact 4 of relay 8ST. This negative locking battery applied to relay 5TX over conductor 8TBA effectively shunts down the operating positive battery for all the other TX and LX relays of the transmitter line control circuits of the other lines thereby to prevent their operating. The common operating positive battery of Fig. 3 is applied through resistor 302 over conductor 301 to all TX and LX relay windings in parallel. If only relay 5TX is grounded the small voltage drop across resistor 302 does not preclude energization of relay 5TX at its required operating voltage. However, when the ground is replaced by negative battery the current through resistor 302 is increased to the point that that magnitude of the voltage drop across resistor 302 reduces the voltage available to any other relay in parallel which has ground applied to its windings below the required operating voltage of the relay. Accordingly, when negative battery is applied to the previously grounded side of one of the TX or LX relays it prevents all other TX or LX relays from operating, because the voltage applied to their windings will be less than their required operating voltage.

After the operation of relay 5TBD has electrically made a successful bid for the use of the sender selector, the relay 5TX is operated to perform a variety of functions, including the closure of a path between sending relay 6XS and the selector sender relay 11TS, the closure of an answer-back path, the closure of a blinding path to the reperforator, the opening of the transmitter start path until all stations are connected, and the energization of the code relays of the sequence circuit.

Relay 5TX opens at its No. 4 contact the previously-traced locking path of relay 5TBD to negative battery. Accordingly, relay 5TBD begins its slow release. Relay 5TD, the transmitter distributor function relay, operates under the control of the sixth pin of the transmitter distributor. This path is traced from ground over contact 3 of unoperated relay 5TCB, over conductor 511, through contact 10 of operated relay 5TX over conductor 512, through contacts 6 and 7 of relay 5TD, through the winding of relay 5TD, over conductors 513, 514 and 515, and through the sixth pin contact 538 of the transmitter distributor to negative battery.

Relay 5TD, the transmitter distributor function relay, upon operating, locks through ground through its No. 6 contact and resistor 516, and energizes relay 5TA, the auxiliary transmitter relay, which provides time delays necessary for disconnect functions, over a path extending from positive battery, Fig. 5, through resistor 517, through the winding of relay 5TA over conductor 518, through the No. 8 contact of operated relay 5TD, over conductor 519, conductors 520 and 521, through the No. 4 contact of operated relay 5TOL, over conductor 629, through the No. 2 contact of relay 6BK, over conductor 609 and through the No. 1 contact of relay 6LX to ground.

The operation of relay 5TX closes a path to the sending selector of Fig. 11 in order that sending relay 11TS of the sender circuit at its contact 4 will control the operation of relay 6XS of Fig. 6, thereby to open and close the transmission path for the transmission of cut-on codes. This path extends from ground Fig. 11, through the No. 4 contact of relay 11TS, over conductors 8XS, 613 and 522, through the No. 11 contact of operated relay 5TX, over conductors 523 and 524, through the No. 3 contact of operated relay 5TOL, over conductors 631 and 616, through the winding of relay 6XS to negative battery. Accordingly, the line transmitting relay 6XS is now in a position to repeat to the sending channel signals programmed by the selector sender to its sending relay 11TS.

Relay 5TX, in operating, will close an answer-back path so that the answer-back from the line will release the selector sender answer-back relay 11AB which will in turn operate relay 8AB of the sequence circuit Fig. 8. This answer-back path extends from ground through the No. 2 contact of line receiving relay 6R, over conductor 632, through the No. 1 contact of relay 6BK, over conductors 623 and 622, through the No. 2 contact of operated relay 5TOL, Fig. 5, over conductor 526, through the No. 3 contact of operated relay 5TX, over conductors 634 and 621 to the answer-back lead conductor 8AB, thence over conductor 803, to the winding of relay 11AB to ground. This grounding path shunts the positive battery normally applied to lead 803 at the junctor of conductors 803 and 8AB.

The operation of relay 5TX also applies ground to one side of the answer-back lamps 1L through 10L of Fig. 10. This path is traced from ground, No. 8 contact of relay 5TX over lead 1002, and thence over lead 1003 to one side of lamps 1L through 10L, end of Fig. 10. The application of potential to the other side of the lamp is under control of the code relays 9A to 9J and their associated station keys. When code relay 9A operates, it will apply, at its contact 7, negative battery to lamp 1L, thereby lighting the lamp. When an answer-back is received to the code transmitted under the control of code relay 9A, relay 9A will release and lamp 1L will be extinguished to indicate that a successful connection of the associated outlying station has been made.

The operation of relay 5TX also effects a blinding of the reperforator in order that spurious code transmission will not be received by the reperforator during transmission of the answer-back signal from the outlying station. This path is completed from ground through contact 4 of sender relay 11P7, over conductor 8BL, over conductors 618, 527, through the No. 2 contact of operated relay 5TX, over conductor 525, through contact 1 of operated relay 5TOL, over conductor 528, and over conductor 1LMK to Fig. 1 where the path is completed, as previously explained, through the reperforator switching keys 1ROTR1, keys 1 to 6, to conductor 201, thence through the winding of line relay 12LR, relay 122 to positive battery Fig. 11.

The transmitter distributor start magnet path is opened by the operation of relay 5TX at its contact 1, thereby to prevent the sending of the message until all outlying stations have been connected to the line sending channel. One side of the transmitter distributor start relay 5STR extends through contact 2 of operated relay 5TA, thence through contact 1 of unoperated relay 5TX to ground in a path previously traced.

The operation of relay 5TX also applies conditioning negative battery to operate the code relays in the sequence circuit. This application path extends from negative battery through contact 5 of operated relay 5TX, over conductor 529, through contact 6 of operated relay 5TBD, over conductor 530, through contact 1 of relay 5TCB, over conductors 1004, 1005 and 1006, through the No. 3 contact of operated keys 10STA keys 1 and 10, and through conductors 904 and 905 and resistors 906 and 907 to the windings of relays 9A and 9J, respectively. It is obvious that any of the other relays B through I whose station keys were operated would also have this negative battery applied to their windings and therethrough to ground thereby operating these relays.

Relay 5TBD, which has a slow-release characteristic, now releases after the functions noted above have been accomplished, and in releasing performs several additional functions. It recloses at its No. 2 contact the serial ground path beginning in Fig. 3 and looping through all circuits of all lines over conductor 3LGA to enable other circuits to bid for the selector sender, and removes by opening its No. 6 contact the negative battery which was applied over leads 1004, 1005, and 1006, through contact 3 of the operated 10STA keys, to conductors 904 and 905 to energize the code relays which have now locked up. Its release also ignites the transmitter distributor lamp in a path extending from positive battery via the No. 1 contact of relay 5TBD, through the No. 3 contact of operated relay 5TD, over conductor 533, through the lamp 531 to ground.

Station cut-on codes all sent from the selector sender Fig. 11, under control of the 5TX relay which applied negative battery to the code relays prior to the release of relay 5TBD. A detailed description of the operation of the code relays 9A to 9J in combination with the selector sender circuit is given hereinafter when the common sequence circuit is described. After all the station cut-on codes have been transmitted to and all the answer-backs received from the outlying stations, the locking battery for relay 5TX applied over lead 8TBA is momentarily removed by the combination of operation and release of relays 8ST and 8BA, therefore, relay 5TX will release.

The release of relay 5TX closes the battery path for other TX and LX relays of the system, opens the sending path to the selector sender, opens the answer-back path, and opens the blinding path to the reperforator. The completion of these circuits were previously discussed in the foregoing description of the operation of relay 5TX.

In addition, the release of relay 5TX operates relay 5TCB, the battery control and clearing relay, which closes the disconnect function path and prevents additional bidding on a busy circuit. The operating path for relay 5TCB extends from ground through contact 9 of 5TX, through contact 10 of operated relay 5TD, over conductor 534, through the winding of relay 5TCB, over conductor 535, through contact 2 of the clear key 536 to positive battery. Relay 5TCB locks to ground through its No. 4 contact.

The release of relay 5TX also completed at its No. 1 contact the operating path for the transmitter distributor start magnet 5STR and accordingly the transmitter distributor begins sending the message to the line. At the end of the message the six pin contact 538 opens thereby to remove battery from the winding of the transmitter start magnet 5STR and to interrupt the locking path for relay 5TD which extended from ground through resistor 516, over contact 6, the winding of relay 5TD, over conductors 513, 514 and 515, thence through the six pin contact 538 to negative battery. Accordingly the relay 5TD releases. Slow-release relay 5TA begins to release inasmuch as its one side extending over conductor 518 has been opened at contact 8 of 5TD, thereby interrupting the circuit through the winding of relay 5TA. However, before slow-release relay 5TA completes its release relay 5TBD reoperates through a path extending from ground through contact 1 of relay 6LX, over conductor 609, through contact 2 of relay 6BK, over conductor 629, through contact 4 of operated relay 5TOL, over conductor 521, over conductor 520, over conductor 519, through contact 9 of relay 5TD, over conductor 539, through contact 1 of slow-releasing relay 5TA, over conductors 540 and 505, through the winding of relay 5TBD, over conductor 504, through contact 5 of operated relay 5TOL, over conductor 5TA, into cable 550 upper from first Fig. 5, thence into fourth Fig. 5 in cable 550 lower on conductor 5TC and through contact 7 of relay 5TEL to positive battery. Relay 5TBD locks to negative battery through its contact 5 over conductor 509, through contact 4 of relay 5TX to negative battery.

The reoperation of relay 5TBD, the bidding relay, again places an electrical request for the use of the selector sender circuit Fig. 11, and upon making a successful bid, relay 5TX, the triggering relay, will again be operated and perform the series of functions enumerated and discussed hereinabove. However, it should be noted that at this point relay 5TCB is operated, whereas it was not operated between station calling codes, therefore, its No. 1 contact will be opened tehreby precluding the application by the operation of relay 5TX of negative battery to the code relays of the sequence circuit over conductors 1004, 1005 and 1006. However, the disconnect code relay is now energized inasmuch as all connected stations have received the outgoing message traffic, the tape has run out, and the transmitter control circuit has bid for the sending selector to send to all stations a disconnect code to remove their receivers from the line. The operating path for the operation of the disconnect code relay extends from negative battery, through contact 5 of operated relay 5TX, over conductor 529, through contact 6 of operated relay 5TBD, over conductor 530, through contact 2 of operated relay TCB, over conductor 541, over conductor 8TDS, and thence through resistor 906, through the winding of relay 9DISC, thence through resistor 907 to ground.

The disconnect code relay 9DISC operates as any other station code relay to send out a disconnect siganl and to register an answer-back as will be discussed in detail in the sequence circuit description of code relay operation.

After the answer-back signal is received by the sequence circuit, as will be discussed later, the disconnect relay 9DISC will be released and as heretofore discussed the answer-back also releases relay 5TX. The only remaining unreleased relays are 5TCB and 5TOL. The operation of the nonlocking clear key 536 Fig. 5, is mechanically interlocked with the station code keys 10STA keys K1 to K10, and its operation will release the code keys and the send key mechanically and the relays 5TCB and 5TOL electrically as will be described. The operation of clear key 536 removes at its No. 2 contact positive battery from the operating winding of relay 5TCB normally applied over conductor 535. Mechanical release of the send key K1 remove ground at its No. 1 contact over conductor 1TOL, from the winding of relay 5TOL which releases.

The equipment is now normal and idle and ready for transmission of messages again.

*Automatic interruption of transmission at the relay center and at outlying stations during selector sender code transmission*

A full duplex arrangement permits simultaneous transmission and reception of teletypewriter messages at the relay center. However, as indicated in the description of transmitter start and receiver cut-on operation, both the sending and receiving channels are utilized for the sending of transmitter start and receiver cut-on codes and the reception of answer-back codes at the relay center.

If the relay center is sending teletypewriter signals over the line 1 sending channel and the line 1 receiving channel becomes idle, the search and transmitter start cycles will begin at the relay center. During the time that a search or transmitter start code is sent over the line 1 sending channel, line control relay 6LX is operated. Operated relay 6LX removes ground at its open contact 1 from a path previously traced to the winding of the transmitter distributor start magnet 5STR. Accordingly teletypewriter signal transmission will be suspended to allow search and transmitter start codes to be sent over the line 1 transmission channel and answer-backs to be received over the line 1 receiving channel. When the outlying station transmitter starts sending teletypewriter signals over the receiving channel, relay 6LX will release to reenergize transmitter distributor start magnet 5TR, and transmission of the teletypewriter message over the line 1 sending chanel will resume.

If the line 1 receiving channel is busy with teletypewriter traffic from an outlying station and the relay center initiates the transmission of station start codes over the line 1 sending channel, the outlying station that is sending will automatically suspend transmission to allow answer-back from the cut-on outlying stations to be recorded over the line 1 receiving channel at the relay center. The circuits for accomplishing this result will be described hereinafter in the description of an outlying station.

*Alternate transmitter gate operation*

Each transmitter gate and its associated key panel are normally used for transmission on the same numbered line. That is gate 3 and key panel 3 normally send on line 3. Provisions have been made, however, for any gate to be made available to one alternate line by operation of the alternate key 1ALT through 6ALT of Figs. 1 and 2. Each of the two multiple gate transmitters have three gates which are numbered 1 to 6. Each gate is available for two lines. For instance, gate 1 is available on lines 1 or 4. Gate 4 can similarly be connected to lines 4 or 1. Assuming there is tape in transmitter gate 1 which it is desired to send on line 4, the operator will depress the station calling code buttons associated with line 1 and will then operate the alternate key 1ALT K1 associated with line 1 but having a crossover to line 4. The alternate button 1ALT K1 depressed on line 1, will operate relay 5TEL rather than relay 5TOL as was described previously when the send key 1SEN K1 for line 1 was depressed. Ground is applied through contact 1 of key 1ALT K1, over conductor 1TEL, through the winding of relay 5TEL, over conductor 542, through resistance 5R1 to positive battery and accordingly relay 5TEL operates.

Operated relay 5TEL will then operate relay 5TBD to bid for the use of the selector sender. This path is traced from positive battery through contact 7 of released relay 5TOL Fig. 5, of line 4, over conductor 5TB fourth Fig. 5 into cable 550 upper, through 550 lower into the first Fig. 5 circuit on conductor 5TD, thence through contact 5 of operated relay 5TEL, over conductors 543 and 504, through the winding of relay 5TBD, over conductor 505, through the No. 6 contact of released relay 5TCB, over conductor 506, through the No. 11 contact of released relay 5TD, over conductors 507 and 544, through the No. 2 contact of operated relay 5TEL to ground.

With relay 5TBD operated, all circuit functions are identical to those described hereinbefore when the send key 1SEN K1 was operated.

The operation of the alternate key 1ALT K1 on line 1, in addition to starting the relay action discussed above, also connects the tip and ring side of line 4LST and 4LSR into the transmitter gate of line 4 in order that codes and messages may go out on line 4 from transmitter gate 1 normally associated with line 1.

The transmitter distributor loops at the relay center for transmitting over the line sending channels will be described for three illustrative situations: (*a*) transmission over line 1 sending channel from transmitter gate 1, normally associated with line 1, with the key 1SEN depressed, (*b*) transmission over line 1 sending channel from transmitter gate 4, normally associated with line 4, with key 4ALT depressed, and (*c*) transmission over lines 1, 4, 5, and 6 sending channels from transmitter gate 1, normally associated with line 1, with keys 10MA and 10MAT depressed.

The transmission loop for sending over the line 1 sending channel from transmitter gate 1 normally associated with line 1 with the send key 1SEN depressed, extends from Fig. 1 line 1LST, through the No. 1 contact of relay 6XS Fig. 6, over conductor 6LSR, through contact 5 of released alternate key 1ALT, through contact 4 of operated key 1SEN, over conductor 1007, and looping through contact 7 of released key 10MA Fig. 10, over conductor 5TR, through the transmitter distributor contact Fig. 5, over conductor 5TT, through the No. 4 contact of released key 10MA, to conductor 1008, and thence extending through the No. 2 contact of operated key 1SEN, through the unoperated key 1ALT contact 4, over conductor 102 Fig. 1, through contact 3 of unoperated key 4ALT, over conductor 101 and conductor 1LSR Fig. 1. The transmission loop, therefore, has been traced in a serial path extending through the transmitter distributor contacts and through a contact associated with the sending relay 6XS which responds to signals programmed from the sender selector, so that the transmission loop through the relay center will transmit to the line 1 sending channel selector sender control function and transmitter distributor teletypewriter signals.

The sending key 1SEN associated with line 1 will not be depressed if it is desired to send from transmitter gate 4 over the line 1 sending channel. However, key 4ALT will be depressed and the transmission loop will extend through the circuits associated with the line 4 of the relay center so that the codes and messages will go out on the line 1 sending channel from the circuitry and transmitter distributor associated with line 4. This transmission loop is traced from conductor 1LST Fig. 1, through contact 1 of relay 6XS of the line control circuit associated with line 1, over conductor 6LSR, through the No. 5 contact of released key 1ALT, through the No. 3 contact of released key 1SEN, through the No. 4 contact of released key 1ALT, over conductor 102, through the No. 7 contact of operated key 4ALT, over conductor 1009, thence through a loop in the control circuits associated with line 4 similar to that traced between conductors 1007 and 1008 of line 1 to conductor 1010, and thence extending through contact 2 of operated key 4ALT, over conductor 101 to conductor 1LSR Fig. 1.

*Multiple address feature*

The multiple address feature is used to send messages from one transmitter to stations on two or more lines simultaneously. This is accomplished by connecting the lines to a hub circuit.

The operator at the relay center desiring to send a message to stations on lines 1, 4 and 6, will depress the code keys of stations of destination on each line on the panel associated with each line. He will then depress the No. 10MA key shown in Fig. 10, which is associated with each line panel. He will then depress the send keys 1SEN, 4SEN, and 6SEN. This code and send key operation will send out cut-on codes on each of the lines in the normal manner, as described previously in detail for line 1, thereby to connect the desired outlying stations to their respective line sending channels. The 10MA key associated with each line will hold this receiver cut-on connection until the relay center is ready to transmit. The manner in which the 10MA key holds this connection and prevents transmission until all stations on all lines have been connected will be described in detail for line 1 and is applicable to what occurs on lines 4 and 6.

The depression of key 10MA of line 1, prevents the operation of relay 5TA, the auxiliary transmitter relay, which is normally energized to complete an operating path to the transmitter start magnet 5STR, by grounding the operating battery normally applied to relay 5TA. This path extends from ground through contact 3 of relay 5TCB, over conductor 1011, through contacts 1 and 2 of operated key 10MA, thence over conductor 1012, to the winding of relay 5TA, thereby shorting out positive battery normally applied through resistor 517 to the winding of relay 5TA. An identical result is accomplished by the depression of the 10MA key assigned to lines 4 and 6.

The operation of key 10MA, interrupts at its contacts 4 and 7 the connections between transmitter distributor leads 5TT and 5TR and conductors 1008 and 1007, extends leads 5TT and 5TR to contacts 1 and 3 of key 10MAT, and transfers conductors 1008 and 1007 to contacts 5 and 7 of key 10MA where they connect to conductors 1014 and 1013 respectively.

Conductor 1013 connects to the armature of relay L1 and conductor 1013 extends to the left hand contact of the armature of relay L1. Therefore, the armature of relay L1 is now in the transmission loop, previously traced for line 1, and when the armature moves to the left and returns it will close and open the line 1 sending channel.

The transmission loops of lines 4 and 6 are similarly transferred from their line transmitter distributor contacts to the armature and left hand contact of relays L4 and L6 respectively, which will control the signals transmitted over the lines 4 and 6 sending channels.

Relays L1, L4, and L6 are keyed from master relay 407 which will in turn be keyed from the distributor contacts of the transmitter having the tape desired to be transmitted.

Figure 4:
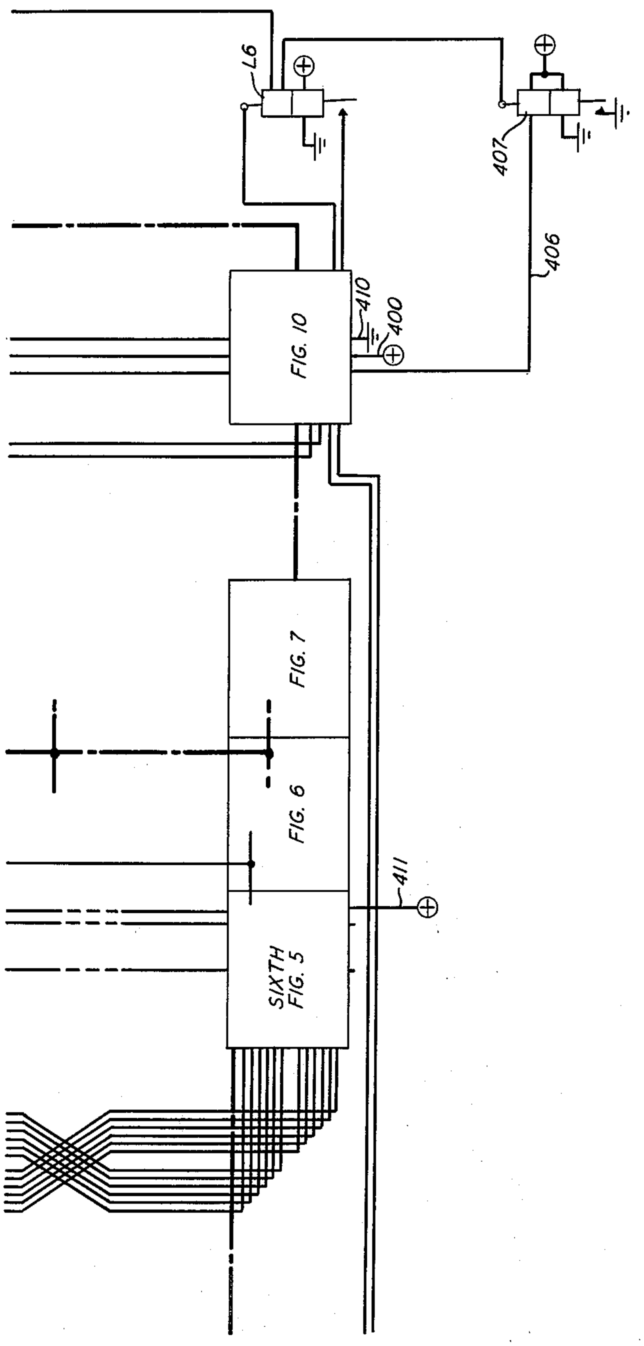
Figure 16:
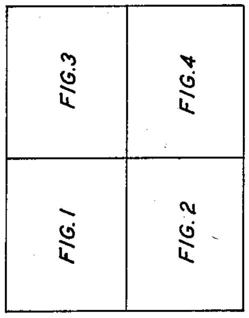

In Fig. 4 a common positive battery is shown extending over conductor 400, into the Fig. 10 circuit for line 6. This common battery lead loops through all the 10MAT keys of the various lines and the path through the Fig. 10 circuit of line 1 will be described as illustrative. The common battery lead after it has looped through the Figs. 10 circuits of lines 6 through 2, enters the Fig. 10 circuit of line 1 over conductor 401. In the first Fig. 10, the common battery lead 401 is extended through contact 5 of unoperated key 10MAT, over conductor 402, through diode 403, over conductor 404 into the circuits of all Figs. 10 and specifically over conductor 1015 into the first Fig. 10, thence through the No. 3 contact of operated key 10MA, over conductors 545 and 513 through the winding and contact 7 of relay 5TD, the transmitter distributor relay, over lead 512, through the No. 10 contact of operated relay 5TX, over conductor 511, thence through contact 3 of relay 5TCB to ground. Accordingly, positive battery has been extended from Fig. 4 over conductor 400, through the unoperated MAT keys of all line circuits, to the MA keys of all circuits, and as shown for line 1 if the key, such as 10MA, is depressed the transmitting distributor relay such as 5TD associated therewith will be energized and accordingly all transmitters on lines to which the message is to be sent that do not have tape in their gates have their transmitter distributor relay such as 5TD operated.

When all the addressed stations on the various lines have been selected, the multiple address transmit key 10MAT for Fig. 1, is operated inasmuch as this is the key associated with the transmitter gate that we desire to send from. The depression of the 10MAT key of Fig. 10 for line 1, releases mechanically key 10MA which opens at its No. 1 contact the positive battery path previously traced, over lead 545, to the junction of leads 513 and 514, and thence to the winding of relay 5TD, thereby enabling positive battery previously applied over lead 545 to be replaced by negative battery applied through the six pin contact 538 of the transmitter distributor associated with line 1 over conductors 515, 514, and 513 to the winding of relay 5TD. The release of key 10MA also opens at its No. 2 contact the grounding path applied over conductor 1012, to one side of relay 5TA, thereby enabling positive battery, through resistor 517 to be reapplied to relay 5TA which will operate and close at its No. 2 contact an operating path for the transmitter start magnet 5STR of line 1.

Conductors 5TT and 5TR, the transmitter distributor contact leads of the first Fig. 5, are connected to master relay 407 of Fig. 4 over a path extending from ground, through contact 1 of operated key 10MAT, over conductor 1016, over conductor 5TT, through the transmitter contacts of the transmitter distributor of Fig. 5 line 1, thence over conductor 5TR, conductor 1017, through the No. 3 contact of operated key 10MAT, thence over common conductor 405, to loop through the unoperated MAT keys of all other lines, thence over conductor 406, through the winding of master sending relay 407 Fig. 4 to positive battery. Accordingly, the opening and closing of transmitter contacts associated with the gate 1 transmitter of line 1 will key the master relay 407 which will key the other line relays 1L through L6, as shown in Figs. 3 and 4, to effect transmission of the message over all line sending channels simultaneously.

At the end of the tape the automatic disconnect is sequentially transmitted over the sending channels of lines 1, 4, and 6 in the manner described hereinbefore in detail for line 1.

*Common sequence circuit*

The common sequence circuit functions to control the sequence and type of code sent by the sending selector of Fig. 11 to the outlying station and to recognize the answer-back received from the outlying station. The sequence circuit is primarily shown in Figs. 8 and 9 of the drawings.

One sequence circuit is common to all lines. The individual transmitter control and line control circuits Figs. 5, 6, and 7, respectively, as previously described bid for the use of the sending selector and sequence circuit through their bidding relays, 5TBD and 6LBD.

The operation of the sequence circuit is such that it can control the length of code pulses sent by the selector sender of Fig. 11, and in the case of receiver cut-on codes it will control the sequence in which these codes are sent to the line; however, as previously described in our detailed description of the line control circuit Figs. 6 and 7, the sequence in which transmitter cut-on codes are sent to the line is determined by the stepping selector 7B.

In the description of the transmitter control circuit it is indicated that the depression of individual station calling keys followed by the depression of the send or alternate key associated with a particular line will activate the selector sender and cause station cut-on codes to be sent over the particular lines sending channel. These codes are sent in sequence depending upon the individual stations code relay position in the sequence circuit. Each individual station cut-on code signal transmission will normally be responded to by an answer-back signal to indicate that a teletypewriter has been selected at the outlying station. If an answer-back is not received the individual station cut-on code will be sent again. If the answer-back is still not received an alarm is given at the relay center. No other station codes may be sent until this alarm is retired.

As in the description of the transmitter control circuit Fig. 5, it will be assumed that a message has been received at the relay center after a search and poll cycle of the line control circuit, and further that the message is to be directed to outlying stations 1 and 10 of line 1.

In the description of the transmitter control circuit, the operation of relay 5TX to effect application of negative battery to the code relays of the sequence circuit was described. Negative battery on code leads 904 and 905 of Fig. 9, due to the operation of relay 5TX, will operate code relays 9A and 9J. The operating path for relay 9A extends from negative battery on conductor 904, through resistor 906, through the winding of relay 9A to ground. The operating path of relay 9J extends from negative battery over conductor 905, through resistor 907, through the winding of relay 9J to ground. Code relay 9A locks in a path extending from negative battery, through the No. 7 contact, over resistor 906, through the winding of relay 9A to ground. Relay 9J, upon operating, locks from negative battery, through its No. 7 contact, over resistor 907, through the winding of relay 9J to ground.

The operated code relays 9A and 9J connect timing capacitors 9C14 and 8C15 to the proper sender selector input conductors 1142 through 1147 thereby to lengthen the pulses necessary to form the code associated with the operated code relay which is nearer circuitwise to the timing capacitors 9C14 and 8C15, which in this case is code relay 9A. Capacitor 9C14 is connected through contact 2 of released relay 9DISC, through contact 3 of released relay 9TSC, over contact 4 of operated code relay 9A, thence over conductor 908 to the contact 4 of operated relay 9J, through the No. 3 contacts and armatures of unoperated relays B through I and to the No. 3 contact of operated relay 9A where there is no further connection. Therefore the code corresponding to that of relay 9A does not have a pulse lengthened by condenser 9C14, as condenser 9C14 is not connected to any one of the sender input conductors 1142 through 1147 when relay 9A operates. However, ground through the No. 2 contact of unoperated relay 8DS, through capacitor 8S15, over conductor 903, through the No. 1 contact of unoperated relay 9TSC, and through the No. 2 contact of operated relay 9A, over conductors 909 and 910, is applied to input lead 1143 of the selector sender. Accordingly the code associated with station 1, 10STA key 1 and code relay 9A will have a pulse lengthened corresponding to the connection of timing condenser 8C15, to input conductor 1143 of the selector sender circuit of Fig. 11.

When the code relays 9A and 9J operated they opened the chain ground circuit which held relay 8ST normally operated. This chain ground circuit extends from ground Fig. 8 over contact 2 of unoperated relay 8AB, over conductor 911, through the No. 6 contact of unoperated relay 9DISC, over conductor 902, through contact 4 of unoperated relay 8DS, over conductor 802, through the No. 6 contact of unoperated relay 9TSC, and through the No. 6 contacts of code relays 9A through 9J, thence over conductor 901, through the No. 5 contact of unoperated relay 8MC, to the winding of relay 8ST, thence over conductor 801, through the No. 1 contact of relay 11ST to positive battery. Accordingly the operation of code relays 9A and 9J, open at their No. 6 contacts the path just traced, therefore, relay 8ST releases and allows positive battery to be applied to the selector sender Fig. 11 which will be activated and to commence sending over the line 1 sending channel the cut-on code associated with station 1 and code relay 9A. The activation path extends from positive battery, through contact 1 of unoperated relay 11ST, over conductor 801, through contact 1 of released relay 8ST, through contact 1 of released relay 8SU, over conductors 809 and 1101, through resistors 1130 and 1100, to the starting anode of tube 11ST. Tube 11ST of the selector sender, as described in detail hereinafter, will fire and energize the selector sender starting relay 11ST which will lock and initiate the sender action.

Relay 11ST, upon operating, closes a path from positive battery through its No. 2 contact over conductor 1129, through the winding of relay 8SU to ground, to energise slow-release relay 8SU which opens at its No. 1 contact the path previously traced to the start-anode of tube 11STC of Fig. 11, thereby to keep the sending selector starting connection opened until the selector sender has sent the desired code to the line and completely cleared out. This prevents activating the sender again before it has received an answer-back, and cleared.

The station code is sent over the line 1 sending channel, as previously described, by the line sending relay 6XS which is controlled over a path extending from ground through the No. 4 contact of relay 11TS, over conductor 8XS, conductors 613, 614, the No. 10 contact of relay 6LX, conductors 615, 616, through the winding of relay 6XS to negative battery. The sequence circuit has set up a code which the sender selector of Fig. 11 programs on relay 11TS which will open and close its No. 4 contact to energize and release the sending relay 6XS to open and close the line 1 sending channel comprising conductors 1LST and 6LSR.

The selected outlying station will respond to its calling code by sending an answer-back signal comprising a short open of the line 1 receiving channel. This answer-back, previously referred to in the description of the transmitter control circuit, will apply ground to the 8AB lead of the sequence circuit, thereby shorting out the battery which normally applies operating potential through resistor 8R1, and over conductor 803, through the operating winding of relay 11AB to ground. Accordingly, relay 11AB releases on the answer-back signal and applies positive battery through its No. 1 contact, through the No. 5 contact of operated relay 11P1, over conductor 1104, through contact 1 of operated relay 11P8, over conductor 804, over conductor 805, through the winding of relay 8AB Fig. 8, and resistor 8R2 to ground. Therefore relay 8AB in the sequence circuit is operated in response to receipt of the answer-back signal. This momentary energization of relay 8AB, during the duration of the answer-back signal, applies positive battery to the previously traced chain ground circuit, through coding relays 9A through 9J and thereby to shunt and release the code relay whose code has just been transmitted. The path for accomplishing this extends from positive battery through contact 3 of operated relay 8AB, over conductor 911, through contact 6 of unoperated relay 9DISC, over conductor 902, through contact 4 of unoperated relay 8DS, over conductor 802, through contact 6 of unoperated relay 9TSC, and through contact 5 to one side of operated relay 9A.

As described hereinbefore, negative holding battery was applied over conductor 904, through resistor 906, to the winding of relay 9A. This negative holding battery charged capacitor 912 negatively. However, the positive battery applied in a path just traced from operated relay 8AB starts to change the charge on capacitor 912 to a positive one. At a certain point in this transition a no-current condition exists which will release the relay 9A. Relay 8AB of Fig. 8 is a slow-release relay because of the varistor 810 across its windings and therefore stays operated long enough to insure the release of the code relays during the transistion of capacitor 912 from a negative to a positive charge.

The release of code relay 9A still leaves code relay 9J operated. Relay 8ST still has its chain ground operating path through the contacts of relay 9J, as previously described. When the sending selector clears, as will be later explained in the operation of the sending selector, it releases relay 11ST in the sender circuit which in turn will release the slow-release relay 8SU. Relay 8SU, upon releasing after a time delay, will close the starting path for the sender selector at its No. 1 contact and allow positive battery to activate the sending selector again.

If other relays, 9B to 9N for instance, were operated the coding and release procedure described for relay 9A would be repeated sequentially until all were released. Relay 9J remains operated to hold open the chain ground circuit thereby permitting reactivation of the sending selector. Condenser 9C14 is connected through contact 2 of unoperated relay 9DISC, contact 3 of unoperated relay 9TSC, through the No. 3 contacts of unoperated relays 9A through 9I, thence through the No. 4 contact of operated relay 9J, over conductor 908, to the No. 4 contact of unoperated relay 9A to an open path. Accordingly, in this code as in the code for relay 9A, the condenser 9C14 is not utilized to lengthen a code pulse. The application of condenser 8C15 over conductor 903, through the No. 1 contact of unoperated relays 9TSC and 9A through 9I is transferred through contact 2 of operated relay 9J, over conductors 913 and 914 to sender input conductor 1146. The pulse transmitted by the sender selector which corresponds to input conductor 1146 will have the condenser 8C15 applied thereto, and it will accordingly be lengthened to represent the code associated with outlying station 10STA key 10 and code relay 9J.

When the answer-back is received to the code transmitted, corresponding to code relay 9J, code relay 9J will be released in a manner similar to that described for code relay 9A, and as relay 9J is the last relay in the chain circuit of relay 8ST, relay 8ST will operate to open the starting path previously traced for the sending selector of Fig. 11.

*Disconnect feature*

After the outlying stations have been selected and the answer-backs received the message will be sent over the line 1 sending channel. The sending of a disconnect code at the end of the tape is accomplished in the same manner as any other code transmission. Negative battery applied over conductor 1031 from the transmitter control circuit and thence through resistor 906 to the winding of disconnect relay 9DISC and resistor 907 to ground, will energize relay 9DISC. The operation of relay 9DISC opens the chain ground start lead and extends capacitors 8C15 and 9C14 to the sending selector similar to the operation of relays 9A and 9J; therefore, the sender is activated and the disconnect code is sent out over the line 1 sending channel.

The disconnect answer-back signal, however, sets up different circuit conditions than the answer-back to the code relays due to the fact that the disconnect is sent to all stations and the answer-backs may come in overlapping due to transmission lag or small variations in relay operating speeds, over long circuits. Accordingly the answer-backs to the disconnect signal are handled in a particular manner. The operation of relay 9DISC operates relay 8DS and a path extending from positive battery, contact 1 of relay 9DISC over conductor 811, through the winding of relay 8DS to ground. An answer-back, as described hereinbefore, will release the answer-back relay 11AB in the sender circuit, energize relay 8AB of the sequence circuit, and release relay 9DISC in a manner similar to the release of relays 9A through 9J. However, operated relay 8DS locks to relay 8AB and holds the chain ground circuit open so that no other operated code relay will be shunted down during an exceptionally long answer-back period such as may be encountered in response to a disconnect code. The locking path is traced from ground through the winding of relay 8DS, through contact 3 of operated relay 8DS, and through the No. 1 contact of operated relay 8AB to negative battery. The chain ground circuit is traced from positive battery, contact 3 of operated relay 8AB, over conductor 911, through contact 6 of relay 9DISC released, over conductor 902, to the open contact 4 of operated relay 8DS.

The operated relay 8DS also varies the clear-out time of the sender selector, by increasing it to the long clear-out time instead of the immediate answer-back clear-out time normally used, to further insure all answer-back signals ample time to arrive. This is done at No. 1 contact of operated relay 8DS which opens a path that shunts through diode 807 to the winding of relay 8AB, which results in a slow release of relay 8AB. The sending selector answer-back relay 11AB will then release the sequence selector relay 8AB which in turn will release the 8DS relay to return the circuit to the normal and idle condition again, after all answer-backs have been received.

It is also possible to send a common disconnect manually by depressing the disconnect button 1022 on the line key panel. An operating path for the disconnect code relay 9DISC, with key 1022 depressed extends from negative battery, through contact 5 relay 5TX, contact 6 relay 5TBD, contact 1 relay 5TCB over conductor 1004, through contact 3 key 1022 over conductor 1031, resistor 906 through the winding of relay 9DISC to ground. Lamp 1024 will light when this relay is energized and will be extinguished when relay 9DISC is released.

*Broadcast code*

A master connect code arrangement to enable selection of all outlying stations simultaneously is also provided. The depression of master connect key 1023 will extend the negative battery traced above to the No. 3 contact of key 1022, through the contact of key 1023 over conductor 1030 through the winding of relay 8MC to ground.

Operated relay 8MC will lock, complete at its 1 and 2 contacts, paths from timing condensers 8C15 and 9C14 to the grids of tubes 11TSH and 11TMH which will cause the sending of an all long pulse code signal as hereinbefore described, and open at its contact 5 the chain ground circuit for relay 8ST which will effect the actuation of the selector sender.

*No answer-back alarm*

In the event there is trouble at a particular outlying station an answer-back may not be received. Accordingly, the address code of the particular station will be sent twice before an alarm is given in. If an answer-back is not received, the short time clear-out, described hereinafter, will not occur and the code relay associated with the station code transmitted will not be released in the manner previously described. Energization of the sender clearing relay 11CLR Fig. 11, after a predetermined time period, will release relay 11ST which at its No. 2 contact will open the circuit through relay 8SU thereby enabling another starting pulse to be applied over lead 1101 to the starting tube 11STC. The chain ground circuit is still intact inasmuch as the code relay which just programmed the code has not been released by the answer-back signal, therefore the identical code will be transmitted by the sending selector to the outlying station.

If an answer-back still is not received, repetitive codes for the same outlying station would continue to be sent out. However, after the second sending of the code signal an alarm circuit will become operative and preclude further repetitious sending of the particular outlying stations cut-on code. The alarm tube 8ALMT of Fig. 8 normally is prevented from firing by the intermittent application of ground, over contact 2 of relay 8ST and over contact 2 of relay 8BA. With relay 8ST released, relay 8BA will operate over a path extending from negative battery, through the No. 4 contact of released relay 8ST, through the winding of relay 8BA to ground and accordingly ground is removed from the plate of tube 8ALMT at the No. 2 contact of relay 8ST released, and at the No. 2 contact of relay 8BA operated, while a code signal is being sent to the line. Relay 8AB operates in response to an answer-back signal and ground is reapplied to the starting anode 1 of tube 8ALMT, through the No. 4 contact of operated relay 8AB and over conductor 813, therefore, tube 8ALMT will not fire.

However, if an answer-back is not received during the period of two transmission code times, relay 8AB will not operate to ground tube 8ALMT therefore it will time out and operate relay 8ALMT which locks. Positive battery is applied through resistor 814, over conductor 813, to the starting anode 1 of tube 8ALMT which is timed to fire at the end of two coding periods and clear-out times, therefore tube 8ALMT will conduct and energize relay 8ALM in a path extending from ground, through cathode 2 and plate 3 of tube 8ALMT, through the winding of relay 8ALM, over conductor 815, through the No. 3 contact of selector release key 546 Fig. 5, thence over conductor 547, and through the No. 3 contacts of the selector release keys in the Fig. 5 circuits of all lines to conductor 411 and positive battery in Fig. 4.

Relay 8ALM, upon operating, locks through ground its No. 2 contact and extinguishes tube 8ALMT. Operated relay 8ALM will close at its contact 1 an operating path for audible alarm 830 and can only be released by the manual operation of the selector release key 546 which will open the serial path extending from the winding of relay 8ALM, over conductor 813, through the No. 3 contacts of all selector release keys to positive battery over conductor 411 Fig. 4.

*Automatic non-interfering tape feedout arrangement*

In Fig. 12 a representative showing of a reperforator and a detailed showing of its associated non-interfering tape feedout circuit, is presented as illustrative of the six reperforator and tape feedout arrangements associated with the relay center. The reperforator of Fig. 12 represented by selector magnet 12SEL and a dotted block may be of the type disclosed in Patent 2,255,794, issued to R. A. Lake on September 16, 1941, which is herein incorporated by reference. In Fig. 1 incoming signals are received over the line 1 receiving channel conductors 1LRT and 1LRR which terminate in Fig. 6 at the winding of relay 6R which repeats the signals incoming over the line. The opening and closing of contact 3 of relay 6R, applies or removes the ground associated with the armature thereof from a path extending over conductor 620, conductor 1LMK, through the contact 1 of operated key 1ROTR1 K1, assuming that reperforator 1 is associated with line 1, thence through the contacts 2 of the unoperated keys K2 to K6 of reperforator 1ROTR, over conductor 201, through the winding of relay 12LR Fig. 12, thence over conductor 1201, and through relay 12L to positive battery. Accordingly line relay 12LR and relay 12L will repeat the signals received by receiving relay 6R of Fig. 6. The reperforator receiving select magnet 12SEL tied to positive battery on one side of its winding will either have ground or positive battery applied from the armature of the line relay 12LR and over conductor 1202, to the other side of its winding, in accordance with the marking or spacing condition of the line 1 receiving channel. Therefore select magnet 12SEL will also follow the signals incoming over the line 1 receiving channel, with the exception discussed hereinbefore, when ground is applied over conductor 201 to blind the reperforator against recording of outgoing control and received answer-back signals.

The tape feedout circuit will now be discussed. The line relay 12LR is in its marking condition with the armature to ground, therefore, relay 12L will be operated. Relay 12TS is also locked operated in a path extending from positive battery through the winding of relay 12TS, through its No. 3 contact, over conductor 1202, through the No. 1 contact of relay 12L to negative battery. Relay 12L being operated, has removed negative battery at its No. 3 contact from conductor 1203, and the timing charging circuit of condenser 1204 which controls the firing of tube 12T1. If a spacing signal is received over the line before the timing circuit of tube 12T1 has timed out, negative battery will be reapplied at contact 3 of released relay 12L to conductor 1203 and the time charging circuit thereby to prevent the firing of tube 12T1. Also the release of relay 12L on a spacing signal will open at its No. 1 contact the locking circuit for relay 12TS which will also release.

Alternate spacing and marking conditions on the line will therefore prevent the firing of tube 12T1.

However, at the end of the message a prolonged marking period will occur and relay 12L, upon operating, will remove at its No. 3 contact the negative battery applied to conductor 1203 and the charging circuit of condenser 1204. If this marking interval at the end of the message persists the charging circuit will time out, conduction in tube 12T1 will begin. An operating path for relay 12FO will now be complete from negative battery cathode to plate of 12T1, over conductor 1205, through the No. 1 contact of unoperated relay 12FO, through the winding of relay 12FO to positive battery. Relay 12FO, upon operating, connects negative battery to tape feedout magnet 1206 over a path extending from negative battery, through contact 2 of operated relay 12L, through contact 6 of operated relay 12FO, through contact 4 of unoperated relay 12TS, through the winding of the tape feedout magnet 1206 to positive battery. Accordingly, at the end of the message feedout of tape will begin automatically.

The operation of relay 12FO also removes at its No. 1 contact the positive battery previously applied over conductor 1205 to the plate of tube 12T1 thereby extinguishing this tube. Relay 12FO, upon operating, locks in a path traced from positive battery, through the winding and contact 2 of relay 12FO, over conductor 1207, through contact 1 of unoperated relay 12TS to negative battery. Operated relay 12FO also prepares at its No. 5 contact an operating path for relay 12TS, the tape stop relay, to provide a non-interference feature in the event the 12L relay responds to a spacing pulse at the start of another message. In the event a spacing pulse is received from the line during tape feedout, the tape feedout will be suspended by the operation of relay 12TS, over a path extended from negative battery, through the No. 4 contact of relay 12L released on spacing, over the No. 5 contact of operated relay 12FO, through the winding of relay 12TS to positive battery. Operation of relay 12TS will open the previously traced path for tape feedout magnet 1206 at its No. 4 contacts.

In the event the line does not return to spacing, relay 12L will remain operated in the marking condition. The operation of relay 12FO applies at its No. 3 contact positive battery to the charging circuit of condenser 1208 which begins its timed charging prior to firing of relay 12T2. After a predetermined time which is related to the amount of tape desired to be feedout, the charging circuit of condenser 1208 will force conduction in tube 12T2. The firing of tube 12T2 will operate relay 12TS in a path extending from negative battery to the cathode and plate tube 12T2, through contact 2 and winding of unoperated relay 12TS to positive battery. Accordingly, the tape stop relay 12TS is operated after a predetermined amount of tape has been feedout with the incoming line remaining in the idle marking condition.

Relay 12TS, upon operating, locks over a path extending from positive battery, through the winding of relay 12TS, through contact 3 of this relay, over conductor 1202, through the No. 1 contact of operated relay 12L to negative battery. This locking path prevents further feedout while the line relay 12L remains marking by keeping open the operating path for tape feedout magnet 1206 at the No. 4 contact of operated relay 12TS. The operation of relay 12TS also removes at its No. 2 contact positive battery from the plate of tube 12T2 thereby extinguishing this tube. Relay 12TS, upon operating, also removes at its No. 1 contact negative battery applied over conductor 1207, through the No. 2 contact and winding of operated relay 12FO to positive battery. Accordingly, locked relay 12FO releases.

Consequently, the circuit just discussed provides automatic tape feedout to clear the tape from the punch block after completion of the message. Its operation is such that tape feedout will stop after a certain desired amount of tape clears the punch block and further feedout will be prevented during the remainder of the idle line interval. The circuit also incorporates provision for immediate stopping of the tape feedout if transmission should start. It is also possible to provide a key for manual feedout of the tape although such a key is not shown. The tape feedout and stop delay intervals may be changed by varying the resistances of the time constant networks associated with tube 12T1 and condenser 1204, and tube 12T2 and condenser 1208.

*Sending selector circuit*

Fig. 11 contains the circuits of a sending selector, by means of which the transmission of the search code, transmitter start codes, station selecting or cut-on codes, disconnect and other codes are transmitted, as hereinbefore stated. The principal components of the sending selector are a start relay 11ST, a start relay control tube 11STC, which is preferably a cold cathode gas-filled tube, a marking signal transmission control relay 11TM, a spacing signal transmission control relay 11TS, a spacing signal relay control tube 11TSC, which is also preferably a cold cathode gas-filled tube, a twin triode tube comprising left-hand triode 11TSH and right-hand triode 11TMH, a chain of counting relays comprising relays 11P1, 11P2, 11P3, 11P4, 11P5, 11P6, 11P7 and 11P8, a clearing or release relay 11CLR, and an answer-back relay 11AB.

In the idle condition of the sending selector of Fig. 11, the relays 11AB and 11TM are normally operated, the former being energized over conductor 803 as previously described, and the latter being energized in the anode circuit of triode 11TMH, which is conductive. Triode 11TMH conducts at this time by virtue of a positive potential applied to the grid of that triode in a potential divider circuit traced from positive battery through resistor 1105, armature and contact 2 of relay 11TS, conductor 1110, resistor 1115, conductor 1120, to which the grid of tube 11TMH is connected, conductor 1106, resistor 1107, and variable resistor 1108 to negative battery. The potential applied to the grid is sufficiently positive to render tube 11TMH conductive. Triode 11TSH is also conductive at this time by virtue of a potential applied to the grid through a potential divider circuit from positive battery, armature and contact 3 of relay 11ST, resistor 1125, conductors 1109 and 1111, resistor 1112, conductor 1113, to which the grid of triode 11TSH is connected, and resistor 1114 to negative battery. Positive battery for the anode of tube 11TSH is extended through the contact 3 and armature of operated relay 11AB, resistor 1116 and conductor 1117 to the anode of triode 11TSH. The control electrode of tube 11TSC is also connected to conductor 1117, and the cathode theroef is grounded. With triode 11TSH conductive, the anode of tube 11TSH holds the control electrode of tube 11TSC below the control gap firing potential so that the latter tube is not conductive. Anode battery for gas-filled tube 11TSC is supplied through contact 4 and armature of relay 11ST when that relay becomes operated, conductors 1118, 1119, 1121, 1122 and 1123, resistor 1124, armature and contact of relay 11TM, which in the idle condition is operated because triode 11TMH is conductive, winding of relay 11TS, and contact 3 and armature of relay 11P8 to the anode of tube 11TSC. Because relay 11ST is not operated, this circuit is open.

Either of the triodes 11TSH and 11TMH may be cut off by removal of positive battery from the previously traced potential divider circuits associated with their grids. Connected between ground and the grids of triodes 11TSH and 11TMH are capacitors 1126 and 1127, respectively. These capacitors delay the cutting off of the respective triodes upon the disconnection of positive battery from the grid circuits, and in the absence of any other capacitor connections to the grid circuits, will cause the cutting off of the triodes approximately 60 milliseconds following disconnection of positive battery. Association of other capacitors with the grid circuits will produce increases in the time required for cutting off of the triodes, as will be described.

The signal which the sending selector in Fig. 11 is adapted to transmit consists of alternate spacing and marking elements, the initial and the final conditions of the transmission circuit, which transmission control relay 11TS controls, being marking. The signal consists of four spacing elements with three intervening marking elements, and each of the seven elements may be short or long. The signal elements are short when only capacitors 1126 and 1127 are connected to the grid circuits of the triodes, and are long when these capacitors are supplemented by other capacitors. The first spacing element is invariably long, the duration being nominally 400 milliseconds, but being adjusted to equal the duration of three successive start-stop permutation code signals having five significant or selecting elements.

*Activation of the sending selector circuit*

As set forth hereinbefore, the sending selector in Fig. 11 is adapted to be activated to transmit a search code, by means of which an inquiry is made on the outgoing transmission channel of any full duplex line as to whether or not a message is awaiting transmission at any station associated with the line, a transmitter start code individual to each station on the line, by means of which transmission of a waiting message at an outlying station is started, a station selecting code, individual to each station on the line or common to some or all of them, by means of which one or more teletypewriter receivers are selectively connected to the outgoing transmission channel to receive a message, a disconnect signal, by means of which teletypewriter receivers that have been receiving a message are disconnected at the end of the message, and an emergency stop code, by means of which an outlying transmitter that is transmitting a message to the relay station may be stopped. Activation of the sending selector is accomplished by the application of a battery connection through conductor 1101 and resistors 1130 and 1100 sufficient in potential difference relative to the grounded cathode of tube 11STC to fire that tube. The control gap may be fired by the application of a positive or negative potential to the control electrode and a negative potential may provide more assurance of firing than a positive potential, since it is opposite in polarity to the potential on the main anode, and may tend to produce a direct discharge between control electrode and main anode. The anode circuit for tube 11STC is traced over conductors 1102 and 1128, contacts 6 and 5 of relay 11ST, winding of that relay, conductor 1103, and contact 1 and armature of relay 11CLR, to battery.

When tube 11STC fires, relay 11ST operates, locks from ground through its lower armature and contact 5, and disconnects contact 6 from contact 5, thereby interrupting the anode circuit of tube 11STC, which is quenched. Relay 11ST disconnects positive battery from contact 1 and conductor 801, thereby disabling the energizing circuit for relay 8ST or releasing the latter relay if it were operated at this time. Relay 11ST connects battery through its contact 2 to conductor 1129, which operates relay 8SU to preclude firing of tube 11STC during the transmission of a code by the sending selector. Relay 11ST also disconnects battery from contact 3, thereby permitting capacitor 1126 to charge negatively through resistor 1114. As previously stated, this will be accomplished in 60 milliseconds in the absence of any other capacitor, but a path is traced from the grid of triode 11TSH through resistor 1112, conductors 1111, 1109 and 1131, and armature and contact 1 of relay 11P1 to one terminal of capacitor 1132, the other terminal of which is grounded. This capacitor supplements capacitor 1126 and in combination therewith delays the cutting off of triode 11TSH for an interval of substantially 250 milliseconds. At the end of that interval, triode 11TSH cuts off and its anode goes positive, carrying with it the anode of tube 11TSC which fires, and operates relay 11TS to initiate the transmission of a spacing signal element. The delay in initiation of transmission of the first spacing element, by capacitor 1132, affords time for the accomplishment of functions in the sequence circuit as, for example, the arrestment of a tape transmitter which may have been transmitting to the particular outgoing channel, so that the sending selector may transmit a selecting signal to that line as, for example, the search code for determining whether the transmitter at any station associated with the line has a message awaiting transmission.

*Transmission and counting of first spacing element*

When relay 11ST disconnected positive battery from the grid circuit of tube 11TSH, it connected battery over conductor 1118 to other conductors, some of which have already been identified, to provide for the operation of relays 11P1 and 11P8, and other relays. With relay 11TS operated, an energizing circuit for relay 11P1 is traced from ground through outer upper armature and contact 1 of relay 11TS, conductor 1133, lower armature and contact 4 of unoperated relay 11P6, lower armature and contact 4 of unoperated relay 11P4, armature and contact 4 of unoperated relay 11P2, winding of relay 11P1, and conductors 1134 and 1136, to battery supply conductor 1118. Relay 11P1 operates in this circuit, at the beginning of the spacing element, and performs functions which will be described hereinafter.

Relay 11ST disconnects positive battery from its contact 2, which is connected through conductor 1110, resistor 1115 and conductor 1120 to the grid of triode 11TMH, thereby permitting capacitor 1127, which is charged positively, to discharge and recharge negatively. A connection from conductor 1110 is traced over conductor 1138, and the armature and contact 1 of relay 11P2 to one terminal of capacitor 1139, the other terminal of which is connected to ground. Capacitor 1139 supplements capacitor 1127 and the combination delays the cutting off of triode 11TMH for an interval of approximately 400 milliseconds which, as previously stated, is the duration of the first spacing element of the code combination. Relay 11TS transfers the battery connection which it disconnects from contact 2 to contact 3 and over conductors 1137 and 1111, and resistor 1112, to recharge capacitor 1126. The value of resistor 1112 is very low by comparison with that of resistor 1114 so that capacitor 1126 charges very quickly and renders triode 11TSH conductive. This restores a potential of the anode of triode 11TSH and of the control electrode of cold cathode tube 11TSC to the initial value, but tube 11TSC cannot be cut off by the change in potential of its control electrode and remains conductive, maintaining relay 11TS operated. At its armature and contact 4, relay 11TS applies ground to conductor 8XS, which operates relay 6XS to initiate the transmission of the spacing element.

Relay 11P1 connects ground through its armature and contact 3, and the winding of relay 11P2 to the ground terminal of its own winding, in preparation for the energization of relay 11P2, and the locking of the two relays in series. Relay 11P2 cannot operate while ground is applied from relay 11TS through its armature and contact 1, and the path previously described, including the armature and contact 4 of relay 11P2, since both terminals of relay 11P2 are grounded. Relay 11P1 connects the grid circuit of triode 11TSH through its upper armature and contact 2, and the upper armature and back contact 1 of relay 11P3 to conductor 1142, to which a capacitor substantially equal in value to that of capacitor 1139, will be connected by the sender coding circuit in the event that the first marking element of the code, which is the second element of the code, is to be made long, namely of a duration of substantially 400 milliseconds, the capacitor so connected supplementing capacitor 1126. At its contacts 4 and 5, relay 11P1 establishes other connections, the function of which will be described hereinafter.

*Transmission and counting of first marking element*

At the end of an interval of approximately 400 milliseconds, as determined by the combination of capacitors 1127 and 1139, triode 11TMH cuts off, releasing relay 11TM. This relay interrupts the circuit from battery through the winding of relay 11TS to the anode of cold cathode tube 11TSC, releasing relay 11TS, and quenching the tube. At its contact 4, relay 11TS reconnects ground to conductor 8XS to initiate the transmission of a marking condition. At its contact 3, the relay disconnects battery from the grid circuit of triode 11TSH to initiate the negative excursion of the grid to cut off at the end of a time interval determined by capacitor 1126 and the capacitor, if any, connected from the sender coding circuit over conductor 1142, contact 1 and armature of relay 11P3, contact 2 and armature of relay 11P1, and conductors 1131 and 1109 to the grid circuit of triode 11TSH. If a capacitor is connected to conductor 1142, the cutting off of triode 11TSH will require approximately 400 milliseconds. If only the capacitor 1126 is connected to the grid circuit, the triode will cut off in approximately 60 milliseconds.

The reconnection of battery through contact 2 of relay 11TS, as that relay releases, to the grid circuit of triode 11TMH, causes the recharging of capacitor 1127 very quickly, thereby restoring conductivity in the triode 11TMH and reoperating relay 11TM. The latter relay reestablishes the anode circuit for cold cathode tube 11TSC but that tube, having been quenched, will not again be rendered conductive until triode 11TSH cuts off. Relays 11TS, in releasing, disconnects ground from its contact 1, thereby interrupting the previously-traced energizing circuit for relay 11P1 and removing a shunt across the winding of relay 11P2, and the latter relay operates in series with relay 11P1.

At its upper armature, the relay 11P2 disconnects capacitor 1139 from the grid circuit of triode 11TMH, and connects the grid circuit through contact 2 of the relay and the upper armature and back contact 1 of relay 11P4 to conductor 1143, to provide for the coding of a long second spacing element, which is the third element of the code, by the connection of a capacitor having the same value as capacitor 1139, to the conductor 1143 in the coding circuit. At its contact 3 and associated armature, relay 11P2 extends to the right-hand terminal of the winding of relay 11P3 the energizing circuit that originally extended to the winding of relay 11P1. At its contact 5, relay 11P2 establishes a connection, the function of which will be described later.

*Transmission and counting of second spacing element*

When triode 11TSH cuts off under the control of capacitor 1126 and a supplementary capacitor, if any, connected to conductor 1142, it will again fire tube 11TSC, causing the operation of relay 11TS, and the resultant operations performed by it, namely the transmission of a spacing signal element, the restoration of conductivity in triode 11TSH, the initiation of a timing operation, which will result in the cutting off of triode 11TMH, and the duration of which will be determined by the connection or lack of connection of a capacitor to conductor 1143 to supplement capacitor 1127, and finally, the operation of relay 11P3 from ground supplied through contact 1 of relay 11TS. Relay 11P3 extends a connection from the grid circuit of triode 11TSH through its upper armature and contact 2, and the upper armature and contact 1 of relay 11P5, to conductor 1144, for determining whether the next timing cycle of triode 11TSH shall be short or long.

*Transmission and counting of remaining two marking and two spacing elements*

A short or long interval after the operation of relay 11P3, depending upon the time constants involved in the timing of the cut off of triode 11TMH, that triode will cut off, releasing relay 11TM, which in turn will cut off cold cathode tube 11TSC and release relay 11TS. As in the previously described case of the release of the latter relay, the transmission of the next marking element is initiated at contact 4, the timing of an interval leading to the cutting off of triode 11TSH is initiated, conductivity is restored in triode 11TMH and ground is disconnected from conductor 1133, thereby permitting relay 11P4 to operate and lock in series with relay 11P3 from ground supplied through the lower armature and contact 3 of the latter relay.

In like manner, relays 11P5 and 11P6 operate at the beginning of the third spacing and marking elements, respectively, of the code, triodes 11TSH and 11TMH being cut off alternately after intervals determined by the external connection or non-connection of a capacitor to conductors 1145 and 1146. Also, relay 11P7 operates at the beginning of the fourth or final spacing element of the code, at which time triode 11TSH cuts off to fire tube 11TSC and operate relay 11TS, and the final spacing element is of long or short duration, depending upon whether or not a capacitor is connected in the sender coding circuit to conductor 1147 to control the cutting off of triode 11TMH. At its upper armature and contact 2, the relay 11P7 connects capacitor 1148 through contact 2 and upper armature of relay 11P5, contact 2 and upper armature of relay 11P3, and contact 2 and upper armature of relay 11P1, to the grid circuit of triode 11TSH for a purpose which will be described later. At its contact 4, the relay 11P7 connects ground to conductor 8BL for the purpose of blinding a reperforator associated with the incoming channel of the full duplex telegraph circuit over the outgoing channel, of which the sender in Fig. 11 has been transmitting a control signal, as set forth hereinbefore. The reason for this is that a station on the outgoing channel of the full duplex telegraph circuit that selectively responds to a signal transmitted from the sender in Fig. 11 causes to be transmitted over the incoming channel of the circuit an answer-back or acknowledgment signal, and it is undesirable for the reperforator terminating the incoming channel of the circuit in the relay station to respond to that answer-back signal. As will be described hereinafter, message transmission from an outlying station on the telegraph circuit over the channel incoming to the relay station may be in progress at the time that the sender circuit, shown in Fig. 11, transmits a selecting or control signal over the outgoing channel of the circuit. It is necessary to suspend the incoming transmission in order to permit the transmission of the answer-back signal over the incoming channel. The transmitter at any outlying station that is transmitting will be stopped in response to an early signal element in any signal code transmitted by the sender in Fig. 11 and since the blinding of the reperforator receiving such signals is effected by relay 11P7 which operates in conjunction with a signal element late in the signal code transmitted, the blinding of the reperforator at that time will occur after incoming transmission has ceased, and no message material will be lost.

*Clearing of sending selector circuit*

Upon the cutting off of triode 11TMH at the end of the last spacing element of the signal, relay 11TS releases, initiating a timing interval leading to the cutting off of triode 11TSH, the duration of which is determined by capacitors 1148 and 1126. Relay 11TS also causes the operation of relay 11P8 in the same manner that relays 11P6, 11P4 and 11P2 were operated. With relay 11P8 operated, the anode circuit of cold cathode tube 11TSC is transferred from the winding of relay 11TS, to which it was connected through contact 3 of relay 11P8, to the winding of relay 11CLR, the path being traced through an armature and contact 2 of relay 11P8, conductors 1149, 1151, 1102 and 1152, winding of relay 11CLR, conductor 1153, contact 5 and lowermost armature of relay 11P2, conductor 1156 and armature and contact 2 of normally operated relay 11AB to battery. Thus, when triode 11TSH cuts off under the control of capacitors 1148 and 1126, relay 11CLR, instead of relay 11TS, will be operated. The interval required to cut off triode 11TSH under the control of capacitors 1126 and 1148 may be of the order of 800 milliseconds.

At its contact 1, the relay 11P8 extends a connection from contact 1 of relay 11AB through the lowermost armature and contact 5 of relay 11P1, conductor 1104, armature and contact 1 of relay 11P8 to conductor 804. This path is prepared for the operation of relay 8AB in the sequence circuit under the control of the answer-back signal. When that signal is received over the incoming channel of the telegraph circuit, a ground is connected to conductor 803 at the point in Fig. 8 where battery is connected to maintain relay 11AB normally energized. The ground connection shunts the winding of relay 11AB, causing its momentary release.

With relay 11AB released, battery on its contact 2 is extended through contact 1, lowermost armature and contact 5 of relay 11P1, conductor 1104, upper armature and contact 1 of relay 11P8, and conductors 804 and 805 to the winding of relay 8AB, and that relay operates, registering the disconnect signal and effecting controls hereinbefore described. The battery connection is also extended from conductor 804 through varistor 807, contact 1 and armature of relay 8DS, conductor 808, interengaged contacts 5 and 6 of relay 11TS, conductor 1158, resistors 1159 and 1100, to the control electrode of relay 11STC. Capacitor 1161 connected to the junction of resistors 1159 and 1100 is relatively small and briefly delays the building up of a potential on the control electrode of tube 11STC that is sufficient to ionize the control gap. Resistor 1159 is large compared to resistor 1130 through which the firing potential for activating the sending circuit was applied, so that a slight delay in the activation of the sender circuit that was caused by capacitor 1161 was of no significance. The duration of the answer-back signal, which is a spacing condition, may be of the order of 80 to 100 milliseconds, so that the control gap of tube 11STC is ionized before the reoperation of relay 11AB at the end of the answer-back signal. The anode circuit of the 11STC is traced at this time from the anode through conductors 1102 and 1152, winding of relay 11CR, conductor 1153, contact 5 and armature of relay 11P2, conductor 1156, to the upper armature of relay 11AB. From this it will be apparent that tube 11STC is now connected in parallel with tube 11TSC, both being in the energizing circuit for relay 11CLR, and that the control gap of tube 11STC is ionized, while the control gap of tube 11TSC is not. When relay 11AB is reoperated at the end of the answer-back signal, battery will be reconnected through the contact 2 and armature of the relay, to the anode circuit of tube 11STC, and relay 11CLR will operate in the circuit.

Relay 11CLR disconnects battery from its contact 1, thereby interrupting the locking circuit of relay 11ST. Relay 11ST disconnects battery from the relays P1 to P8 and from the winding of relay 11TS, releasing all of the relays P1 to P8 and precluding operation of relay 11TS when relay 11P8 releases. Relay 11ST also disconnects battery from conductor 1129, thereby releasing relay 8SU, and reconnects battery of conductor 801, preparing a circuit for the reenergization of relay 8ST. Relay 11ST reconnects positive battery to the grid circuit of triode 11TSH, thereby suspending the timing operation that was initiated when relay 11TS released to terminate the final spacing element of the signal.

It will be noted that the sender circuit of Fig. 11 has been restored or cleared as a result of reception of the answer-back singal rather than by cutting off triode 11TSH under the control of capacitors 1126 and 1148. The reason for this is that with one exception, which will be described, there is no point in awaiting the cutting off of tube 11TSH in order to effect the operation of relay 11CLR, which requires nearly one second. This would merely delay the transmission of another control or selecting signal by the sender circuit in Fig. 11, and would slow the operation of the system.

The exception involves the response of the sender circuit to answer-back signals resulting from the transmission of a disconnect signal. Several stations on a line may transmit answer-back signals in response to the disconnect signals, and these answer-back signals may be non-overlapping, particularly if the telegraph circuit is long. Such non-overlapping answer-back signals would cause repetitious release and reoperation of relay 11AB. Successive operations and releases of relay 8AB by relay 11AB, were relay 8AB not made slow release, might release relays in the code control circuit representing stored codes which had not yet been transmitted, and such codes would therefore be skipped. In order to preclude operation of relay 11CLR in response to the answer-back signal resulting from transmission of the disconnect signal, the previously-traced circuit for firing the control gap of tube 11STC under the control of relay 11AB includes break contacts of relay 8DS. This relay is operated to initiate the transmission of the disconnect signal. Under this circumstance, tube 11STC cannot be fired in response to the answer-back signal, and the operation of relay 11CLR awaits the firing of tube 11TSC by the cutting off of triode 11TSH under the control of capacitors 1126 and 1148. The delay in the clearing of the sender circuit under this circumstance is adjustable since it avoids a possible difficulty that might result from reception of non-overlapping answer-back signals.

Attention is directed to a path established by relay 11P1, when it operated, from battery on the battery supply conductor 1118, through conductor 1136, armature and contact 4 of relay 11P1 and resistor 1157, to the control electrode circuit of tube 11TSC. The battery connection supplied through resistor 1157 has as its purpose the prevention of interference with the transmission of signal elements by the sender circuit due to response of relay 11AB to spacing signal elements forming part of message signals received from a transmitter at an outlying station. If the telegraph circuit is long, the propagation time, for signal elements initiated by the sender crcuit and for signals being transmitted from an outlying station to the relay station, may delay interruption of transmission at an outlying station in response to the long first spacing element of a control signal, and may correspondingly delay the arrival at the relay center of message signals transmitted prior to the delayed interruption. As a result, teletypewriter signals may be received after the end of transmission of the first long spacing element. Relay 11AB will release in response to spacing portions of such teletypewriter signals, and by disconnecting positive battery from the anode circuit of triode 11TSH, it could prevent firing of tube 11TSC at proper times and thus interfere with control signal transmission. Such interference is precluded by the battery connection supplied through contact 4 of relay 11P1.

Attention is directed to conductors 1166 and 1167 which are connected to the grid circuits of triodes 11TMH and 11TSH and extend to make contacts of relay 8MC, which is operable to initiate transmission of the master connect or broadcast code, in which the three marking and three spacing elements following the long first spacing element are long. Relay 8MC, when operated, connects, directly to the grids of the triode, capacitors equal in value to capacitor 1139. This arrangement renders unnecessary the connection of capacitors to conductors 1142 to 1147 in order to code the master connect code on the sending selector.

The exact length of the first spacing element of a signal transmitted by the sender circuit is determined by the adjustment of variable resistor 1108 associated with the grid circuit of triode 11TMH. This adjustment, which also controls the duration of signal elements 3, 5 and 7, which are also spacing elements, must be made accurately, because the efficient blinding of teletypewriters at remote stations on the telegraph circuit is dependent upon it. As is described hereinafter, at stations where receiving teletypewriters have been connected to the outgoing channel to receive a message, the receiving selectors are arranged to blind the associated teletypewriters at the end of the first signal element from the sender, which is invariably a long spacing element. During the reception of signal element 1 by connected teletypewriters, those teletypewriters will run open as if responding to a break signal. The length of the long first spacing element is, therefore, adjusted so that it permits the receiving teletypewriters to run open for the equivalent time of three free-running blank signals. When a properly timed first spacing signal element ends, the teletypewriter receiving mechanisms will be approaching their stop conditions, and they will be arrested by the beginning of the marking element which follows the long spacing element, and the printing of false characters will not occur. Locking key 1162, when open, adjusts the duration of the first spacing element to correspond to a teletypewriter transmission speed of 60 words per minute and, when closed, it shunts resistor 1107 and adjusts the duration of the first spacing element to correspond to a teletypewriter transmission speed of 75 words per minute.

*Outlying stations on multistation lines*

Figs. 13, 14 and 15, when arranged as indicated in Fig. 1, show the circuits of one of a plurality of outlying transmitting and receiving stations associated with one of the full duplex telegraph circuits that terminate in the relay station. In addition, Figs. 13 and 14 indicate, by a schematic showing, that the station, the circuits of which are shown in full, is neither the first nor the last station on the telegraph circuit, other similarly equipped stations, designated A and J, being associated with the transmitting and receiving channels of the full duplex telegraph circuit.

The two conductors of the channel for transmission of signals from outlying stations to the relay sender are designated by reference numerals 1LRT and 1LRR, as they are in Fig. 1, and the two conductors of the channel over which signals are transmitted from the relay station to the outlying stations are designated 1LST and ILSR. Receiving relays at the several stations are serially connected in the transmission circuit comprising line conductors 1LST and 1LSR, and transmitting contacts or elements are serially connected in the transmission channel comprising conductors 1LRT and 1LRR. In the two stations other than station D shown in detail in Figs. 13, 14 and 15, such other stations A and J being represented by rectangles designated by reference numerals 1401 and 1301 in Figs. 14 and 13, respectively, the looping has been indicated by dotted sections of the transmission paths.

*Receiving and transmitting circuits and equipment of a station*

The receiving instrumentality at the station is a teletypewriter represented by dotted line rectangle 1502, the principal components of the receiving teletypewriter being a selector magnet 1503, keyboard transmitting contacts 1504, and line relay 1506 which operates the selector magnet. The transmitting instrumentality of the station is a tape transmitter represented by components contained in dotted line rectangle 1507. Tape containing message signals to be transmitted by the tape transmitter is prepared in a keyboard-controlled perforator mechanism, which is represented by the dotted line rectangle 1508. Patent 1,965,572, granted July 10, 1934 to C. W. Burcky discloses in combination instrumentalities corresponding to teletypewriter 1502, perforator 1508 and transmitter 1507. The disclosure of this patent is incorporated herein by reference as part of the present specification.

The loop, which includes receiving instrumentalities in Figs. 14 and 15, is traced from the conductor 1LSR as it extends from station A, over conductor 1409, resistor 1511, conductor 1512, line relay 14L, and conductor 1413, to the portion of line conductor 1LSR which extends toward more remote station J. Each of the stations A, D and J has been shown as having its receiving loop connected into conductor 1LSR with conductor 1LST extending directly from the relay center to the most remote station. It will be understood that some of the station receiving loops could be included in conductor 1LST, since transmission at the relay station merely involves opening of the circuit through all of the station loops. The transmission loop of the station D, which has been shown as being connected in conductor 1LRR, includes conductor 1414, armature and contact 1 of relay 14AB, conductor 1416, left-hand break contacts of two-way key 1513, conductor 1514, stop segment, brushes and inner solid ring of distributor 1516 of transmitter 1507, and conductor 1517 to the portion of line conductor 1LRR which extends toward more remote station J.

It will be assumed as a basis for beginning the description of the circuits in Figs. 13, 14 and 15 and their operation, that there is no transmission on the transmission channel outgoing from the relay station comprising conductors 1LST and 1LSR, but that there is transmission from one of the outlying stations other than the one shown in detail in Figs. 13, 14 and 15, perhaps from station J. Since the loop includes an armature and contact 1 of relay AB and the continuous ring, brushes and stop segment of distributor 1516, which is idle, as well as the left-hand break contacts of key 1513, there is nothing at station D responding to this transmission. It will be assumed now that the sender circuit at the relay station is activated to transmit the signal code which will cause the association of teletypewriter 1502 with the conductors 1LST and 1LSR in preparation for reception of a message by station D. The association of the teletypewriter to receive the message is effected by the operation of relay 15TTY, and the manner in which that relay is operable in response to a selective code will now be described.

*Reception of station cut-on code*

As previously set forth, the code comprises four spacing and three intervening marking elements, the first spacing element having a duration approximating 400 milli seconds, and the remaining spacing elements and the marking elements having a duration of approximately 60 milliseconds or 400 milliseconds. The combination of long and short marking and spacing elements determines the selective characteristic of each code signal.

When the beginning of the first spacing element of the code is received, relay 14L releases, disengaging its grounded armatures from contacts 2 and 4, and engaging those armatures with contacts 1 and 3. In disconnecting ground from contact 4, a circuit for charging capacitor 1417, associated with the control electrode of a cold cathode gas-filled tube 14LS for timing spacing elements is activated. The circuit constants for ionizing this tube are such that a continuous spacing condition of at least 200 milliseconds is required to effect the firing of the tube, so that it will not fire in response to spacing elements of 60 milliseconds duration nor to continuous spacing conditions normally encountered in teletypewriter signals, but will fire only in response to long spacing signals contained in the codes transmitted by the sender at the relay station. The anode circuit of tube 14LS is traced over conductor 1418, armature and contact 1 of relay 13P2, contacts 4 and 3 of relay 13LP1, winding of that relay, conductor 1302, and contact 3 and armature of relay 14CLR to battery. Relay 13LP1 and relays 13P2, 13P3, 13P4, 13P5, 13P6 and 13P7 have generally the same function and are operable in generally the same manner as relays 11P1 to 11P8 in the sending selector, namely to count signal elements. The difference is that relays 11P1 to 11P8 count and control the transmission of successive signal elements whereas relays 13LP1 and 13LP2 to 13LP7 count received signal elements. It will be observed that prior to the release of relay 14L, and assuming that the line had been idle for a sufficient interval for capacitor 1419 associated with the control electrode of tube 14LM, which times marking signal elements to charge positively sufficiently to ionize the control gap of tube 14LM, that gap will be ionized. The tube will not be conductive in its main gap because the anode circuit includes conductor 1421, armature and contact 1 of relay 13P3, conductor 1303, contacts 1 and 2 of relay 14LP2, winding of that relay, conductors 1422, 1423, 1424, 1426, 1427 and 1305 to contact 2 of relay 13LP1, and since contact 2 is a front contact and relay 13LP1 is unoperated, there is no battery connected to the anode circuit of tube 14LM, but battery will become connected when relay 13LP1 operates. The grounding of the control electrode of tube 14LM at contact 1 of relay 14L upon the release thereof discharges capacitor 1419 and quenches the discharge between the cathode and the control electrode. Similarly, the grounding of contact 3 discharges a timing capacitor and quenches the discharge across the control gap of tube 14CLRT, the anode circuit of which is open at this time. At contact 2, the relay 14L completes the circuit of lamp 1429, the function of which is to indicate whether the transmission circuit in which relay 14L operates is idle or active. Relay 14L follows teletypewriter signals as well as station control signals and, accordingly, lamp 1429 is lighted each time relay 14L releases.

Because the initial spacing signal of the code exceeds 200 milliseconds, and in fact has a duration of approximately 400 milliseconds, tube 14LS will fire and operate relay 13LP1, over the circuit previously traced. This relay locks through its contact 3 and armature, and resistor 1304, to ground, and interrupts the energizing circuit which includes tube 14LS, thereby quenching the discharge through the main gap of that tube. At its armature and contact 1, relay 13LP1 connects battery through resistor 1306, winding of relay 13P2, conductors 1307 and 1308, contact 4 and armature of relay 13P3, contact 4 and armature of relay 13P5, contact 6 and armature of relay 13P7, conductor 1309, armature and contact 1 of relay 14CLR, and conductor 1431 to contact 2 of relay 14L.

As soon as relay 14L reoperates at the end of the long spacing signal, ground will be reconnected to contact 2, and relay 13P2 will operate. Also, the ground will be removed from the timing circuit for tube 14LM, and ground will be reconnected to the timing circuit for relay 14LS to discharge capacitor 1417 and prevent operation of the latter timing circuit. If the marking signal is long, tube 14LM will fire, and since its anode circuit is extended over conductor 1421, armature and contact 1 of relay 13P3, conductor 1303, contacts 1 and 2 and the winding of relay 14LP2 to battery supply conductor 1423, as previously described, the relay 14LP2 will operate, locking through its upper armature and contact 2. Relay 14LP2 is one of several fan circuit relays, and the functions performed by those relays will be described hereinafter. If the first marking element of the signal is short, relay 14L will release before tube 14LM has been fired, and relay 14LP2 will not be operated.

At its armature and contact 5, the relay 13P2 prepares an energizing circuit for relay 13P3 in series with the winding of relay 13P2, but that circuit cannot become effective until relay 14L releases at the beginning of the second spacing element of the code, and removes ground from the original energizing circuit for relay 13LP2, which included contact 4 and the lower armature of relay 13P3. This is the same arrangement for operating relays in succession and locking them in pairs as the one included in the sending selector in Fig. 11. With relay 14L released for the second spacing element of the code, the control electrode circuit for tube 14LM is again deactivated and the control circuit for tube 14LS is again activated, the anode circuit now being extended over conductor 1418 and the outer upper armature and contact 2 of relay 13P2, upper armature and contact 1 of relay 13P4, conductor 1311, contacts 1 and 2 of relay 14A, and winding of that relay to battery supply conductor 1424. Relay 14A is another fan circuit relay, and if the second spacing element is long, it will be operated, locking to ground through its contact 2 and upper armature, and interrupting the anode circuit for tube 14LS. If the second spacing element is short, relay 14A will not be operated.

When relay 14L reoperates at the end of the second spacing signal, it extends a ground connection to the lower armature of relay 13P3, which being now engaged by the No. 3 contact, extends the ground connection over conductors 1312 and 1313, and through the winding of relay 13P4, and conductor 1314 to battery supply conductor 1305. Tube 14LS is now disabled, and tube 14LM is timing, and if the signal element is long, tube 14LM will fire, the anode circuit now being traced over conductor 1421, upper armature and contact 2 of relay 13P3, upper armature and contact 1 of relay 13P5, conductor 1316, contacts 1 and 2 of relay 14B, and winding of that relay and conductor 1426 to battery supply conductor 1427, and the relay will operate, locking through its contact 2 and armature to ground, and interrupting, at its contacts 1 and 2, the anode circuit of tube 14LM to quench the tube. If the second marking element is short, tube 14B will not be operated.

At the beginning of the third spacing element, relay 14L disconnects ground from the energizing circuit for relay 13P4, and relay 13P5 operates in series with relay 13P4 from ground supplied through the armature and contact 3 of relay 13P4. Tube 14LS is now timing the duration of the third spacing element, and if the duration of that element is sufficient to fire the tube, the anode circuit, over which the discharge current flows, is traced over conductor 1418, upper armature and contact 2 of relay 13P2, upper armature and contact 2 of relay 13P4, upper armature and contact 1 of relay 13P6, conductors 1315 and 1317, contacts 1 and 2 of relay 14C, winding of that relay, and conductor 1423 to battery supply conductor 1424. Assuming that the third spacing element is long enough to cause the firing of tube 14LS, relay 14C will operate and lock through its upper armature and contact 2, interrupting the anode circuit for relay 14LS which is quenched.

At the beginning of the third marking element, relay 14L reoperates and extends ground over conductor 1431, contact 1 and upper armature of relay 14CLR, conductor 1309, armature and contact 6 of relay 13P7, lower armature and contact 3 of relay 13P5, and conductors 1318 and 1319 to the winding of relay 13P6 and then over conductor 1314 to battery supply conductor 1305 and relay 13P6 operates. Tube 14LM times the duration of the marking element, and its anode circuit is extended over conductor 1421, upper armature and contact 2 of relay 13P3, upper armature and contact 2 of relay 13P5, and uppermost armature and contact 1 of relay 13P7 to conductor 1317. As previously stated, conductor 1317 extends to the winding of relay 14C, which was presumed to have operated through the upper armature and contact 1 of relay 13P6. If the third spacing element of the signal had been short, relay 14C would not have operated, but would operate if the third marking element were long.

At the beginning of the fourth spacing element, the ground connection, through which relay 13P6 was operated, is disconnected by relay 14L and relay 13P7 operates in a path in series with relay 13P6 from ground through the lower armature and contact 3 of relay 13P6. At this time, tube 14LS is timing, and if a long spacing element is being received, the tube will fire, its anode circuit being extended through conductors 1418, the upper armatures and contacts 2 of relays 13P2, 13P4 and 13P6 to conductor 1315, which is in the energizing circuit for relay 14C. If this relay has already been energized in response to the third spacing or third marking signal element, the tube 14LS cannot fire because its anode circuit will be open. If relay 14C had not been operated, it will be operated in response to the fourth spacing element. At the end of the fourth spacing element, relay 14L is reoperated by the steady marking condition that follows the last spacing element, and remains operated.

The ground applied by the upper armature through contact 2 of relay 14L to conductor 1431 at this time is extended through contact 1 and the upper armature of relay 14CLR, conductor 1309, lowermost armature and contact 5 of relay 13P7, to conductor 1321, which is the apex of the fan circuit controlled by relays 13LP2, 13A, 13B and 13C, and from the latter conductor to the lower armature of relay 14C, and also through contacts 1 and 2 of relay 14HG, and the winding of that relay to battery. Relay 14HG operates and locks through its armature and contact 2. It will be assumed that the first marking, second spacing and second marking element of the code were long. These may be considered as elements 2, 3 and 4, a code of six significant elements, since the first element is always long and has no selective qualities. Identifying the codes only in terms of their long elements, it may be said that code 234 has resulted in the operation of relays 14LP2, 14A and 14B. The ground applied to the lower armature of relay 14C will be extended through back contact 4, armature and front contact 3 of relay 14LP2, armature and front contact 4 of relay 14A, armature and contact 3 of relay 14B, conductors 1433 and 1434, winding of relay 15TTY, and through normally closed key 1518 to battery. Relay 15TTY operates in this circuit and locks from the ground through the lower armature and contact 3 of relay 14HG, conductors 1435 and 1436, contact 2 and armature of relay 15TTY, to the right-hand terminal of the winding of that relay. Indicator lamp 1519 is operated by the ground connection supplied for operating relay 15TTY, and remains operated under the control of the locking ground.

Before the energization of relay 15TTY, a circuit for holding selector magnet 1503 of teletypewriter 1502 in the marking condition is traced from battery through contacts 1 and 3 of relay 15TTY, conductor 1521, winding of relay 1506, keyboard transmitter contacts 1504, conductor 1522, and contacts 4 and 5 of relay 15TTY to ground. A current of the order of 20 milliamperes through the winding of relay 1506 is sufficient to operate the relay to marking, whereas the line current in conductors 1409 and 1512 may be of the order of 60 milliamperes. Relay 15TTY, in operating, connects the loop circuit through the winding of relay 1506, and keyboard transmitter contacts 1504 in parallel with resistor 1511, to cause part of the line current to flow in the teletypewriter loop and operate relay 1506 to marking. In this way, the teletypewriter is associated with the line circuit over which signals are transmitted from the relay station, to be responsive to those signals.

*Answer-back signal transmission and receiving selector clearing*

With relay 13P7 operated, the anode circuit for tube 14LM is traced over conductor 1421, armatures and contacts 2 of relays 13P3, 13P5 and 13P7, conductors 1322 and 1437, winding of relay 14CLR, conductor 1438, and contact 1 and armature of relay 13LP1, to battery. Relay 13P7 also connects battery through its contact 3 and armature, conductor 1323, winding of relay 14AB, conductors 1435 and 1439, and resistor 1441 to the control electrode of tube 14LM. The path from battery through the winding of relay 14AB and resistor 1441 reduces the firing time of tube 14LM from approximately 200 milliseconds to about 80 milliseconds, and therefore at the end of the latter interval after relay 14L returns to marking ending the last spacing element, tube 14LM will fire, operating relay 14CLR. The faster timing of tube 14LM at the end of a code signal is provided to allow the receiver to clear in case a short break on the line has occurred during the transmission of teletypewriter signals. With the faster timing of tube 14LM the receiving selector is enabled to clear during the longer pulses of the teletypewriter signals.

With relay 14CLR operated, the path from battery through the winding of relay 14AB is extended from conductor 1435 over conductor 1442, contact 2 and upper armature of relay 14CLR, conductor 1309, lowermost armature and contact 5 of relay 13P7, conductor 1321, and through the fan circuit over a path previously traced through conductors 1433 and 1434, to the right-hand terminal of the winding of relay 15TTY, which is now grounded, through an armature and contact 2 of relay 15TTY, and the armature and contact 3 of relay 14HG. This completes the energizing circuit of relay 14AB which interrupts, at its contact 1 and armature, the transmission channel extending to the relay station, as an answer-back signal. At its armature and contact 2, relay 14AB provides a direct ground for holding relay 14CLR operated, thereby quenching tube 14LM.

At its armature and contact 3, relay 14CLR disconnects battery through relay 13LP1 for the purpose of releasing it. A connection from conductor 1302 through resistor 1324 and capacitor 1326 to ground, delays the release of relay 13LP1 for an interval of approximately 100 milliseconds after the operation of relay 14CLR. When relay 13LP1 releases, it removes battery from relays 13P2 to 13P7, from relays 14A, 14B, 14C and 14LP, and these relays release, relay 13P7 removing battery from the winding of relay 14AB and terminating the answer-back signal. A capacitor 1327, having one terminal connected to the winding of relay 13P2 and the other connected to ground through the inner upper armature and contact 3 of relay 13P2, delays the release of the relay until after relay 14AB has released. The receiving selector mechanism has thus been completely restored to normal, leaving the relays 14HG and 15TTY operated, and the teletypewriter responsively associated with the channel outgoing from the relay station.

*Reception of search code*

It will now be assumed that transmission at one of the other stations on the line has ceased, and that the relay station initiates the transmission of the search code for the purpose of determining whether any of the stations associated with the transmission channel comprising conductors 1LRT and 1LRR, over which the outlying stations transmit to the relay center, has any message material awaiting transmission. If no station has a message awaiting transmission, no answer-back signal will be returned, but if one or more of the stations have tape in their transmitters awaiting transmission, an answer-back signal will be returned to the relay station, whereupon the relay station will transmit a series of transmitter start codes over the transmission channel outgoing from the relay station for the purpose of starting one of the transmitters. A search code, which is received by all of the stations associated with the transmission channel comprising conductors 1LST and 1LSR has only the first spacing element long, the remaining spacing and marking elements being short. It therefore is the zero code. Relay 13LP1 is operated at the beginning of the long spacing element, and relay 13LP2 is operated at the end of it as previously described. As also previously described, the duration of the first spacing element is accurately adjusted to equal the transmission time of three teletypewriter signals. Since receiving relay 1506 responds to this spacing signal, the selector magnet 1503 interprets the spacing condition as three successive blank signals, which do not cause the printing of any character or the performance of any function in the teletypewriter. The receiving selector mechanism of the teletypewriter accordingly is approaching the stop condition at the time of operation of relay 13P2. This relay connects ground over an armature and contact 4, and conductor 1328, to the upper terminal of selector magnet 1503. This has the effect of blinding the teletypewriter, because it is not released by the removal of ground from the marking contact of relay 1506 as that relay releases in response to the remaining spacing elements of the search code.

Because of the fact that all of the significant elements of the search code are short, none of the relays 14LP2, 14A, 14B and 14C is operated. Therefore, the ground connection that is applied to conductor 1321 by relay 13P7, this conductor being the apex of the fan circuit, is extended through an armature and back contact 4 of relay 14C, an armature and back contact 4 of relay 14LP2, an armature and contact 7 of relay 14A, an armature and contact 6 of relay 14B, conductor 1443, right-hand break contacts of key 1513, winding of relay 15SE, and conductor 1523 to branching paths 1524 and 1538. Relay 15TD, when operated, can connect battery to conductor 1523 through its contact 2 and armature and conductor 1524, but relay 15TD is not operated. Relay 15P7, when operated, can supply battery to conductor 1523, if tape has been placed in the transmitter to await transmission, the path being traced from battery through sixth pin contacts 1529, conductors 1528, 1527 and 1329, front contact 4 and armature of relay 13P7, which is now operated, conductor 1526, contact 2 of relay 15P7, armature associated with contact 2 of relay 15P7, if operated, contact 1 and armature of relay 15TD and conductor 1524 to conductor 1523. It will be assumed that there is no tape in transmitter 1507, so that sixth pin contacts 1529 are open, and relay 15P7 can neither be operated nor supply battery to operate relay 15SE. Still another path is traced from conductor 1523 over conductor 1538, winding of relay 15BK, conductor 1539, back contact 1 and armature of relay 15P7, upper armature and front contact 1 of relay 15P1, because relay 15P1 operates each time relay 13LP1 operates, in a circuit from the winding of relay 15P1, conductor 1537, and front contact and armature 5 of relay 13LP1 to ground, the path from front contact 1 of operated relay 15P1 being traced over conductor 1541 to back contact 6 of relay 13LP1. Under the assumed circuit conditions, relay 15SE will not be operated.

As previously stated, with relay 13P7 operated, battery is connected to the left-hand terminal of answer-back relay 14AB. The path for completing the circuit of that relay to ground is traced over conductors 1435 and 1442, contact 2 and upper armature of relay 14CLR when it operates, conductor 1309, lowermost armature and contact 5 of relay 13P7, conductor 1321 and through the path previously traced to the winding of relay 15SE, which has neither ground nor battery connected to the various paths that extend from the left-hand terminal of its winding. Accordingly, relay 14AB cannot operate and no answer-back signal can be transmitted to the relay center. This is an indication that there is no traffic awaiting transmission. Accordingly, relay 14CLR will operate and clear the receiving selector mechanism without any selection having been made. Relay 13P2 removes the blinding ground connection from selector magnet 1503, but message transmission from the relay center was suspended prior to transmission of the search code, so that message transmission will not be resumed until the switching center has determined that no transmitter has a message awaiting transmission or that a transmitter has a message, whereupon a roll call will be made by means of transmitter start codes until a transmitter is started, after which message transmission to teletypewriter 1502 will be resumed.

It will now be assumed that at the time of reception of the search code, tape 1530 had been placed in transmitter 1507. This causes the closure of sixth pin contacts 1529 by pin 1531, and application of battery through the sixth pin contacts 1529, conductors 1528, 1527, 1329 to contact 4 and armature of relay 13P7, and when that relay operates, the battery connection will be extended over conductor 1526 to the winding of relay 15P7, which operates. At its contact 2 and armature, relay 15P7 extends the battery connection through back contact 1 and armature of relay 15TD and conductors 1524 and 1523 to the left-hand terminal of the winding of relay 15SE to cause the operation of that relay. Relay 15SE locks through its armature and contact 2 and removes a shunting ground from lamp 1542, causing that lamp to operate. When the winding of relay 14AB, having had battery connected to its left-hand terminal, has its right-hand terminal connected through the contact 2 and armature of relay 14CLR, upon the operation of that relay, and to conductor 1321 which is the apex of the fan circuit, the ground supplied from armature and contact 2 of relay 15SE will cause the operation of relay 14AB which will transmit an answer-back signal. When relay 15P7 operated, it locked through its contact 3 and lower armature, and the lower armature and contact 2 of relay 15P1, conductors 1536 and 1531 to conductor 1527, which has battery supplied from the sixth pin contacts. When in the clearing of the receiving selector relay 13P2 releases, it releases relay 15P1. This relay has a slow-release characteristic and, upon releasing, it interrupts the locking circuit for relay 15P7 which releases, in turn unlocking relay 15SE which releases.

*Reception of transmitter start code*

The relay center, having been informed by the answer-back signal that a station on the line has a message tape inserted in its transmitter and awaiting transmission, sends the transmitter start codes. It will be assumed that the first one transmitted is the transmitter start code for the station D. The code for starting transmitter 1507 will be assumed to be 34; and the ground on the fan circuit apex conductor 1321 will be extended through lower armature and contact 4 of relay 14C, armature and contact 4 of relay 14LP2, armature and contact 6 of relay 14A, armature and contact 5 of relay 14B, and conductor 1444 to the winding of relay 15TC, which operates, locking through its contact 1 and upper armature to the ground supplied over conductor 1537 that operates relay 15P1. At its lower armature and contact 2, relay 15TC extends ground over conductors 1534 and 1533 to the winding of relay 15TD, and with sixth pin contacts 1529 closed, battery will be applied through conductors 1528, 1527, 1531 and 1532 to operate relay 15TD. If there had been no tape in tape transmitter 1507, relay 15TC would have operated, but relay 15TD would not have operated. Relay 15P7 operated under the control of relay 13P7 with tape in the transmitter, but does not operate if there is no tape because battery for operating this relay is supplied through conductors 1528, 1527 and 1328, contact 4 and armature of relay 13P7, conductor 1526 and winding of relay 15P7 to ground. Relay 15P7 is assumed to have operated, and locks through its contact 3 and armature, and contact 2 and armature of relay 15P1, and conductors 1536 and 1531 to battery supplied from the sixth pin contacts.

Relay 15TD supplies ground through its front contact 4 to operate relay 15PD and to light lamp 1543. Relay 15PD extends ground to complete the circuit of driving motor 1544 for transmitter 1507. It may be added at this point that a similar relay may be provided for starting the motor of teletypewriter 1502 if the teletypewriter motor is not kept in continuous operation, such relay being operable by relay 15TTY. Relay 15TD locks through its contact 3 and armature to ground supplied through normally closed key 1546, by means of which relay 15TD may be released under manual control to stop transmission if necessary. At its contact 2, relay 15TD connects battery over conductors 1524 and 1523 to the winding of relay 15SE to provide for emergency stopping of the transmitter-distributor under control of an emergency stop code transmitted from the relay center. The circuit for starting the transmission of signals by the energization of start magnet 15ST of the transmitter includes the sixth pin contacts 1529, conductor 1528, the winding of start magnet 15ST, conductor 1547, contact 3 and lower armature of relay 15SE, contact 4 and lower armature of relay 15P7 when that relay releases, lower armature and contact 3 of relay 15P1 when that relay releases, contact 1 and armature of relay 15BK, contact 5 and armature of relay 15TD to ground.

When relay 15CLR of the receiving selector operates and extends a connection from battery through the winding of relay 14AB and the fan circuit path to the winding of relay 15TC, the ground supplied through the armature and contact 1 of relay 15TC to the fan circuit path causes the transmission of an answer-back signal by the operation of relay 14AB in the manner previously described. With relay 13P7 released as a part of the restoration of the receiving selector circuit under the control of relay 14CLR, the original energizing circuit for relay 15P7 is interrupted, but that relay is now locked under the control of relay 15P1. With relay 13LP1 released, relay 15TC releases and relay 15P1 releases, but the latter relay has a slow-release characteristic and will not release until well after the transmission of the answer-back signal has been completed. Upon the release of relay 15P1, it closes one of the previously-described open points in the energizing circuit for transmitter start magnet 15ST, and upon the release of relay 15P7, the other open point in the energizing circuit of transmitter start magnet 15ST is closed and the magnet becomes energized to initiate transmission to the relay center. The delay in the release of relay 15P1 also permits motor 1544 of the tape transmitter to come up to speed before the transmission of signals is begun. The present condition of the station circuit is that the counting relays and the fan circuit relays of the receiving selector are released, as well as relays 14CLR and 14AB, and relay 14TD and start magnet 15ST are operated. The released relay 13P2 of the receiving selector circuit causes the disconnection of ground from the blinding conductor 1328 for the teletypewriter 1502, and selector magnetic 1503 will respond to transmission from the relay center, which will be resumed following the starting of transmitter 1507, or any other transmitter on the line.

It is intended that the message tape which contains the signals to be transmitted be severed from the reperforator so that the tape will run out of the transmitter at the end of the message. This will cause the opening of sixth pin contacts 1529, thereby releasing start magnet 15ST to stop the transmitter and also removing battery from the winding of relay 15TD, to release.

*Reception of disconnect signal*

It will now be assumed that the transmission of the message to teletypewriter 1502 has been completed. As hereinbefore set forth, the relay center generates and sends to the outgoing line a disconnect signal. Because of the fact that the reception of the disconnect signal will result in the transmission of an answer-back signal, the circuit of transmitter start magnet 15ST must be interrupted to suspend transmission. This is accomplished by the operation of relay 15P1 when relay 13LP1 operates. Relay 15P7 will also operate under the control of relay 13P7 because battery through sixth pin contacts 1529 of the transmitter is supplied for operating relay 15P7, so that the reception of a disconnect code, while the transmitter is in operation, will result in the stopping of the transmitter by operation of relays 15P1 and 15P7, but relay 15TD will remain operated. The common disconnect signal has a long first spacing signal, which is common to all codes, and a long first marking signal, causing the operation of relay 14LP2 only among the fan circuit relays. When ground is applied to the apex of the fan circuit, it is extended through contact 4 and armature of relay 14C, armature and contact 3 of relay 14LP2, armature and contact 5 of relay 14A, armature and contact 4 of relay 14B, and conductor 1446, to the right-hand terminal of relay 14HG, thereby shunting the winding of relay 14HG and releasing it. Upon the release of the relay, ground is removed from conductor 1435 in the locking circuit for relay 15TTY, releasing that relay. Relay 15TTY extinguishes lamp 1519, disconnects the teletypewriter loop including the winding of relay 1506 and the keyboard contacts 1504 from parallel relation to resistor 1511, and reestablishes the local circuit for holding relay 1506 energized.

Before the release of relay 14HG, ground connected through its armature and contact 3 over conductor 1436 to lock relay 15TTY was also extended over conductor 1447 to one terminal of capacitor 1448, which also has that terminal connected through a resistor to ground. The other terminal of the capacitor is connected to the control electrode of cold cathode tube 14DAB and to a potential divider circuit comprising resistors 1449 and 1451 connected between ground and positive battery supply conductor 1427, the control electrode of tube 14DAB being connected to the junction of those resistors. The voltage applied to the control electrode of the tube by the potential divider is insufficient to fire it. At the instant that the lower armature of relay 14HG disengages from contact 3 to disconnect ground from conductors 1447 and 1436, and before relay 15TTY releases, battery is connected through key 1518, the winding of relay 15TTY, armature and contact 2 of that relay for the instant before it disengages conductors 1436 and 1447 to capacitor 1448. A pulse will be applied through capacitor 1448 to fire tube 14DAB. The anode circuit of this tube is traced through conductors 1452 and 1439, winding of relay 14AB, conductor 1323, and armature and contact 3 of relay 13P7 to battery. Relay 14AB will operate in this circuit and transmit the answer-back signal. Relay 14CLR operates, as it does at the end of each control signal received, and clears the receiving selector circuit. Relay 13P2 recloses relay 15P1, which releases relay 13P7, thereby reenergizing transmitter start magnet 15ST to cause the resumption of transmission if the tape has not run out.

*Reception of emergency stop code*

It may sometimes be necessary to stop a transmitter at an outlying station under the control of a signal transmitted from the relay center. The signal employed for this purpose is the same as the search code, which is the code zero, having none of its significant elements lengthened. As previously described, this code causes ground to be applied through the fan circuit to conductor 1443 over which the ground is extended through the right-hand break contacts of key 1513 to the right-hand terminal of the winding of relay 15SE. The path continues through the winding of the relay, conductors 1523 and 1524, and upper armature and front contact 2 of relay 15TD to battery. Relay 15SE locks through its upper armature to the battery on contact 2 of relay 15TD, so that relay 15SE will not release, as it does under the control of relay 15P7 after operation in response to the search code, as previously described, because the clearing of the receiving selector circuit does not result in disconnection of the operating battery for relay 15SE. At its lower armature and contact 3, the relay 15SE interrupts the energizing circuit for transmitter start magnet 15ST, and the circuit remains open after relays 15P1 and 15P7 release. The ground on the upper armature of relay 15SE completes the circuit for operation of the answer-back relay AB, as previously described, and upon the clearing of the receiving selector, only the relays 15SE and 15TD remain operated. With relay 15SE operated, lamp 1542 is lighted.

Actions to be taken by the attendant at the outlying station where a transmitter has been stopped on an emergency basis are the resetting of tape 1530 in transmitter 1507 to the beginning-of-message position, and the momentary operation of transmitter stop key 1546. Whichever action is taken first will result in the release of relay 15TD, key 1546 removing the locking ground, the removal of tape 1530 permitting sixth pin 1531 to rise and open contacts 1529, thereby removing battery from relay 15TD. The relay 15TD releases relay 15SE, and will not reoperate until the relay center again sends its selecting code.

*Reception of a break signal or line hit*

If the relay center should transmit a break on the outgoing channel, or if a line hit should produce a temporary spacing condition exceeding 200 milliseconds, relay 13LP1 of the receiving selector circuit will operate, and in turn operate relay 15P1. The latter relay suspends transmission by transmitter 1507, assuming that relay 15TD is operated. Whenever relay 15TD is operated, battery on contact 2 of the relay is extended over conductors 1524 and 1538 to the winding of relay 15BK. Relay 15P1 in turn prepares an energizing circuit for relay 15BK, traced from the right-hand terminal of the latter relay, conductor 1539, contact 1 and upper armature of relay 15P7, upper armature and contact 1 of relay 15P1, and conductor 1541 to contact 6 of relay 13LP1. Assuming that there was no transmission from the relay center at the time of the break signal or line hit, relay 14L will return to marking and remain operated after the break or line hit. Relay 13P2 will operate, and with relay 14L operated, capacitor 1456 associated with the control electrode of tube 14CLRT will begin to charge. The control gap of tube 14CLRT will fire in approximately 700 milliseconds, assuming that relay 14L remains operated, and when the main gap fires, relay 14CLR will operate in the anode circuit of tube 14CLRT, the circuit being traced from the anode of the tube through conductor 1457, winding of relay 14CLR, conductor 1438, and contact 1 and armature of relay 13LP1 to battery. Relay 14CLR releases relay 13LP1, which releases relay 14CLR and quenches tube 14CLRT, and also releases relays 13P2 and 14P1. Since relay 14P1 releases slowly, relay 13LP1 completes, at its contact 6, the prepared circuit for relay 15BK, which operates before relay 15P1 releases. Relay 15BK locks through its contact 2 and armature, and contact 5 and armature of relay 15TD to ground. Relay 15BK also removes, at its contact 3, a ground that normally shunts lamp 1551, thereby permitting the lighting of the lamp. At its contact 1, relay 15BK interrupts the circuit of transmitter start magnet 15ST, already interrupted at contact 3 of relay 15P1, so that the transmitter will not restart upon the release of relay 15P1. The transmitter should be conditioned for restarting by the resetting of tape 1530 and the release of relay 15TD, as in the case of suspension of transmission by operation of relay 15SE. The release of relay 15TD results in the release of relay 15BK.

In the event that transmission from the relay center was in progress at the time of the break or line hit, and that no further breaks or hits occur, the counting circuit may be advanced by the teletypewriter signals, but none of the fan circuit relays can be operated by those signals, since operation of any of them requires continuous marking or spacing for at least 200 milliseconds. If all of the relays 13LP1 to 13P7 operate, relay 15P7 will be operated, and preclude the operation of relay 15BK. However, none of the fan circuit relays will have been operated, and the fan circuit path will be completed to cause the operation of relay 15SE, which causes stopping of transmitter 1507, as does relay 15BK.

Continued response of relay 14L to teletypewriter signals would have precluded the firing of tube 14CLR, but if a full count is registered by the counting circuit, the operation of relay 14CLR is placed under the control of tube 14LM on a short timing cycle of approximately 80 milliseconds, and the early occurrence of a steady marking condition of this duration in teletypewriter signals is probable. In this way the receiving selector circuit would be cleared.

*Preempting of transmission channel for priority message*

It may sometimes be necessary for an outlying station to preempt the transmission channel extending to the relay center for the purpose of transmitting a priority message. The key 1513 is provided for this purpose. The first step in gaining access to the transmission channel is the operation of key 1513 to the left, thereby opening the left-hand break contacts. As previously described, these contacts are connected at the station between distributor 1516, and the contacts of answer-back relay 14AB, and the opening of the left-hand break contacts of key 1513 will cause the transmission of a break signal to the relay station. Key 1513 should be operated to the left for at least one second. At the relay center, as previously described, a timing circuit times a continuous spacing condition of the transmission channel in order to recognize a break signal, and operates break relay 6BK. This relay stops transmission on the outgoing channel, if such transmission is in progress, and causes the operation of relay 6LBD, which in turn causes the operation of relay 6EM to initiate the transmission of the emergency stop code. After holding key 1513 operated to the left for a least one second, the attendant operates the key to the right, and holds it so operated, thereby transferring the previously-traced energizing circuit for relay 15SE to conductor 1552 which extends to the winding of relay 15TC. When the receiving selector mechanism receives the emergency stop code, it will cause the operation of relay 15TC. This relay in turn operates relay 15TD, assuming that the attendant has placed the priority message tape in the transmitter to cause the closure of sixth pin contacts 1529, and upon the release of relays 15P1 and 15P7, the transmitter will be started to cause the transmission of the urgent message.

It is also possible to start the transmitter of an outlying station by manual control under emergency conditions, such as inability to effect the starting of the transmitter under the control of the relay center, because of failure of the receiving selector mechanism or some other apparatus at the outlying station. If tape has been placed in transmitter 1507 to provide battery connection on conductor 1531, relay 15TD may be operated by the momentary closure of key 1553 which will ground the right-hand terminal of the winding of relay 15TD, thereby causing its operation and locking through normally closed key 1546. With relay 15TD thus operated, the circuit of start magnet 15ST will be completed, and message transmission will begin immediately. If there should be transmission on the channel from some other outlying station at the time that transmission is started from a station by operation of key 1553, the signals arriving at the relay center will be garbled because two transmitters will be transmitting on the same channel simultaneously. Accordingly, care must be exercized in the starting of outlying station transmitters under manual control.

*Codes*

At each of the ten or fewer stations on a line, two distinct and selectively different codes are required, one for teletypewriter cut-on and the other for transmitter start. Three common codes are required, and they are search (which is also used as emergency stop), disconnect, and broadcast or master cut-on. A fourth code, group cut-on, may be common to some of the stations. The selector could provide as many as sixty-four selections, since there could be relays LP3, LP4, LP5, LP6 and LP7, in addition to LP2. Since fewer selections are required, the relays 14A, 14B and 14C are used, and represent three of five relays LP3 to LP7. Relays 14A and 14B may be connected to respond to two combinationally different signal elements at each station. Thus the combinations of code elements for operating relays 14A and 14B at four different stations might be 3 and 4, 3 and 5, 3 and 6, 3 and 7, at three other stations they might be 4 and 5, 4 and 6, 4 and 7, at the three remaining stations they might be 5 and 6, 5 and 7, 6 and 7. At each station, connections for the three code elements not used to operate relays 14A and 14B would be made to operate relay 14C.

It will be noted that relay 14C, when operated, extends the fan circuit apex conductor path to an armature of relay 14A which has only a front contact, designated 3, and that this relay, when operated, extends the path to an armature of relay 14B which has only a front contact, designated 7. From this contact the path is extended to an armature of relay 14LP2 which is shown as having front and back contacts 5 and 6, connected to conductor 1434, which is in the operating path for relay 15TTY. Contact 6 of relay 14LP2 may be left unconnected at some stations. With connections as suggested above, the code 234567 will cause the operation of relays 14LP2, 14A, 14B and 14C at all stations, and the connection of all of the teletypewriters to receive a broadcast message will result. The code 34567 will cause the operation of relays 14A, 14B and 14C. At those stations having the back contact 6 connected to conductor 1434, the teletypewriters will be cut-on, and this may be a group code. As previously set forth, the search and emergency stop code is zero and the common disconnect code is 2.

*Miscellaneous features*

It was previously set forth that relay 15TTY operates from battery supplied through normally closed key 1518 and is maintained operated from the same battery connection through the inner lower armature and contact 2 of the relay. Relay 15TTY may be released at any time by momentary operation of key 1518. Release of the relay in this manner will leave the teletypewriter in condition to be cut-on when its selecting code is next received. If key 1518 should be operated while a message is being received, loss of the remainder of the message will result. Relay 15TTY, having been released, can be reoperated only in response to the teletypewriter cut-on code for the particular station.

Reference is made to the fact that in Fig. 13 the back contacts 4 associated with he grounded lower armatures of relays 13P4 and 13P6 are connected through resistors to battery. It is frequently the custom to employ, at outlying stations, a power supply comprising a rectifier and filter circuit for supplying the direct-current potentials for operating relays, magnets and discharge tubes at the station, the current to be rectified being drawn from alternating-current power lines. As the number of relays that are operated and locked increases, the output voltage of the power supply may decrease, and this can be a source of trouble, particularly where gas-filled discharge tubes and gaseous discharge indicator lamps, requiring predetermined minimum voltages for their firing, may be employed. The current drawn though the resistors connected to contacts 4 of relays 13P4 and 13P6 provides compensation for protecting the output voltage of the power supply against excessive decrease. As each of the relays 13P4 and 13P6 operates, the current drawn through the resistor associated with its contact 4 is cut off, thereby making current available for the operation of relays without unduly decreasing the output voltage of the power supply.

Although a specific embodiment of the invention has been shown in the drawings and described in the foregoing specification, it will be understood that the invention is not limited to the specific embodiment but is capable of modification, substitution and rearrangement of parts and elements without departing from the spirit of the invention.

What is claimed is:

1. In a telegraph message relaying system, a central station, a plurality of lines each connected to said central station and having a plurality of outlying stations equipped to transmit messages to and receive messages from said central station, signal responsive selector means at each of said outlying stations for controlling the transmission and reception of messages thereat in response to transmission and reception controlling signals, means at said central station transmissively associable with said plurality of lines for generating and transmitting said transmission and reception controlling signals, and means for controlling seizure of said generating and transmitting means by each of said transmissively associable lines.

2. A system according to claim 1 having means in said central station associated with each of said lines and operably responsive to cessation of message transmission by any one of the outlying stations on said line for initiating operation of said seizure controlling means.

3. A system according to claim 1 having signal coding means in said central station individual to each of said lines for coding on said generating and transmitting means said transmission and reception controlling signals.

4. A system according to claim 1 having means at each of the outlying stations operably responsive to the selective completion of a message transmission or reception control signal operation by the signal responsive selector mechanism thereat for transmitting to said control station an answer-back signal.

5. A system according to claim 1 having means at said central station for storing and coding on said generating and transmitting means a plurality of said reception controlling signals and means also at said central station and operable by said answer-back signal for causing said coding means to code said reception controlling signals on said generating and transmitting means in succession.

6. In a telegraph system, a control station, a line connected to said station and having associated therewith a plurality of outlying stations, a storage transmitter and a message recorder at each of said outlying stations, means at said control station for transmitting signals over said line to said outlying stations, signal responsive selector means at each of said outlying stations for selectively effecting control operations including the starting of the storage transmitter and the connection and disconnection of the recorder in response to signals transmitted by said control station transmitting means, and means at each of said outlying stations operably responsive to the selective completion of any of said control operations for transmitting to said control station an answer-back signal.

7. A system according to claim 6 having means for suspending operation of a storage transmitter at any of said outlying stations upon response of the signal responsive selector mechanism thereat to a control operation effecting signal and for an interval ending after transmission of said answer-back signal at the station whereat selective completion of a control operation occurs.

8. A system according to claim 6 having recorder means at said control station responsive to signals transmitted by said storage transmitters, and means operable by the transmitting means at said control station incident to transmission of any of said control operation effecting signals for precluding response of the recorder means at said control station to said answer-back signal.

9. In a telegraph message transmission control system, a control station, a transmission line connected to said control station, a plurality of outlying stations associated with said line and having storage-type automatic transmitters for transmitting messages to said control station, signal responsive selector means at said outlying stations for selectively controlling the starting of said transmitters, means at said outlying stations for preparatorily conditioning the transmitters to be started, means at said control station for transmitting a signal sequence comprising a selective transmitter starting signal individual to each outlying station having a message transmitter, means at said control station for causing the transmission of an inquiry signal, means controlled by said conditioning means when operated at any outlying station for causing the transmission of an answer-back signal to said control station as a consequence of reception of said inquiry signal, and means at said control station for activating said signal sequence transmitting means only upon reception of and in response to said answer-back signal.

10. A system according to claim 9 having means at said control station for causing suspension of operation of said signal sequence transmitting means in response to reception of message signals and resumption of operation of said signal sequence transmitting means upon cessation of reception of said message.

11. A system according to claim 9 having timing means activated upon cessation of incoming message transmission at said control station, and means operable by said timing means upon timing a predetermined interval for activating said signal sequence transmitting means.

12. A system according to claim 9 having means for establishing a specific beginning and specific ending for said transmitter start signal sequence, and means for disabling said inquiry signal transmitting means after the beginning of transmission of said sequence and until the ending thereof.

13. A system according to claim 9 having means for qualifying said inquiry signal transmission means to operate repetitiously at predetermined intervals until disabled by reception of an answer-back signal at said control center.

14. In a telegraph message transmission control system, a central station, a plurality of lines terminating in said central station, a storage record controlled transmitter at said station associated with each of said lines, a plurality of outlying stations associated with each of said lines, a telegraph recorder at each of said outlying stations, signal responsive selector means at each of said outlying stations for receptively associating said recorders with said line in response to selective station control signals received from said central station, a selective station control signal transmitting instrumentality at said central station, means for causing seizure of said transmitting instrumentality by any of said lines, means individual to each line for coding on said transmitting instrumentality selective station control signals representing one or more recorders to be receptively associated with that line, and means for automatically releasing said transmitting instrumentality and starting the storage record controlled transmitter associated with that line.

15. A system according to claim 14 having means automatically operative at the end of transmission of a message by a storage record controlled transmitter for causing reseizure of said transmitting instrumentality and transmission of a disconnect signal to the line.

16. A system according to claim 14 having means including manually operable keys in sets individual to each of said lines and operable singly or plurally for coding said reception controlling signals on said transmitting instrumentality.

17. In a teletypewriter selective calling system, a plurality of transmission lines, a plurality of outlying stations associated with said line each including transmitting and receiving instrumentalities, a control station including transmitting and receiving instrumentalities associated with each line and further including in combination a sending device for sending over any of said transmission lines selective calling codes composed of signal elements of various transmission time durations corresponding to the calling codes of said outlying stations, common sequence circuit means associated with said sending device for controlling the transmission sequence and the signal element durations of outlying station selective calling codes transmitted by said sending device to said lines, control circuit means for causing said sending device to send a search code to any of said lines for determining if any outlying station has traffic for transmission and for activating said common sequence circuit means to poll the outlying stations on a line upon determining by means of said search code that an outlying station has traffic for transmission, transmitting instrumentality control means at said control station for each line and including means for activating said common sequence circuit means to effect transmission of signals for controlling the outlying stations on a line, and circuit means associated with each outlying station for effecting control functions in response to signals transmitted by said sending device.

18. In a telegraph message relay system, a control station, a plurality of transmission lines connected to said control station, a plurality of outlying stations associated with each of said lines and equipped to transmit messages to said control station, signal responsive means at each of said outlying stations for controlling transmission of messages thereat in response to transmission control signals, a signal generator at said control station transmissively associable with said plurality of lines, means in said generator for generating and transmitting said transmission control signals and means associated with each of said transmissively associable lines for seizing said signal generator.

19. In a telegraph message transmission control system, a central station, a plurality of lines terminating in said station, a storage transmitter at said station, a plurality of remote recorders associated with each of said lines, means for transmissively associating said storage transmitter with two or more of said plurality of lines, a recorder selection signal transmitter seizable by said plurality of lines, means associated with each of said plurality of lines for seizing said signal transmitter and coding recorder selection signals on said signal transmitter upon seizure of said signal transmitter by said associated line, means for causing said signal transmitter to transmit recorder selection signals coded by each of said associated lines transmissively associated with said storage transmitter and means for thereafter automatically starting said storage transmitter.

References Cited in the file of this patent

UNITED STATES PATENTS

| | | |
|---|---|---|
| 2,501,063 | Levin | Mar. 21, 1950 |
| 2,586,669 | Lake | Feb. 19, 1952 |
| 2,667,533 | Zenner | Jan. 26, 1954 |
| 2,676,199 | Bacon | Apr. 20, 1954 |
| 2,735,884 | Blanton | Feb. 21, 1956 |